US00RE47165E

(19) United States
(12) Reissued Patent
Littlejohn

(10) Patent Number: US RE47,165 E
(45) Date of Reissued Patent: *Dec. 18, 2018

(54) PRESSED PAPERBOARD SERVINGWARE WITH ARCHED BOTTOM PANEL AND SHARP BRIM TRANSITION

(71) Applicant: GPCP IP Holdings LLC, Atlanta, GA (US)

(72) Inventor: Mark B. Littlejohn, Appleton, WI (US)

(73) Assignee: GPCP IP Holdings LLC, Atlanta, GA (US)

( * ) Notice: This patent is subject to a terminal disclaimer.

(21) Appl. No.: 13/747,257

(22) Filed: Jan. 22, 2013

Related U.S. Patent Documents

Reissue of:

(64) Patent No.: 8,177,119
Issued: May 15, 2012
Appl. No.: 12/259,487
Filed: Oct. 28, 2008

U.S. Applications:

(60) Provisional application No. 61/001,419, filed on Nov. 1, 2007.

(51) Int. Cl.
*B65D 5/22* (2006.01)
*B65D 1/34* (2006.01)

(52) U.S. Cl.
CPC ..... *B65D 1/34* (2013.01); *Y10T 29/49* (2015.01)

(58) Field of Classification Search
USPC ..... 229/407, 406; 220/608, 574; 493/152, 493/158
See application file for complete search history.

(56) References Cited

U.S. PATENT DOCUMENTS 1,575,597 A 3/1926 Bothe
4,609,140 A 9/1986 Van Handel et al. ..... 229/2.5 R
(Continued)

FOREIGN PATENT DOCUMENTS

EP 1028062 A1 8/2000
EP 0 841 150 B1 6/2005
(Continued)

OTHER PUBLICATIONS

Kirk-Othmer, Encyclopedia of Chemical Technogy, Third Edition, vol. 17, pp. 798-799, 815, 831-836.
(Continued)

*Primary Examiner* — Catherine S Williams

(57) ABSTRACT

A disposable servingware container 10 press-formed from a generally planar paperboard blank has a characteristic diameter, D, and includes a bottom panel 12 having an arched central crown 14 with a convex upper surface 14a, a first annular transition portion 16 extending upwardly and outwardly from the bottom panel, with the proviso that a portion of the arched central crown defines a substantially continuous, convex arched profile 18 spanning at least 75% of the horizontal distance between center 20 of the container and the first annular transition. An optional sidewall portion 26 extends upwardly and outwardly from the first annular transition portion, while a second annular transition portion 28 flares outwardly with respect to the first annular transition portion defining a second radius of curvature, R2. The ratio of R2/D is 0.0125 or less. An outer flange portion 32 extends outwardly with respect to the second annular transition portion and forms the outer perimeter of the container.

209 Claims, 31 Drawing Sheets

(56) References Cited

U.S. PATENT DOCUMENTS

| | | | | |
|---|---|---|---|---|
| 4,721,499 | A | 1/1988 | Marx et al. | 493/152 |
| 4,721,500 | A | 1/1988 | Van Handel et al. | 493/152 |
| 4,832,676 | A | 5/1989 | Johns et al. | 493/152 |
| 5,050,791 | A * | 9/1991 | Bowden et al. | 229/407 |
| 5,088,640 | A | 2/1992 | Littlejohn | 229/2.5 |
| 5,249,946 | A | 10/1993 | Marx | 425/142 |
| 5,326,020 | A | 7/1994 | Cheshire et al. | 229/2.5 R |
| 5,938,112 | A | 8/1999 | Sandstrom | 229/407 |
| 6,039,682 | A | 3/2000 | Dees et al. | 493/58 |
| 6,120,863 | A | 9/2000 | Neculescu et al. | |
| 6,186,394 | B1 | 2/2001 | Dees et al. | 229/122.34 |
| 6,287,247 | B1 | 9/2001 | Dees et al. | 493/58 |
| 6,401,962 | B1 | 6/2002 | Littlejohn et al. | |
| 6,474,497 | B1 | 11/2002 | Littlejohn et al. | |
| 6,585,506 | B1 | 7/2003 | Johns et al. | |
| 6,589,043 | B1 | 7/2003 | Johns et al. | |
| 6,592,357 | B1 | 7/2003 | Johns et al. | 425/397 |
| 6,715,630 | B2 | 4/2004 | Littlejohn et al. | 220/573 |
| 6,733,852 | B2 | 5/2004 | Littlejohn et al. | |
| 6,893,693 | B2 | 5/2005 | Swoboda et al. | |
| 7,048,176 | B2 | 5/2006 | Littlejohn et al. | 229/406 |
| 7,337,943 | B2 | 3/2008 | Johns et al. | |
| D625,201 | S | 10/2010 | Wichmann | |
| 8,177,119 | B2 | 5/2012 | Littlejohn | |
| 9,392,891 | B2 * | 7/2016 | Littlejohn | B31B 43/00 |
| 2003/0173366 | A1 * | 9/2003 | Littlejohn | A47G 19/03 220/574 |
| 2006/0208054 | A1 | 9/2006 | Littlejohn et al. | 229/406 |
| 2007/0042072 | A1 | 2/2007 | Johns et al. | 425/394 |
| 2007/0235514 | A1 | 10/2007 | Abayhan et al. | 229/407 |
| 2010/0247830 | A1 | 9/2010 | Hernandez | |

FOREIGN PATENT DOCUMENTS

| | | | |
|---|---|---|---|
| JP | 6182909 | A | 7/1994 |
| JP | 10-235707 | A | 9/1998 |
| JP | 2004142798 | A | 5/2004 |
| JP | 2004161356 | A | 6/2004 |
| JP | 2005254520 | A | 9/2005 |
| WO | 96/11786 | A1 | 4/1996 |

OTHER PUBLICATIONS

International Search Report and Written Opinion of the International Search Authority for PCT/US2008/081507 dated Dec. 29, 2008.

Supplementary European Search Report for EP 08 844 15.2 dated Mar. 19, 2013.

Cover Letter and Inventory List from Gregory S. Cooper of Barnes & Thornburg LLP dated Feb. 15, 2017, five pages.

Plate Sample 1: Plate with Cindarella image, date unknown.

Dachser GmbH & Co. KG order with handwritten date of Mar. 11, 2001, one page.

Peerless Machine and Tool GmbH Bottom Die Tooling Specification (Order No. 9900615) dated Nov. 10, 2001, one page.

Peerless Machine and Tool GmbH Plate Specification including theoretical bottom view (Order No. 9900615PDD-B) dated Aug. 30, 2001, one page.

Peerless Machine and Tool GmbH Die Tooling Specification (Order No. 9900615) dated Oct. 18, 2001, one page.

Plate Sample 2: Purple plate, date unknown.

Peerless Machine & Tool Corporation Packing Slip No. 108566 with a shipment date of Oct. 26, 2005, one page.

Tooling image marked 805298, date unknown, one page.

Peerless Machine & Tool Corporatioin Female Cavity Die Tooling Specification (PDD 10853) dated Aug. 29, 2005, one page.

Pressed Paperboard Technologies, L.L.C. Paper Plate Concept of Proposed Plate (Drawing No. 10853), dated Aug. 1, 2005, two pages. (one page with markings on the front and back).

Plate Sample 3: Plate with frog images, date unknown.

Peerless Machine & Tool Corp. Packing Slip No. 43805 dated Jul. 17, 1997, one page.

Peerless Machine & Tool Corporation Deep Ultra Style Plate Specification (Print No. 96325PDD-REV) dated Feb. 3, 1997, one page.

Peerless Machine & Tool Corp. Bottom Die Cavity Tooling Specification (Print No. 96325BDC) dated Jun. 12, 1997, one page.

Plate Sample 4: Plate with pink and purple design, date unknown.

Peerless Machine & Tool Corp. Packing Slip No. 11678 dated Nov. 10, 1978, one page.

Peerless Machine & Tool Corporation Forming Die Tooling Specification with handwritten date of Jun. 7, 1978, one page.

Peerless Machine & Tool Corporation Product Drawing for two proposed plates with handwritten date of May 23, 1978, one page.

Plate Sample 5: Three-compartment Plate with print design, date unknown.

Peerless Machine & Tool Corp. Packing Slip No. 10280 dated Feb. 10, 1978, one page.

Peerless Machine & Tool Corporation Forming Die Tooling Specification with handwritten date of Dec. 7, 1977, one page.

Plate Sample 6: Three-compartment Plate with no design, date unknown.

Peerless Machine & Tool Corp. Packing Slip No. 37258 dated Dec. 21, 1993, one page.

Peerless Machine & Tool Corporation Die Specification (Print No. 92318PDD) with date of Dec. 10, 1992, one page.

Peerless Machine & Tool Corporation Bottom Die Specification (Print No. 93235BDM) with date of Feb. 9, 1998, one page.

Plate Sample 7: Plate with Breads & Cereals design, date unknown.

Peerless Machine & Tool Corp. Packing Slip No. 10025 (10024 Cont.) dated Jun. 27, 1977, one page.

Peerless Machine & Tool Corporation Top Die Tooling Specification with handwritten date of Nov. 9, 1976, one page.

Plate Sample 8: Bowl, date unknown.

Peerless Machine & Tool Corp. Packing Slip No. 45866 dated Sep. 17, 1998, one page.

Champion International Proposed Tray (Drawing No. 9867CHP1) dated Jul. 14, 1998, one page.

Peerless Machine & Tool Corporation Bottom Die Tooling Specification (Print No. 98199BDC) with date of Jul. 30, 1998, one page.

Plate Sample 9: Deep Dish Tray, date unknown.

Peerless Machine & Tool Corp. Packing Slip No. 453091 dated Mar. 14, 2003, one page.

Peerless Machine & Tool Corporation Female Cavity Die Tooling Specification (Print No. 802365FC) with date of Jan. 16, 2003, one page.

Peerless Machine & Tool Corporation Pizza Tray Specification (Print No. 802365PDD-REV1) with date of Dec. 2, 2002, one page.

Cover Letter and Second Inventory List of Paperboard Products from Gregory S. Cooper of Barnes & Thornburg LLP dated Jul. 10, 2017, 11 pages.

Plate Sample 10: Deep Round Tray, date unknown.

Peerless Machine & Tool Corp. Packing Slip No. 11199 dated Jun. 15, 1978, one page.

Peerless Machine & Tool Corporation Ekco Cake Pan Die Inserts Detail Specification with handwritten date of Jun. 1, 1978, one page.

Plate Sample 11: Oval Tray with Orange and Yellow Border, date unknown.

Peerless Machine & Tool Corp. Packing Slip No. 18705 dated Feb. 1, 1983, one page.

Peerless Machine & Tool Corporation Oval Tray Specification with handwritten edited date of Nov. 4, 1982, one page.

Plate Sample 12: Round Plate, date unknown.

Peerless Machine & Tool Corp. Packing Slip No. 12820 dated Aug. 17, 1979, one page.

Peerless Machine & Tool Corp. Packing Slip No. 12773 dated Aug. 6, 1979, one page.

Peerless Machine & Tool Corporation Pam Marker Plate Specification (Print No. 7-PM-XXXX-PDA) dated Feb. 15, 2012, one page.

Peerless Machine & Tool Corporation Pam Marker Plate Specification with handwritten date of Jul. 12, 1979, one page.

(56) References Cited

OTHER PUBLICATIONS

Plate Sample 13: Oval Platter with Flower Design Print, date unknown.
Peerless Machine & Tool Corp. Packing Slip No. 20305 dated Feb. 7, 1984, one page.
Peerless Machine & Tool Corporation Oval Plate Specification (Print No. FD-1000X608X024-IP-B-PDA) dated Feb. 24, 2012, one page.
Peerless Machine & Tool Corporation Bottom Die Details for Oval Platter Specification (Print No. FD-1000×608×024-IP-B-PDA) with handwritten date of Nov. 30, 1983, one page.
Plate Sample 14: 6-Cell Rectangular Tray, date unknown.
Peerless Machine & Tool Corp. No. 22498 dated Jun. 28, 1985, one page.
Peerless Machine & Tool Corp. No. 17417 dated Apr. 1, 1982, one page.
Peerless Machine & Tool Corporation 6 Cell Twirl Specification (Print No. PD-803×511×030-IP) with handwritten date of Feb. 16, 1982, one page.
Peerless Machine & Tool Corporation Bottom Die & Plunger Detail for the Original Swirl Tray Specification with handwritten date of Feb. 11, 1982, one page.
Plate Sample 15: Oval Tray, date unknown.
Peerless Machine & Toot Corp. Packing Slip No. 29836 dated Sep. 1, 1989, one page.
Peerless Machine & Tool Corporation Tray Specification (Print No. 89025PDDREV2) dated Mar. 27, 1989, one page.
Peerless Machine & Tool Corporation Bottom Die Cavity Details for Oval Tray Specification (Print No. 89025BDC) dated Aug. 11, 1989, one page.
Plate Sample 16: Deep Tray, date unknown.
Peerless Machine & Tool Corp. Packing Slip No. 31470 dated Sep. 11, 1990, one page.
Peerless Machine & Tool Corporation Tray Specification (Print No. 89322PDD) dated Nov. 29, 1989, one page.
Peerless Machine & Tool Corporation Bottom Die Details for Tray Specification (Print No. 89322BDC) dated Dec. 14, 1989, one page.
Plate Sample 17: 3-Compartment Plate, date unknown.
Document dated Jun. 1, 1994, one page.
Peerless Machine & Tool Corporation 3-Compartment Round Specification (Print No. 94032PDD) dated Feb. 11, 1994, one page.
Peerless Machine & Tool Corporation Bottom Die Cavity Milling Detail for 3-Compartment Round Specification (Print No. 94032BDM) dated Mar. 21, 1994, one page.
Plate Sample 18: Square Deep Tray, date unknown.
Peerless Machine & Tool Corporation Packing Slip No. 39723 dated Apr. 13, 1995, one page.
Peerless Machine & Tool Corporation Female Cavity Details Specification (Print No. 94347FC) dated Jan. 18, 1995, one page.
Peerless Machine & Tool Corporation Bottom Die Cavity Details for DP. Tray Specification (Print No. PD-412×412×112-CH) with handwritten date of Sep. 1, 1982, one page.
Plate Sample 19: Fiesta Octagonal Plate, date unknown.
Peerless Machine & Tool Corporation Packing Slip No. 40331 dated Aug. 24, 1995, one page.
Peerless Machine & Tool Corporation Octagonal Plate Specification (Print No. 95127PDD) dated May 4, 1995, one page.
Peerless Machine & Tool Corporation Bottom Die Milling Details Specification (Print No. 95127BDM) dated Jul. 13, 1995, one page.
Plate Sample 20: Black bowl, date unknown.
Peerless Machine & Tool Corporation Packing Slip No. 42679 dated Mar. 13, 1997, one page.
Peerless Machine & Tool Corporation Bottom Die Cavity (Fluting) Specification (Print No. 96301BDC2) dated Jan. 15 1997, one page.
Peerless Machine & Tool Corporation DP. Fluted Bowl Specification (Print No. 96301PDD) dated Oct. 31, 1996, one page.
Peerless Machine & Tool Corporation Bottom Die Cavity Specification (Print No. 96301BDC1) dated Jan. 21, 1997, one page.
Plate Sample 21: Pink Octagonal Plate, date unknown.
Peerless Machine & Tool Corporation Packing Slip No. 41490 dated Apr. 9, 1996, one page.
Peerless Machine & Tool Corporation 7" Octagon×17/32" Deep Specification (Print No. 896011PDD) dated Jan. 15, 1996, one page.
Peerless Machine & Tool Corporation Bottom Die Cavity Details Specification (Print No. 96011BDC) dated Feb. 16, 1996, one page.
Plate Sample 22: Deep Rectangular Tray, date unknown.
Peerless Machine & Tool Corp. Packing Slip No. 42137 dated Aug. 16, 1996, one page.
Champion International Proposed Tray Specification (Drawing No. 9680CHP1) dated Jun. 20, 1996, one page.
Peerless Machine & Tool Corporation Female Cavity Details (9680CHP1 Tray) (Print No. 96172FC) dated Jul. 1, 1996, one page.
Plate Sample 23: Deep Rectangular Tray, date unknown.
Peerless Machine & Tool Corp. Packing Slip No. 45035 dated Mar. 10, 1998, one page.
Champion International Proposed Tray Specification (Drawing No. 97E0CHP1) dated Oct. 1, 1997, one page.
Peerless Machine & Tool Corporation Bottom Die Cavity Details Specification (Print No. 98015BDC) dated Feb. 17, 1998, one page.
Plate Sample 24: Bowl, date unknown.
Peerless Machine & Tool Corp. Packing Slip No. 46792 dated Apr. 15, 1999, one page.
Peerless Machine & Tool Corporation Ultra Style Bowl Specification (Print No. 99012PDD) dated Jan. 20, 1999, one page.
Peerless Machine & Tool Corporation Bottom Die Cavity Specification (Print No. 99012BDC) dated Feb. 12, 1999, one page.
Plate Sample 25: Black Deep Rectangular Tray, date unknown.
Peerless Machine & Tool Corp. Packing Slip No. 48157 dated Mar. 27, 2000, one page.
Peerless Machine & Tool Corporation Female Cavity Details Specification (Print No. 800066FC) dated Nov. 17, 2000, one page.
Peerless Machine & Tool Corporation Tray Specification (Print No. 99197PDD REV1) dated Nov. 30, 1999, one page.
Plate Sample 26: Plate, date unknown.
Peerless Machine & Tool Corp. Packing Slip No. 49300 dated Oct. 16, 2000, one page.
Peerless Machine & Tool Corporation Bottom Die Cavity Details Specification (Print No. 800261PDD) dated Aug. 18, 2000, one page.
Peerless Machine & Tool Corporation Bottom Die Cavity Details Specification (Print No. 800261BDC) dated Aug. 24, 2000, one page.
Plate Sample 27: Disney Princesses Heart Shaped, date unknown.
Peerless Machine & Tool Corp. Packing Slip No. 105778 dated Sep. 10, 2004, one page.
Peerless Machine & Tool Corporation 9" Heart Tray Specification (Print No. 803306PDD REV2) dated May 5, 2004, one page.
Peerless Machine & Tool Corporation Female Cavity Hallmark 9" Heart Forming Die Specification (Print No. 804214FC) dated Aug. 2, 2004, one page.
Plate Sample 28: 7" Heart Tray Ariel, date unknown.
Peerless Machine & Tool Corp. Packing Slip No. 105846 dated Sep. 22, 2004, one page.
Peerless Machine & Tool Corporation 7" Heart Tray Specification (Print No. 803305PDD REV2) dated May 5, 2004, one page.
Peerless Machine & Tool Corporation Female Cavity Hallmark 7" Heart Forming Die Specification (Print No. 804217FC) dated Aug. 12, 2004, one page.
Plate Sample 29: Square Plate, date unknown.
Peerless Machine & Tool Corp. Packing Slip No. 105950 dated Oct. 8, 2004, one page.
Peerless Machine & Tool Corporation Square Ultra Plate Specification (Print No. 804109PDD REV1) dated Apr. 19, 2004, one page.
Peerless Machine & Tool Corporation Female Cavity Hallmark Cards Specification (Print No. 804220FC) dated Aug. 19, 2004, one page.
Plate Sample 30: Square Plate, date unknown.
Peerless Machine & Tool Corp. Packing Slip No. 105966 dated Oct. 14, 2004, one page.
Peerless Machine & Tool Corporation Square Ultra Plate Specification (Print No. 804108PDD) dated Apr. 19, 2004, one page.

(56) References Cited

OTHER PUBLICATIONS

Peerless Machine & Tool Corporation Female Cavity Hallmark 9" Square Forming Die Specification (Print No. 804223FC) dated Aug. 19, 2004, one page.
Plate Sample 31: Round Plate, date unknown.
Dachser GmbH & Co. KG Packing Slip, dated May 27, 2004, one page.
Peerless Machine & Tool GmbH Specification (Print No. 2300325) dated Mar. 22, 2004, one page.
Plate Sample 32: Round Plate, date unknown.
Peerless Machine & Tool Corp. Packing Slip No. 106007 dated Oct. 26, 2004, one page.
Peerless Machine & Tool Corp. Packing Slip No. 106008 dated Oct. 26, 2004, one page.
Peerless Machine & Tool Corporation 9" Ultra Plate Specification (Print No. 803325PDD-REV1) dated Nov. 24, 2003, one page.
Peerless Machine & Tool Corporation Female Cavity Hallmark Cards 9" Round Ultra Forming Die Specification (Print No. 804226FC) dated Sep. 28, 2004, one page.
Plate Sample 33: Small Round Plate, date unknown.
Peerless Machine & Tool Corp. Packing Slip No. 106046 dated Nov. 2, 2004, one page.
Peerless Machine & Tool Corporation 6 7/8" DIA.×33/64 DP. Ultra Plate Specification (Print No. 804074PDD) dated Mar. 15, 2004, one page.
Peerless Machine & Tool Corporation Female Cavity Hallmark Cards 7" Round Ultra Forming Die Specification (Print No. 804229FC) dated Oct. 5, 2004, one page.
Plate Sample 34: Small Round Bowl, date unknown.
Peerless Machine & Tool Corp. Packing Slip No. 106836 dated Mar. 30, 2005, one page.
Peerless Machine & Tool Corporation 6 15/32" DIA.×1 ½" DP. Ultra Bowl Specification (Print No. 804100PDD-REV5) dated Aug. 9, 2004, one page.
Peerless Machine & Tool Corporation Female Cavity Bowl, 6 15/32" DIA.×1 ½" DP Specification (Print No. 805065FC) dated Feb. 15, 2005, one page.
Plate Sample 35: Bear Shaped Small Tray, date unknown.
Peerless Machine & Tool Corp. Packing Slip No. 109888 dated Jun. 1, 2006, one page.
Peerless Machine & Too! Corporation Female Cavity Regina Winnie the Pooh Tray Specification (Print No. 805190FC) dated Jul. 15, 2005, one page.
Peerless Machine & Tool Corporation Face Tray 174.4mm×191.5mm×13.2mm DP. For Regina Specification (Print No. 805190PDD-REV3) dated Aug. 11, 2005, one page.
Plate Sample 36: Face Shaped Plate, date unknown.
Peerless Machine & Tool Corp. Packing Slip No. 110689 dated Oct. 17, 2006, one page.
Peerless Machine & Tool Corporation 7 5/16"×9"×¾" DP. Spider-Man Plate Specification (Product DWG# 806195PDA) dated Jun. 12, 2006, one page.
Peerless Machine & Tool Corporation Female Cavity Hallmark Spider-Man (Print No. 806195FC) dated Jul. 21, 2006, one page.
Plate Sample 37: Medium Plate, date unknown.
Peerless Machine & Tool Corporation 8 21/32"×8 21/32"×¾" DP. Darth Vader Plate Specification (Product DWG#806161PSA-REV1) dated Jun. 12, 2006, one page.
Peerless Machine & Tool Corporation Female Cavity Hallmark (Darth Vader) (Print No. 80616FC) dated Jul. 29, 2006, one page.
Plate Sample 38: No. One Plate, date unknown.
Peerless Machine & Tool Corp. Packing Slip No. 110553 dated Sep. 21, 2006, one page.
Peerless Machine & Tool Corporation No. One Plate Specification (Product DWG# 806071PDA-REV2) dated Mar. 9, 2006, one page.
Peerless Machine & Tool Corporation Female Cavity Hallmark "#1" Forming Die (Print No. 806239FC) dated Aug. 8, 2006, one page.
Plate Sample 39: Flag Plate, date unknown.
Peerless Machine & Tool Corp. Packing Slip No. 109407 dated Mar. 20, 2006, one page.
Peerless Machine & Tool Corporation 9"×8 ⅜"×4" DP. Pirates of the Caribbean for Hallmark Specification (Print No. 805319PDD) dated Jan. 20, 2006, one page.
Peerless Machine & Tool Corporation Female Cavity Hallmark P.O.C. Forming Die (Print No. 806025FC) dated Feb. 15, 2006, one page.
Plate Sample 40: Triangle Plate, date unknown.
Peerless Machine & Tool Corp. Packing Slip No. 109353 dated Mar. 10, 2006, one page.
Peerless Machine & Tool Corporation Superman Shield Plate (Dinner Size) for Hallmark Specification (Product DWG# 805291PDD-REV2) dated Jan. 19, 2006, one page.
Peerless Machine & Tool Corporation Female Cavity Hallmark Superman Shield (Dinner) Production Forming Die (Print No. 805291FC) dated Jan. 31, 2006, one page.
Japanese Office Action for Application No. 2014-162053, mailed by the Japanese Patent Office dated Nov. 1, 2016.

* cited by examiner

INVENTION PROFILE 2

GENERAL DIMENSIONS

COMPARATIVE PROFILE A

GENERAL DIMENSIONS

COMPARATIVE PROFILE B

GENERAL DIMENSIONS

FEA MODEL: FORCE vs. DEFLECTION

FEA MODEL: FORCE vs. DEFLECTION
FORCE (GRAMS)
500
400
300
200
100
0
0
0.1
0.2
0.3
0.4
0.5
DEFLECTION (INCHES)
INVENTION PROFILE 1
INVENTION PROFILE 3
COMPARATIVE PROFILE A
COMPARATIVE PROFILE D

INSTRON PLATE RIGIDITY (LOAD vs. DEFLECTION)

INSTRON PLATE RIGIDITY (LOAD vs. DEFLECTION)

CENTER ARCH STIFFNESS (LOAD vs. DEFLECTION)

PLATE SECTION

FEA SSI LOAD vs. DEFLECTION (MAJOR AXIS)

PRESSED PAPERBOARD SERVINGWARE WITH ARCHED BOTTOM PANEL AND SHARP BRIM TRANSITION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM FOR PRIORITY

This application is based upon U.S. Provisional Patent Application Ser. No. 61/001,419, filed Nov. 1, 2007 of the same title, the priority of which is hereby claimed and the disclosure of which is incorporated herein by reference.

TECHNICAL FIELD

The present invention relates to disposable pressed paperboard serving containers such as paper plates, paper bowls and paper trays. The containers have a bottom panel press-molded into an arch shape with a convex upper surface which defines an arched profile spanning the bottom of the container. Also provided is a sharp brim transition. The containers exhibit remarkable stiffness and load carrying capability at a given basis weight and can be made with less board or have higher strength than corresponding conventional products.

BACKGROUND

Disposable containers such as plates, bowls, platters and the like are usually made of plastic, or are pulp molded, or are pressware made from flat paperboard blanks. Most pressware paperboard plates, trays and bowls have a flat, planar bottom area. Some of these products have a downward concave bottom area as a result of paperboard fiber springback after forming. This can result in a "rocker bottom", or a product that tends to rock on its bottom during use. Some pressware paperboard products have been designed with what is commonly called a "gravy ring" around the periphery of the plate, so as to allow any liquids or grease to accumulate in an annular ring area disposed between the plate sidewall and raised planar central portion. Such designs may ameliorate the rocking problem, but appear to provide only limited additional strength as is seen in the finite element analysis results discussed hereinafter. Note also paragraph 93 on page 10 of United States Patent Publication No.: US 2006/0208054 to Littlejohn et al. (U.S. patent application Ser. No. 10/963,686) which states that while the bottom of pressware containers are generally planar, a step contour or a crown of a few degrees or so may be provided to address the problem of rocking. Pulp molded plates or plastic plates may be formed, as sometimes observed, with a convex (upward) crowned bottom, although it is not clear whether this is an intentional feature or a result of shrinkage after molding or thermoforming.

Pulp molded containers exhibit generally excellent dry strength as compared with many pressware containers; however, pulp molded containers are generally inferior to pressed paper products in terms of coating and decorative options because suitable printing and overcoating processes for pulp molded containers are relatively difficult and expensive as compared with available options for pressware. This is so because paperboard can be coated and printed prior to forming into shape. Pulp molded products are accordingly usually uncoated and not as resistant to grease and moisture as are pressware products with suitable latex coatings. Most plastic or foam plates have a limited heat/reheat range, and can soften or melt with hot foods or during microwave use. Thus, pressware containers are preferred in many cases.

Pressware containers have been produced with various flange profiles as is seen in the patent literature. U.S. Pat. No. 5,326,020 to Cheshire et al. discloses a container with a plurality of frusto-conical regions extending outwardly from the bottom of the container, while U.S. Pat. No. 5,088,640 to Littlejohn discloses a rigid four radii rim paper plate. See also U.S. Pat. No. 6,715,630 to Littlejohn et al. which discloses a disposable container having a linear sidewall profile and an arcuate outer flange as well as U.S. Pat. No. 7,048,176 also to Littlejohn et al. which discloses a deep dish disposable container made from a paperboard blank. Processing techniques and equipment are further detailed in United States Patent Publication No.: US 2007/0042072 to Johns et al. The '072 publication details apparatus and equipment suitable for making pressware at high throughput rates.

Pressed paper plates are typically formed from flat blanks. The blanks may be scored around their perimeter to aid in the necessary gathering of the paper during the formation of the product. The folds or pleats created in the final pressware product ideally are pressed and reformed with heat, moisture and pressure to "rebond" the structure and obtain high strength. However, pleats or folds can still be lines of weakness where hinging or opening can occur during plate use resulting from local flexure or tension, thus lowering the product strength and durability. U.S. Pat. No. 4,721,499 to Marx et al. is directed to a method of producing a rigid paperboard container having rebonded paperboard pleats. Dimensions appear in column 5, lines 12 through 43. See also, United States Patent Publication No.: US 2006/0208054 noted above. The products and methods disclosed in the '054 publication exhibit increased rigidity and rim stiffness as compared with other more conventional pressware products. These containers have an outer flange portion extending outwardly with a brim portion sloping downwardly defining a declivity angle with respect to a horizontal generally parallel to the bottom portion and includes an outward turn at the periphery of the container. This geometry has been found particularly suitable for pressed paperboard servingware. Dimensions of the various products appear on page 12, Tables 1 and 2.

Notwithstanding the many improvements already made in connection with pressware products, there is an ever present demand for pressware products with increased rigidity and increased load-bearing capability.

SUMMARY OF INVENTION

A disposable servingware container press-formed from a generally planar paperboard blank exhibits remarkable stiffness and strength when formed with the features described herein. The results observed are surprising, especially because the containers may be made with the same amount of material while retaining substantially the same overall dimensions as conventional containers. There are provided containers having a characteristic diameter, D, and including: (a) a bottom panel having an arched central crown with a convex upper surface; (b) a first annular transition portion extending upwardly and outwardly from the bottom portion, typically defining a first radius, R1, with the proviso that a portion of the arched central crown defines a substantially continuous, convex arched profile spanning at least 75% of the horizontal distance between the center of the container and the first annular transition portion; (c) an optional sidewall portion extending upwardly and outwardly from the first annular transition portion; (d) a second annular transition portion flaring outwardly with respect to the first annular transition portion defining a second radius of curvature, R2, the ratio of R2/D being 0.0125 or less; and (e) an outer flange portion extending outwardly with respect to the second annular transition portion. R2 is suitably 125 mils or less in the various products. Without intending to be bound by theory, it is believed that a relatively small R2 is beneficial in strengthening the rim of a pleated container to "lock" the pleated structure in place.

Only a minimal amount of extra material is required to form the upwardly convex crowned bottom panel, thus the same blank diameter can be used to form pressware products with a convex bottom panel having substantially the same diameter as a like product with a flat bottom panel. The extra material necessary to obtain the smaller upper inside R2 radius, which increases the sidewall and horizontal flange lengths, can be obtained by increasing the size of the lower first transition or R1 radius. Once again, the same blank diameter can be used to form the same nominal diameter product. The new shape/profile with an upwardly convex crowned bottom and/or small R2 radius can be readily commercialized using existing blanking tooling, since it can use the same diameter blanks. No significant product size, height or diameter changes result from these profile changes, thus maintaining the same product "cube", allowing the use of the same packaging materials, and parity product, packaging and distribution costs. This invention may be applied to plates, trays or bowls having shapes of the class described in U.S. Pat. No. 5,088,640 to Littlejohn; U.S. Pat. No. 5,326,020 to Cheshire et al.; U.S. Pat. No. 6,715,630 to Littlejohn et al.; and United States Patent Application Publication No. US 2006/0208054 of Littlejohn et al., the disclosures of which are incorporated herein by reference in their entirety. So also, other existing products may be modified in accordance with the invention. The perceived strength/durability improvement is significant and can be measured using a standard SSI or FPI rigidity tester, a rim stiffness tester and 1 Hand Hold Maximum measurements described below. Disposable pressware paperboard products produced in accordance with this invention are typically in the form of plates (both compartmented and non-compartmented), bowls, trays and platters. The products are typically round or oval in shape, but also can be hexagonal, octagonal, or multi-sided as will be appreciated by those of skill in the art.

Further features and advantages of the invention are discussed in detail below.

BRIEF DESCRIPTION OF THE DRAWINGS

The invention is described in detail below in connection with the various Figures wherein like numerals designate similar parts and wherein:

FIG. 8(A) is an overlay comparing Invention Profile 1 with Comparative Profile A and FIG. 8B is an overlay comparing Invention Profile 2 with Comparative Profile B;

DETAILED DESCRIPTION

Figure 1B:
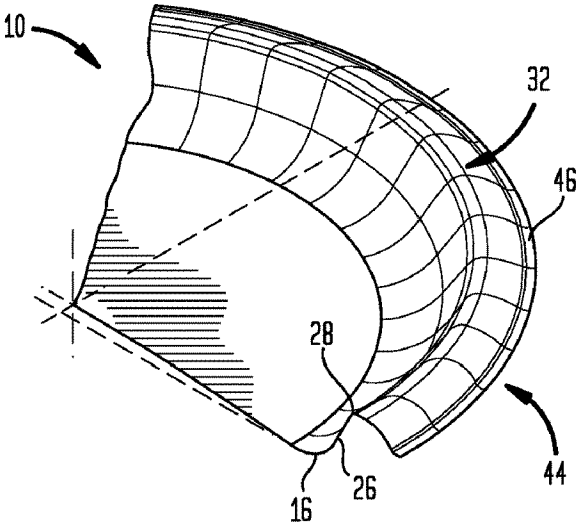
FIG. 1B is a partial view in perspective and section illustrating the geometry of the plate of FIG. 1A.

The invention is described in detail below with reference to numerous embodiments for purposes of exemplification and illustration only. Modifications to particular embodiments within the spirit and scope of the present invention, set forth in the appended claims, will be readily apparent to those of skill in the art.

As used herein, terminology is given its ordinary meaning unless a more specific definition is given or the context indicates otherwise. Disposable containers of the present invention generally have a characteristic diameter. For circular bowls, plates, platters and the like, the characteristic diameter is simply the outer diameter of the product. For other shapes, an average diameter can be used; for example, the arithmetic average of the major and minor axes could be used for oval or elliptical shapes, whereas the average length of the sides of a rectangular shape is used as the characteristic diameter and so forth. Sheet stock refers to both a web or roll of material and to material that is cut into sheet form for processing. Unless otherwise indicated, "mil", "mils" and like terminology refers to thousandths of an inch and dimensions appear in inches. Likewise, caliper is the thickness of material and is expressed in mils unless otherwise specified. Basis weight is expressed in lbs per 3000 square foot ream, while "ream" refers to 3000 $ft^2$.

Dimensions, radii of curvature, angles and so forth are measured by using conventional techniques such as laser techniques or using mechanical gauges including gauges of curvature as well as by other suitable technique. While a particular arcuate section of a container may have a shape which is not perfectly arcuate in radial profile, perhaps having some other generally bowed shape either by design or due to off-center forming, or due to relaxation or spring-back of the formed paperboard, an average radius approximating a circular shape is used for purposes of determining radii such as R1, R2 or R0, for example. A radius of curvature may be used to characterize any generally bowed shape, whether the shape is arcuate or contains arcuate and linear segments or comprises a shape made up of joined linear segments in an overall curved configuration. In cases where directional variation around the container exists, average values are measured in a machine direction (MD1) of the paperboard, at 90° thereto, the cross-machine direction (CD1) of the paperboard as well as at 180° to MD1 and 180° to CD1. The four values are then averaged to determine the dimension or quantity.

While the distinction between a pressware "bowl" and "plate" is sometimes less than clear, especially in the case of "deep dish" containers, a bowl generally has a height to diameter ratio of 0.15 or greater, while a plate has a height to diameter ratio of less than 0.1 in most cases. A "platter" is a large shallow plate and may be oval or any shape other than round.

The phrase "a substantially continuous, convex arched profile" refers to an arch structure which slopes downwardly and outwardly from center (or approximately from center) in a generally continuous manner. Preferably, no more than about 30% or so of the arch profile length is horizontally extending, the arch profile otherwise sloping downwardly and outwardly generally from around the center of the container toward the first annular transition. It is more preferred that no more than about 20% or 10% or so of the arch profile length comprises horizontally extending portions. The convex upper surface of the arched central crown, perhaps most preferably, is in the shape generally of a spherical or spheroidal cap as is seen in the Examples which follow.

"Evert", "annular evert", "evert portion" and like terminology refers to an outwardly extending part of the inventive containers, the evert typically occurring at the outer flange of a container adjoining a transition from a downwardly sloping brim portion of the container.

A "like" container is a container made by substantially the same process from substantially the same paperboard blank and having substantially the same shape, but without the specific feature or features specified or excluded. "A like container with a generally planar bottom panel and an R2/D ratio of 0.020 or greater" refers, for example, to a container having a profile such as Comparative Profile A as compared with a similar container having Invention Profile 1 profile. Similarly, "a like container with a generally planar bottom panel" refers to a container having a profile such as Comparative Profile A as compared with a similar container having a profile such as Invention Profile 4, for example. Likewise, "a like container with an R2/D ratio of 0.020 or greater" refers to a container having the shape of Comparative Profile A as compared with a similar container having a profile such as Invention Profile 3.

Figure 1A:
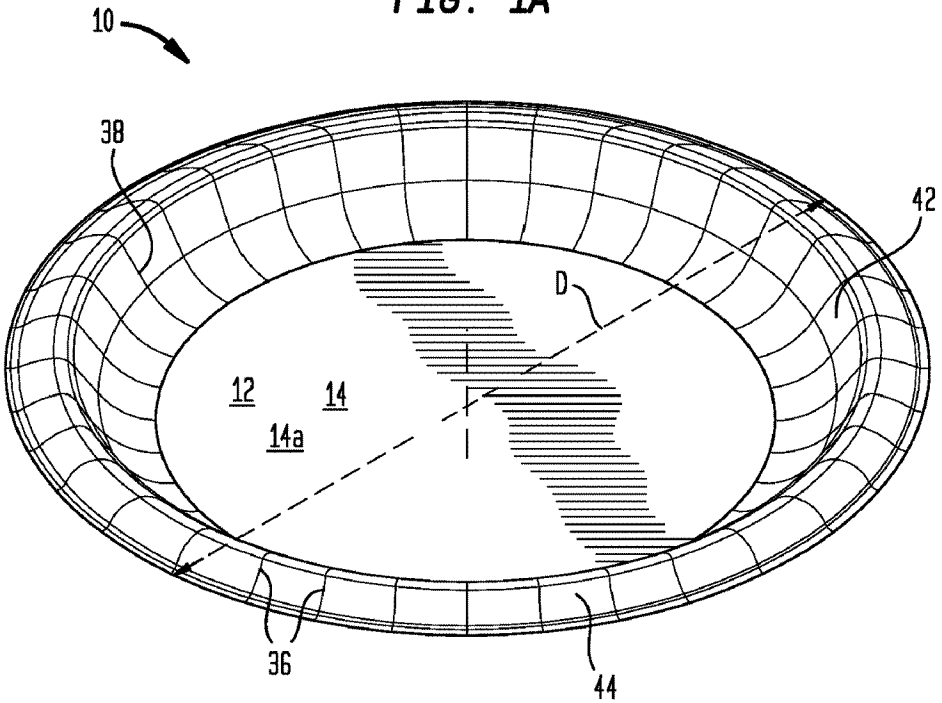
FIG. 1A is a view in perspective of a plate configured in accordance with the present invention.
Figure 1E:
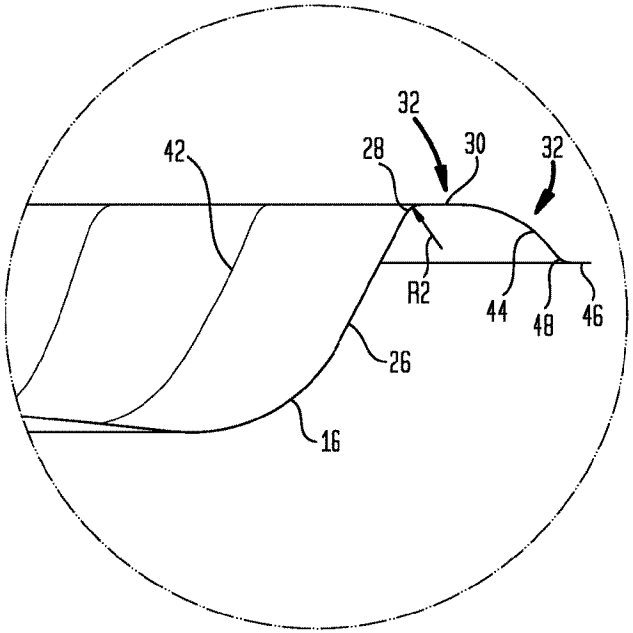
FIG. 1E is an enlarged detail illustrating the geometry of the disposable plate of FIGS. 1A-1D.
Figure 1C:
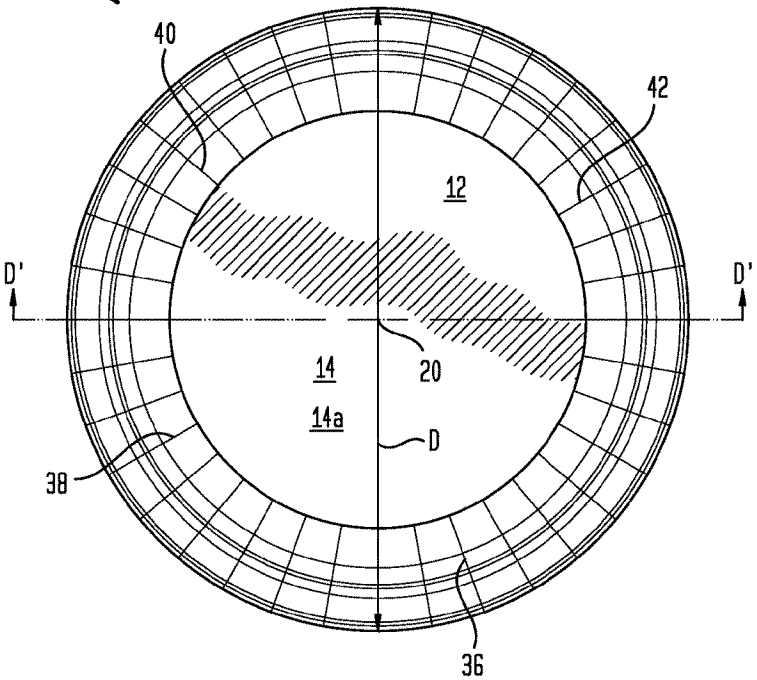
FIG. 1C is a plan view showing the plate of FIG. 1A and FIG. 1B.
Figure 1D:
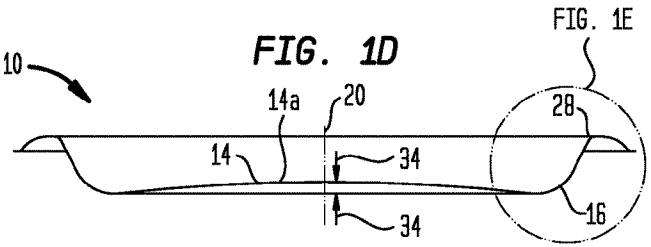
FIG. 1D is a view in section and elevation of the plate of FIG. 1A-1C along line D', D' of FIG. 1C.

The eversion angle, β, is an outward change in downward slope at the outer flange of the container and is calculated as the angle between a tangent to the brim portion at its lower terminus and a tangent to the evert portion at its junction with the brim transition to the evert. As used throughout this specification and in the claims, "slope" refers to inclination as one moves outwardly from the center of the product. Thus, a sidewall is typically referred to as upwardly sloping and a brim has a downwardly sloping outer portion. A container with a brim sloping downwardly at 60 degrees from horizontal transitioning to a horizontal ring (0 slope) has an eversion angle of 60 degrees, while a container with a brim sloping downwardly at 45 degrees transitioning to a ring sloping upwardly 5 degrees has an eversion angle of 50 degrees. Alternatively, the eversion angle can be conveniently determined by measuring the angle, γ, between the downwardly sloping brim and the outwardly extending evert and subtracting γ from 180 degrees because γ and β are supplementary angles as is seen in FIG. 1H. In the above examples, one calculates the eversion angle in the first case by first measuring the angle γ (which is 120 degrees) and subtracting it from 180 degrees. In the second case, the measured angle between the downwardly extending brim and the evert would be 130 degrees and the eversion angle 50 degrees.

"Rigidity" refers to SSI rigidity in grams at 0.5" deflection or FPI Rigidity in grams at 0.5" deflection as hereinafter described. Normalized Rigidity is the SSI or FPI Rigidity divided by basis weight (lbs per 3000 square foot ream). The Instron Plate Rigidity is measured Rigidity over a range of deflections, see FIGS. 14-15. If Rigidity is referred to without specifying SSI or FPI, Rigidity then refers to SSI Rigidity unless the context clearly indicates otherwise.

"Rim Stiffness" refers to the Rim Stiffness in grams at 0.1" deflection as further discussed below.

"Center Arch Stiffness" and like terminology refers to deflection at center of an inverted container which simulates the flexing of a plate as sensed, for example, by the fingertips of a user as the plate is loaded.

As has been noted above, disposable servingware containers such as pressware paperboard containers typically are in the form of plates, both compartmented and non-compartmented, as well as bowls, trays, and platters. The products are typically round or oval in shape but can also be multi-sided, for example, hexagonal or octagonal.

The invention described in this application can be applied to a variety of product shapes, sizes and designs, and rim profiles.

Among the product and processing attributes are:

1. Stronger, more durable pressware paperboard products having a convex upward arcuate crowned bottom. The arcuate crowned bottom may extend tangentially to the lower R1 radii that are joined to the upwardly and outwardly extending sidewalls, thus spanning the entire product bottom, or may transverse only a portion of the product bottom. The convex upward crowned bottom preforms the product shape, and prestresses the paperboard material in the hand hold or carry direction, such as to provide both measurable, and consumer perceived, higher strength. A planar bottom product readily moves or deflects upwardly a substantial distance when carried with a food load, thus conveying the lower strength feel of the product to the consumer. The preformed, upwardly crowned bottom takes away this movement, and provides more immediate product strength to the user. The difference in performance can readily be observed by placing a plate upside down onto a flat surface, putting a straight edge such as a ruler across the plate bottom and pushing on the middle of the plate bottom. Significant movement can readily be obtained with minimal force for the current, substantially flat, bottomed plates, whereas minimal movement is obtained with the inventive crowned bottom plates with the same force loading.
2. Stronger, more durable pressware paperboard products having a small upper inside R2 radius. The small R2 radius, and lengthened angled sidewall and horizontal flange portions that result, greatly increase the product's strength and durability. The small R2 radius also focuses the holding force on the thumb when in use, which can be readily perceived, thus reinforcing confidence in the products' strength, durability and food carrying capability.
3. Formation of a pressware paperboard product with a convex/upward arcuate crowned bottom and/or small upper inside R2 radius using a die set equipped with pressure and draw rings that contribute to pleating control and provide the final pressing/shape to the horizontal outer periphery.

Invention Profile 1

There are shown in FIGS. 1A through 1H various illustrations of a disposable container constructed in accordance with the present invention having the shape designated herein generally as Invention Profile 1. A disposable food container in the form of a plate 10 has a characteristic diameter, D, a bottom panel 12 having an arched central crown 14 with a convex upper surface 14a as well as a first annular transition portion 16 which extends upwardly and outwardly from bottom panel 12. Upper surface 14a of arched central crown 14 defines a substantially continuous, convex arched profile 18 extending from a center 20 of container 10 toward first annular transition portion 16 for the (horizontal) distance 22 which is at least 75% of a horizontal distance 24 between center 20 of container 10 and first annular transition portion 16. In the various embodiments shown, the highest point of arched central crown 14 is shown at center 20. While this is typically a preferred geometry, the highest point of the arched crown may occur off-center due to forming a blank which is not perfectly aligned in a die set, or due to relaxation or spring back or by design. A sidewall portion 26 extends upwardly and outwardly from first annular transition portion 16. A second annular transition portion 28 flares outwardly with respect to first annular transition portion 16 and defines a second radius of curvature, R2, the ratio of R2/D generally being 0.0125 or less. A generally linear inner flange portion 30 extends to an outer flange portion 32 which, in turn, extends outwardly with respect to the second annular transition portion. The upwardly convex central crown has a crown height 34 of from about 0.05" to about 0.40".

As will be appreciated from the various diagrams, the crown height is the maximum distance of the crown above the lowermost portion of the profile that the crown rises. Typically, the crown height is defined at the center of the container.

Plate 10 also has a plurality of pleats such as pleats 36, 38, 40 and 42 which extend from first annular transition portion 16 to the outer edge of the container. Preferably, these pleats correspond to the scores of a scored paperboard blank and include a plurality of paperboard lamellae which are reformed into a generally inseparable structure which provides strength and rigidity to the container, as discussed in more detail hereinafter.

Figure 1F:
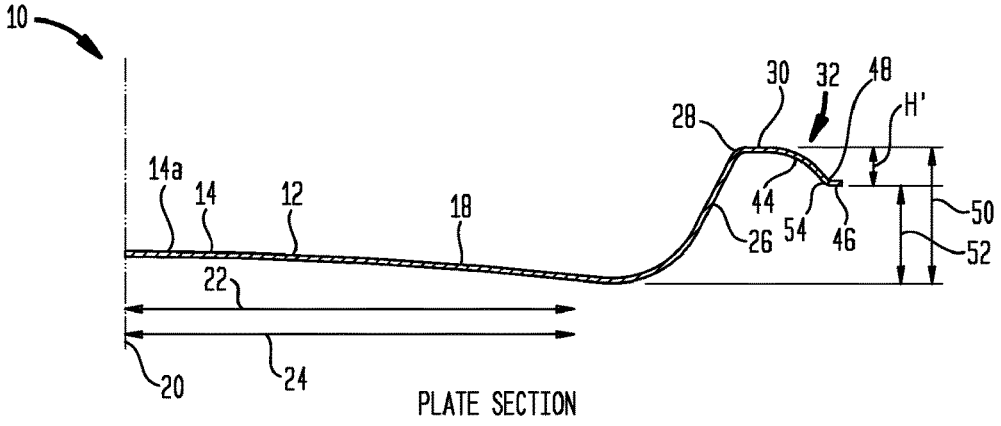
FIG. 1F is a diagram showing the profile from center of the plate of FIGS. 1A-1E.
Figure 1G:
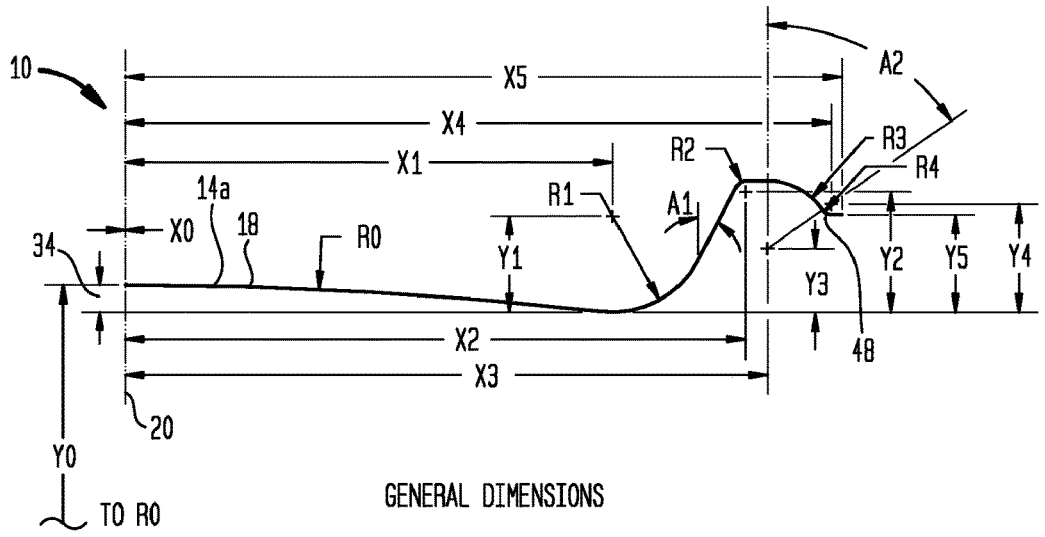
FIG. 1G is a schematic diagram illustrating the nomenclature for various dimensions of the plate of FIGS. 1A-1F.
Figure 1H:
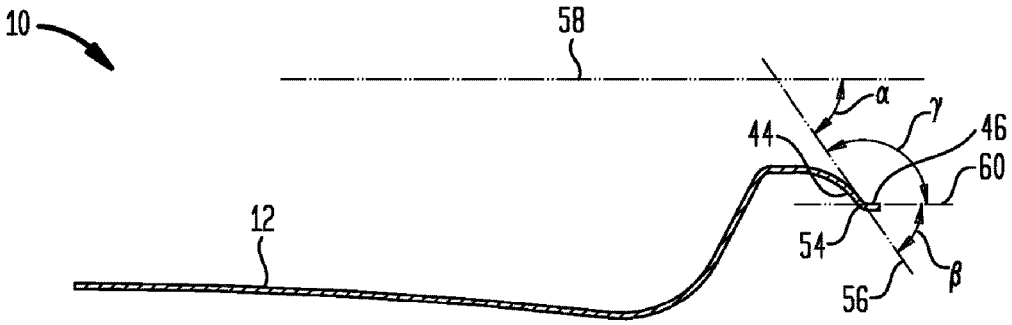
FIG. 1H is another schematic diagram illustrating various features of the plate of FIGS. 1A-1G.

The various structural features of the plate are particularly apparent in FIGS. 1F, 1G and 1H which are diagrams illustrating a profile from center of plate 10 having an Invention Profile 1 shape. Bottom panel 12 has an arched central crown 14 with a convex upper surface 14a which extends from the center of the plate indicated at 20 to first annular transition portion 16. That is, the arched crown extends across the center all the way and directly adjoins first annular transition portion 16. At first annular transition portion 16, the plate flares upwardly and outwardly to sidewall portion 26 at a radius of curvature R1. Sidewall portion 26 makes an angle A1 with a vertical. At the upper portion of sidewall 26, the plate flares outwardly at second annular transition portion 28 defining a second radius of curvature R2. An outward brim section 44 flares outwardly and downwardly defining a radius of curvature R3 over angle A2 as shown in the diagram. At the outer edge of brim portion 44, the plate turns outwardly defining a radius of curvature R4. An outward evert 46 provides strength and rigidity to the container as described in United States Patent Publication No. US 2006/0208054 to Littlejohn et al. noted above.

The various dimensions in FIGS. 1F and 1G for one embodiment of an Invention Profile 1 plate appear in Table 2, wherein: Y indicates generally a height from the lowermost portion of the bottom of the container (with the exception of Y0 which is the height of the crown from the origin of R0). Y1 is the height above the bottom of the container of the origin of radius of curvature R1 of first transition portion 16; Y2 is the height above the bottom of the container of radius of curvature R2; Y3 is the height above the bottom of the container of the origin of radius of curvature R3 of the outer portion 44 of brim 32; Y4 is the height above the bottom of the container of the origin of radius R4 of an outward transition portion 48; and Y5 is the height above the bottom of the container of evert portion 46. Similarly, X1 indicates the distance from center (X0) of the origin of radius of curvature R1. Likewise, X2 and X3 indicate respectively, the distance from the center of the plate (X0) of the origins of radii of curvature R2 and R3. Likewise, X4 indicates the distance from center of the origin radius of curvature, R4. X5 indicates the radius of the plate; that is ½D.

Y0 is indicated schematically in the diagrams as the distance from the bottom of container center 20 to the origin of a radius of curvature R0 of convex upper surface 14a of arched central crown 14 of bottom panel 12. This aspect is a salient feature of the invention which is seen in the various examples and Tables and especially appreciated from the rigidity data, discussed below.

The height of the brim, "brim height", "brim vertical drop" and like terminology refers to the difference H' between the overall height of the container 50, FIG. 1F and height 52 of the periphery.

FIG. 1H illustrates the various angles α, β and γ of the embodiment of the Invention Profile 1. Angle α is the angle between a tangent 56 at the terminus 54 of downwardly sloping brim portion 44 and a horizontal line 58. The eversion angle β is the angle between a tangent 60 to evert 46 adjacent its junction with transition 48 and tangent line 56 which is tangent to the terminus of portion 44 as shown. β is thus an outward change in downward slope of the outer portion of the article and may be measured directly or may be alternatively be calculated as 180°−γ where the angle, γ, is the angle between tangent line 56 to portion 54 and tangent line 60 to evert portion 46. Angle β may be anywhere from 25° to 160° on an absolute basis. Portion 46 may have an upward slope, a downward slope or have 0 slope as is the case with Invention Profile 1 where evert 46 is horizontal. It is not necessary that the length of the evert be uniform around the plate, nor is it required that the evert have a linear profile or a profile that is a combination of linear segments. The profile may be arcuate, for example, or comprise a combination of arcuate and linear segments as part of a generally bowed shape.

Generally, the eversion angle β is from about 30° to about 160°, more typically, from about 30° to about 120° or more preferably from about 30° to about 90° with from about 35° to about 65° or about 45° to about 55° in some particularly preferred cases. The evert portion preferably extends outwardly from the annular flange transition portion a length of at least about 0.005D, while typically the evert portion extends outwardly from the annular flange transition portion a length of at least about 0.007D. In many embodiments, the evert portion extends outwardly from the annular flange transition portion a length of from about 0.005D to about 0.06D, with a length of from about 0.007D to about 0.03D being a preferred range; for example, the evert portion may extend outwardly from the annular flange transition portion a length over its profile of from about 0.01D to about 0.025D. The evert portion may also extend upwardly, downwardly, or substantially horizontally from the brim transition portion and may have a linear profile or a curved profile and extend upwardly over a portion of its profile and downwardly over a portion of its profile. The length of the evert is measured along its profile, that is from the brim transition to the end of the evert. The height of any upward extension of the evert portion above the brim transition portion is preferably less than about 50 percent of the brim height, and is less than about 25 percent in most cases.

Still referring to FIGS. 1G and 1H, the downwardly sloping brim of the container makes a declivity angle α at its terminus with respect to a horizontal substantially parallel to the bottom portion which is generally less than about 80° or so. Less than about 75° is somewhat typical, with less than about 70° or 65° preferred in most cases. Likewise, the declivity angle α is typically at least about 25° or so, with a declivity angle α of at least 30°, 40°, 50° or between about 50° and about 60° being suitable in many embodiments. Between the downwardly sloping brim portion and the evert, the transition portion typically has a fairly small radius of curvature R4. Generally, the radius of curvature of the transition is less than ½", typically less than about ¼" and preferably about 1/16" or so for plates having a diameter of 8-10" or so. In most cases, a radius of curvature of the brim transition portion will be less than about ⅛", such as 1/16" or less. Radius of curvature R4 of the brim transition section will perhaps most preferably be between about ⅛" and 1/32". Without intending to be bound by theory, it is believed that a relatively small radius at R4 is beneficial in strengthening the rim of a pleated container to "lock" the pleated structure in place as is noted above in connection with R2. The ratio of the flange outer vertical drop or brim height, H', to the characteristic diameter, D, is generally greater than about 0.01. This feature is also of significance with respect to Invention Profile 2. Further details as to the geometry of the class shown in Invention Profile 1 (exclusive of bottom panel configuration and R2 curvature) are provided generally in United States Patent Publication No.: US 2006/0208054 to Littlejohn et al. (U.S. patent application Ser. No. 10/963,686), the disclosure of which is incorporated herein by reference specifically with respect to such features.

Invention Profile 2

Referring to FIGS. 2A, 2B, 2C, 2D, 2E, 2F, 2G, and 2H there is shown another plate 10 constructed in accordance with the present invention which is referred to generally herein as Invention Profile 2. This plate has many of the features seen in U.S. Pat. No. 6,715,630 to Littlejohn et al., the disclosure of which is incorporated herein by reference specifically with respect to features, dimensions and angles exclusive of the bottom panel configuration and R2 curvature.

Plate 10 has a characteristic diameter, D, a bottom panel 12 having an arched central crown 14 with a convex upper surface 14a as well as a first annular transition portion 16 which extends upwardly and outwardly from bottom panel 12. Upper surface 14a of arched central crown 14 defines a substantially continuous, convex arched profile 18 extending from a center 20 of container 10 toward first annular transition portion 16 for a (horizontal) distance 22 which is at least 75% of a horizontal distance 24 between center 20 of container 10 and first annular transition portion 16. A sidewall portion 26 extends upwardly and outwardly from first annular transition portion 16. A second annular transition portion 28 flares outwardly with respect to first annular transition portion 16 and defines a second radius of curvature, R2, the ratio of R2/D generally being 0.0125 or less. A generally linear inner flange portion 30 extends to an outer flange portion 32 which, in turn, extends outwardly with respect to the second annular transition portion. The upwardly convex central crown has a crown height 34 of from about 0.05" to about 0.40".

Here again, it is appreciated from the various diagrams, the crown height is the maximum distance of the crown above the lowermost portion of the profile that the crown rises. Typically, the crown height is defined at the center of the container.

Plate 10 also has a plurality of pleats such as pleats 36, 38, 40 and 42 which extend from first annular transition portion 16 to the outer edge of the container. Preferably, these pleats correspond to the scores of a scored paperboard blank and include a plurality of paperboard lamellae which are reformed into a generally inseparable structure which provides strength and rigidity to the container, as discussed in more detail hereinafter.

Figure 2B:
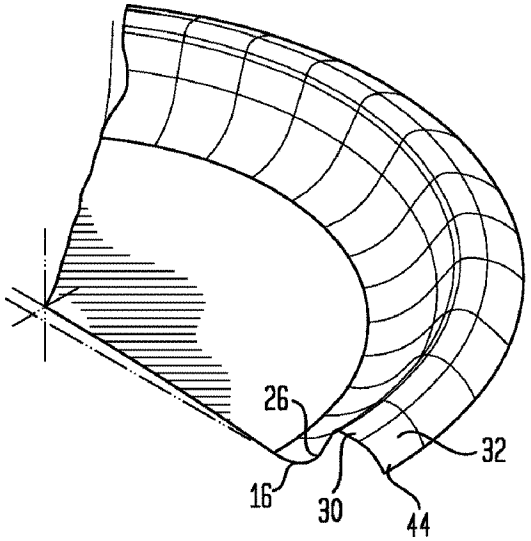
FIG. 2B is a partial view in perspective and section illustrating the geometry of the plate of FIG. 2A.
Figure 2A:
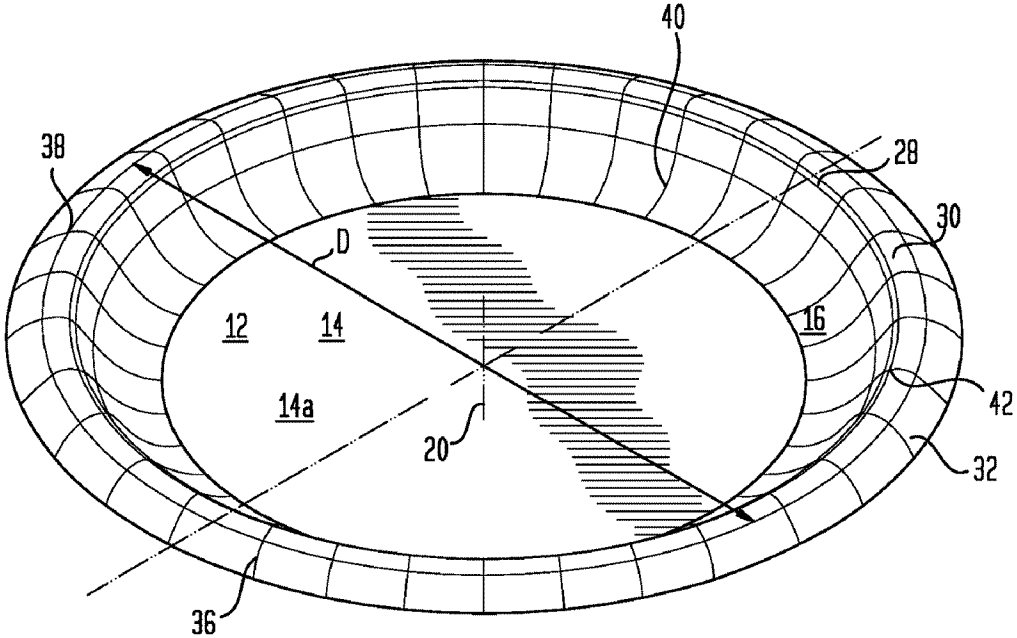
FIG. 2A is a view in perspective of another plate configured in accordance with the present invention.
Figure 2E:
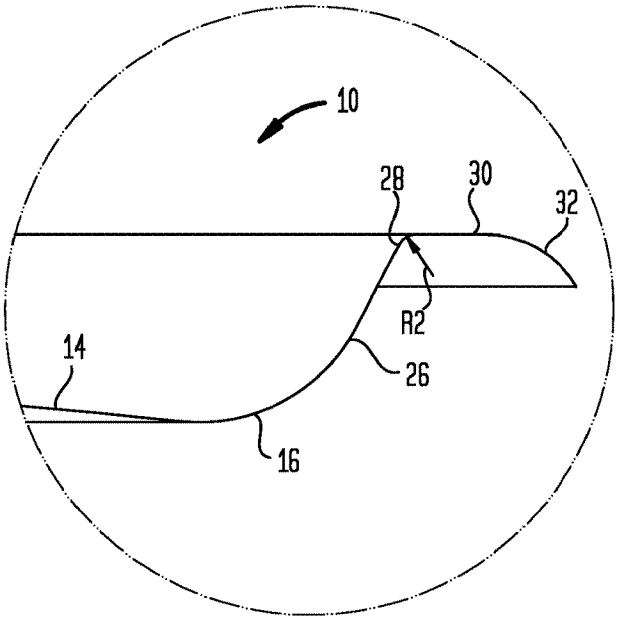
FIG. 2E is an enlarged detail illustrating the geometry of the plate of FIGS. 2A-2D.
Figure 2C:
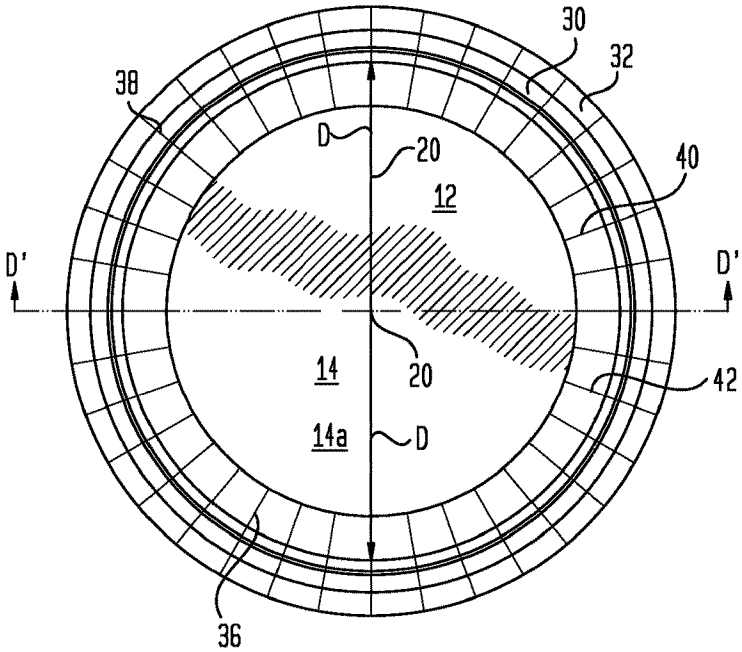
FIG. 2C is a plan view showing the plate of FIG. 2A and FIG. 2B.
Figure 2D:
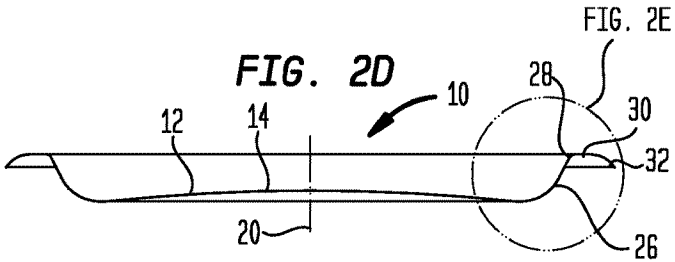
FIG. 2D is a view in section and elevation of the plate of FIGS. 2A-2C along line D', D' of FIG. 2C.
Figure 2F:
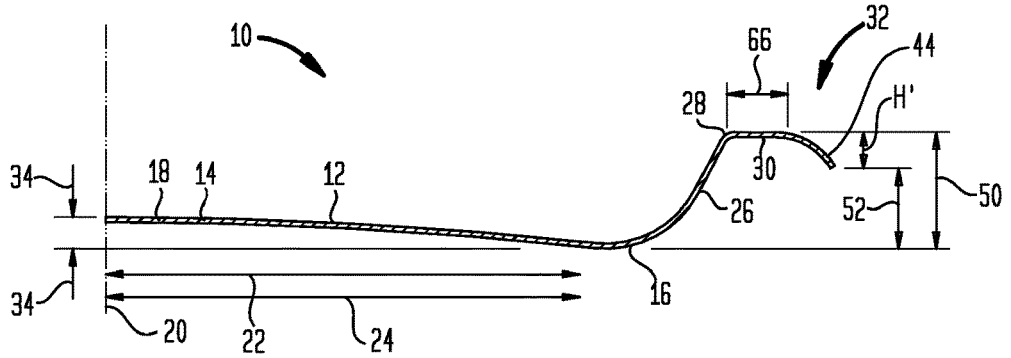
FIG. 2F is a diagram showing the profile from center of the plate of FIGS. 2A-2E.
Figure 2G:
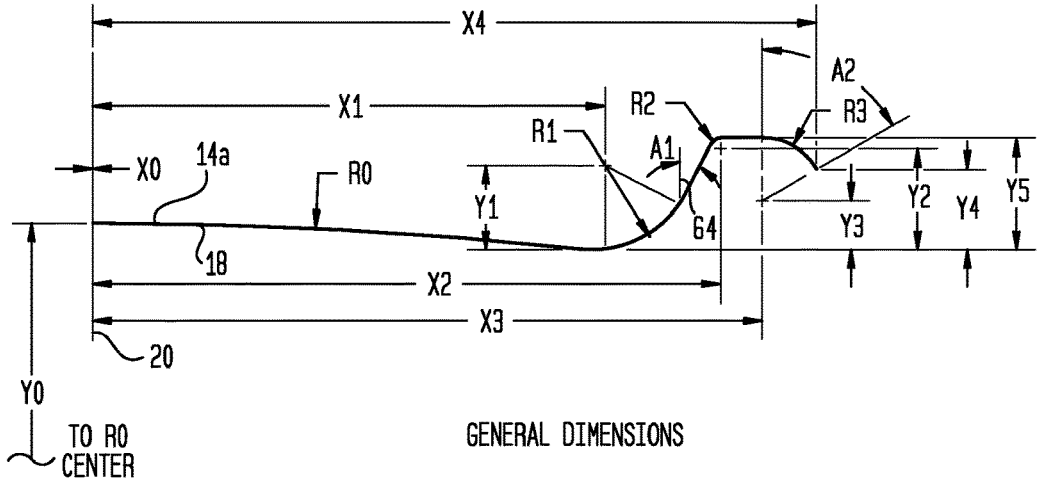
FIG. 2G is a schematic diagram illustrating the nomenclature for various dimensions of the plate of FIGS. 2A-2F.
Figure 2H:
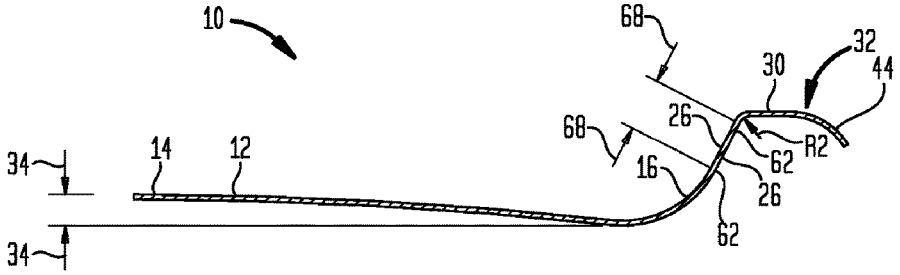
FIG. 2H is another schematic diagram illustrating various features of the plate of FIGS. 2A-2G.

The various structural features of the plate are particularly apparent in FIGS. 2F, 2G and 2H which are diagrams illustrating a profile from center of plate 10 having an Invention Profile 2 shape. Bottom panel 12 has an arched central crown 14 with an upper convex surface 14a which extends from the center of the plate indicated at 20 to first annular transition portion 16. That is, the arched crown extends across the center all the way and directly adjoins first annular transition portion 16. At first annular transition portion 16 the plate flares upwardly and outwardly to sidewall portion 26 at a radius of curvature R1. Sidewall portion 26 makes an angle A1 with a vertical. At the upper portion of sidewall 26 the plate flares outwardly at second annular transition portion 28 defining a second radius of curvature R2. An outward brim section 44 flares outwardly and downwardly defining a radius of curvature R3 over angle A2 as shown in the diagram.

The various dimensions in FIGS. 2F and 2G appear in Table 2 for one embodiment of an Invention Profile 2 plate, wherein the various features are defined similarly as in the case of Invention Profile 1, with exceptions at the outer perimeter of the plate as shown in the Figures and noted below. Y indicates generally a height from the lowermost portion of the bottom of the container (with the exception of Y0 which is the height of the crown from the origin of R0). Y1 is the height above the bottom of the container of the origin of radius of curvature R1 of first transition portion 16; Y2 is the height above the bottom of the container of radius of curvature R2; Y3 is the height above the bottom of the container of the origin of radius of curvature R3 of the outer portion 44 of brim 32; Y4 is the height above the bottom of the container of the outer edge of plate 10; and Y5 is the overall height of the container. Similarly, X1 indicates the distance from center (X0) of the origin of radius of curvature R1. Likewise, X2 and X3 indicate respectively, the distance from the center of the plate (X0) of the origins of radii of curvature R2 and R3. X4 indicates the overall radius (½ D) of the container.

Y0 is indicated schematically in the diagrams as the distance from the bottom of container center 20 to the origin of a radius of curvature R0 of convex upper surface 14a of arched central crown 14 of bottom panel 12. This aspect is a salient feature of the invention which is seen in the various examples and Tables and especially appreciated from the rigidity data, discussed below.

The height of the brim, "brim height", "brim vertical drop" and like terminology refers to the difference H' between the overall height of the container (50, FIG. 2F and height 52 also Y5-Y4 in this case).

Sidewall portion 26 defines a generally linear, inclined profile 62 between first annular transition portion 16 and second annular transition portion 28 extending over a distance 68 typically having an angle of inclination A1 of from about 10° to about 50° with respect to a vertical 64 from the generally planar bottom portion. From about 10° to about 40° is preferred in many embodiments. An arcuate outer flange portion 32, having an convex upper surface and extending outwardly and generally downwardly with respect to the second annular transition portion defines generally an outer radius of curvature R3 of the arcuate outer flange portion and there is optionally included an inner flange portion 30 extending between the second annular transition portion and the arcuate outer flange portion. A radial span 66 of the optional inner flange is typically of a length of from 0 to 0.1 times the characteristic diameter D of the container. The disposable containers are characterized by a ratio of radius of curvature R3 of the arcuate outer flange portion to characteristic diameter D of the disposable food container of from about 0.0175 to about 0.1. The containers are characterized further in that they have a flange outer vertical drop H' wherein the ratio of the length of the flange outer vertical drop to the characteristic diameter of the container is greater than about 0.01. The ratio of the flange outer vertical drop length H' to the characteristic diameter of the container is typically greater than about 0.013, usually greater than about 0.015 and in many cases greater than 0.0175. In many preferred products, the ratio of the radius of curvature of the arcuate outer flange to the characteristic diameter of the food container is greater than about 0.025. The ratio of the outer radius of curvature of the arcuate outer flange portion to the characteristic diameter of the disposable food container is typically from about 0.035 to about 0.07 or 0.06 in some embodiments, and preferably from about 0.04 to about 0.055. If an arc is characterized by more than one radius of curvature, such as an elliptical shape or the like, an average radius of curvature defined by the arc may be used to describe the shape, as a single radius defines an arc of constant curvature as is noted above. In many preferred embodiments, the arcuate outer flange portion of the container extends to the outer periphery of the container. One may, if so desired, provide an optional outward linear portion extending generally downwardly, for example, from the arcuate outer flange. The generally linear, inclined profile between the first annular transition portion and the second annular transition portion typically has an angle of inclination of from about 15° to about 40° with respect to a vertical from the generally planar bottom portion, whereas an angle of inclination of from about 25° to about 35° is preferred in some embodiments. The ratio of length 68 of the generally linear inclined profile between the first annular transition portion and the second annular transition portion to the characteristic diameter of the container is typically greater than about 0.025 and usually greater than 0.03. Values of this ratio between about 0.025 and 0.15 may be utilized for plates and deep dish containers; whereas for plates, values of this ratio are typically between about 0.025 and 0.06. Generally, the ratio of the length of the generally linear inclined sidewall profile to the characteristic diameter of the disposable food container is from about 0.025 to about 0.3. For bowls, values of the ratio of the length of the generally linear inclined profile between the first annular transition portion and the second annular transition portion to the characteristic diameter of the container is usually from about 0.1 to about 0.3 and typically from about 0.15 to about 0.25.

Comparative Profile A

Figure 3:
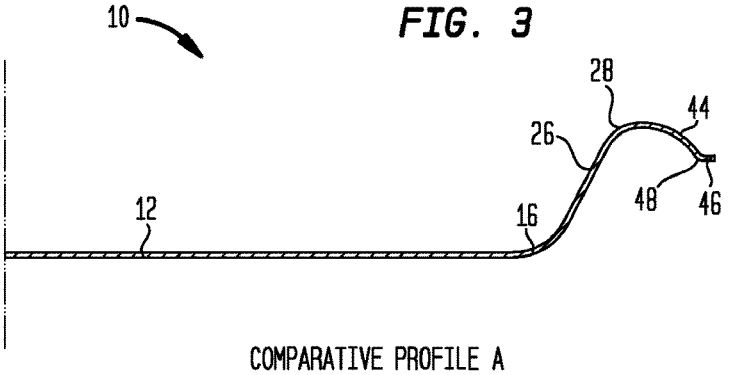
FIG. 3 is a diagram showing the profile from center of a plate described in United States Patent Publication No.: US 2006/0208054 of Littlejohn et al.
Figure 4:
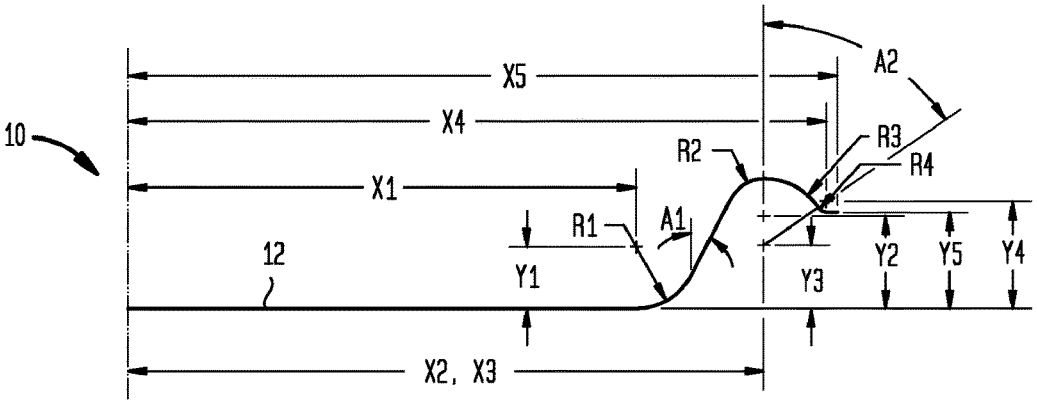
FIG. 4 is a schematic diagram illustrating the nomenclature for various dimensions of the plate of FIG. 3.

There is shown in schematically in FIGS. 3 and 4 the profile of paper plate constructed in accordance with United States Patent Publication No. US 2006/0208054 to Littlejohn et al. noted above, referred to generally herein as Comparative Profile A. Plate 10 has a characteristic diameter D, a generally flat bottom panel 12 well as a first annular transition portion 16 which extends upwardly and outwardly from bottom panel 12. At first annular transition portion 16 the plate flares upwardly and outwardly to sidewall portion 26 at a radius of curvature R1. Sidewall portion 26 makes an angle A1 with a vertical. At the upper portion of sidewall 26 the plate flares outwardly at second annular transition portion 28 defining a second radius of curvature R2. The ratio R2/D is about 0.026 or so. An outward brim section 44 flares outwardly and downwardly defining a radius of curvature R3 over angle A2 as shown in FIG. 4. At the outer edge of brim portion 44, the plate turns outwardly defining a radius of curvature R4. An outward evert 46 extends to the plate perimeter.

The various dimensions of the plate illustrated schematically in FIGS. 3 and 4 appear in Table 2 for a plate having a Comparative Profile A shape, wherein: Y indicates generally a height from the lowermost portion of the bottom of the container; Y1 is the height above the bottom of the container of the origin of radius of curvature R1 of first transition portion 16; Y2 is the height above the bottom of the container of radius of curvature R2; Y3 is the height above the bottom of the container of the origin of radius of curvature R3 of the outer portion 44 of brim 32; Y4 is the height above the bottom of the container of the origin of radius R4 of an outward transition portion 48; and Y5 is the height above the bottom of the container of evert portion 46. Similarly, X1 indicates the distance from center of the origin of radius of curvature R1. Likewise, X2 and X3 indicate respectively, the distance from the center of the plate of the origins of radii of curvature R2 and R3. Likewise, X4 indicates the distance from center of the origin radius of curvature, R4. X5 indicates the radius of the plate; that is ½ D.

Comparative Profile B

Figure 5:
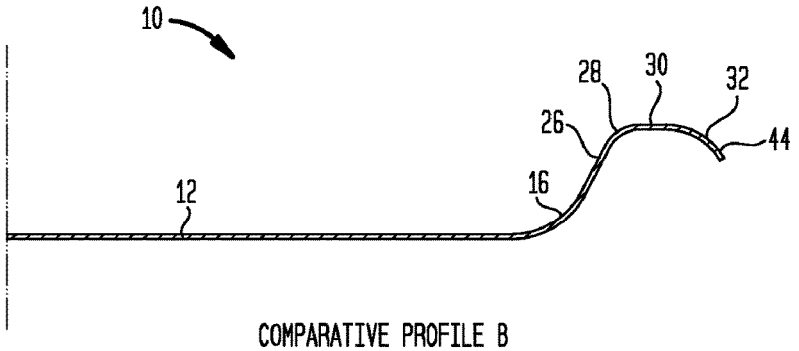
FIG. 5 is a diagram showing the profile from center of a plate described in U.S. Pat. No. 6,715,630 of Littlejohn et al.
Figure 6:
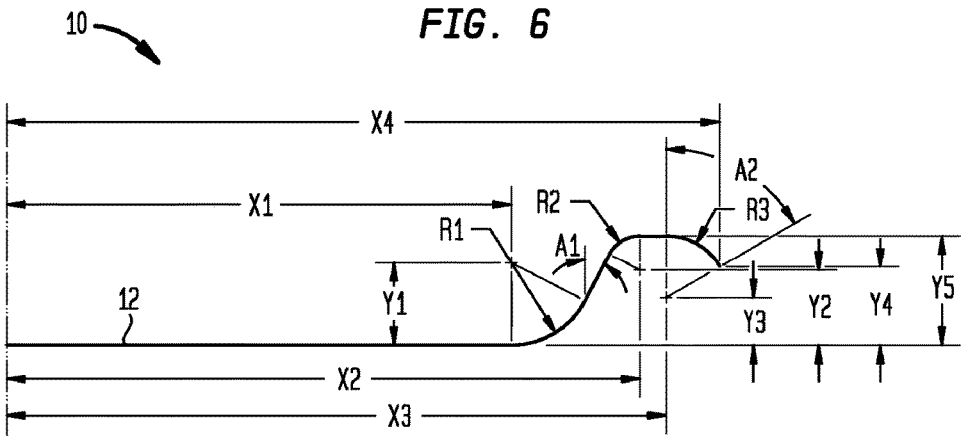
FIG. 6 is a schematic diagram illustrating the nomenclature for various dimensions of the plate of FIG. 5.
Figure 7A:
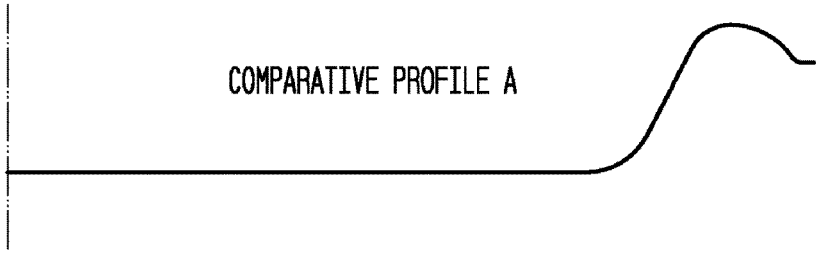
FIGS. 7A-7D are diagrams illustrating the respective profiles of the plates illustrated in FIGS. 1A through 6 having the same nominal diameter.
Figure 7B:
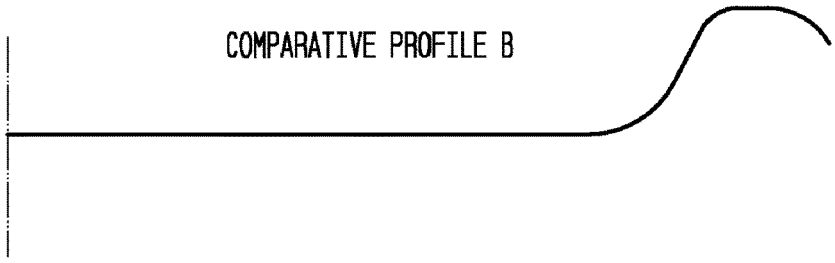
Figure 7C:
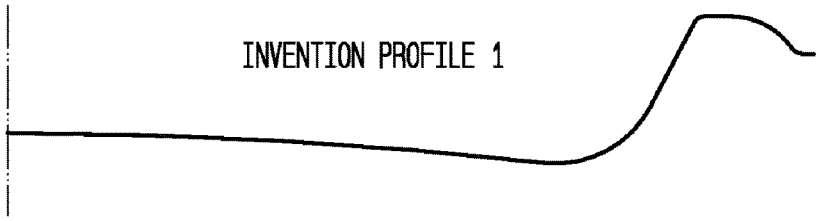
Figure 7D:
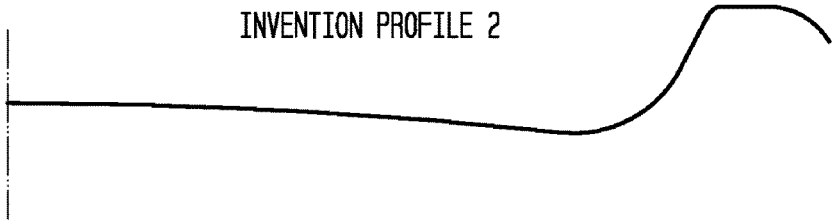
Figure 8A:
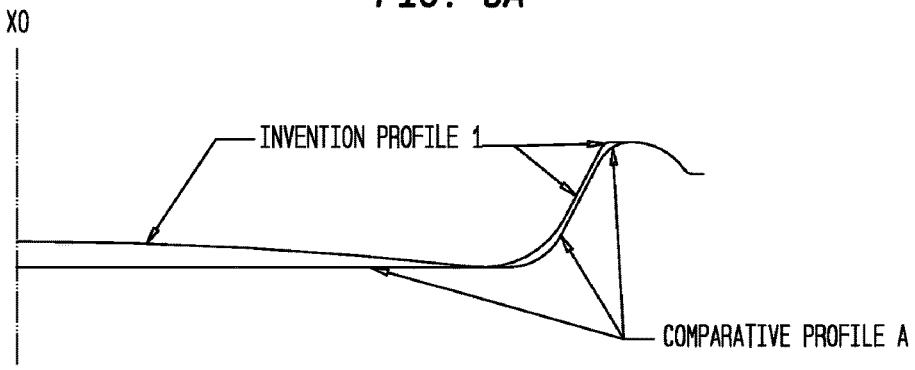
FIGS. 8A and 8B are diagrams showing plate profile comparisons.
Figure 8B:
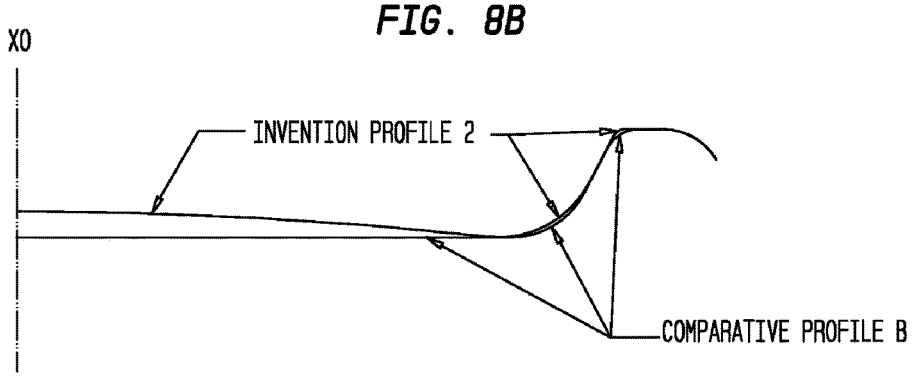

Referring to FIGS. 5 and 6 there is shown schematically the profile of another plate 10 constructed in accordance with U.S. Pat. No. 6,715,630 to Littlejohn et al., which is referred to generally herein as Comparative Profile B. Plate 10 has a characteristic diameter, D, a generally flat bottom panel 12 as well as a first annular transition portion 16 which extends upwardly and outwardly from bottom panel 12. A sidewall portion 26 extends upwardly and outwardly from first annular transition portion 16. A second annular transition portion 28 flares outwardly with respect to first annular transition portion 16 and defines a second radius of curvature, R2, the ratio of R2/D generally being 0.024 or so. A generally linear inner flange portion 30 extends to an outer flange portion 32 which, in turn, extends outwardly with respect to the second annular transition portion.

At first annular transition portion 16 the plate flares upwardly and outwardly to sidewall portion 26 at a radius of curvature R1. Sidewall portion 26 makes an angle A1 with a vertical. At the upper portion of sidewall 26 the plate flares outwardly at second annular transition portion 28 defining a second radius of curvature R2. An outward brim section 44 flares outwardly and downwardly defining a radius of curvature R3 over angle A2 as shown in FIGS. 5 and 6.

The various dimensions of the plate of FIGS. 5 and 6 appear in Table 2 for a plate having a Comparative Profile B shape, wherein the various features are defined similarly as in the case of Invention Profile 2. Y indicates generally a height from the lowermost portion of the bottom of the container. Y1 is the height above the bottom of the container of the origin of radius of curvature R1 of first transition portion 16; Y2 is the height above the bottom of the container of radius of curvature R2; Y3 is the height above the bottom of the container of the origin of radius of curvature R3 of the outer portion 44 of brim 32; Y4 is the height above the bottom of the container of the outer edge of plate 10; and Y5 is the overall height of the container. Similarly, X1 indicates the distance from center of the origin of radius of curvature R1. Likewise, X2 and X3 indicate respectively, the distance from the center of the plate of the origins of radii of curvature R2 and R3. X4 indicates the overall radius (½ D) of the container.

Abbreviations and Additional Shapes

In the examples which follow, plates having generally the profiles described above were compared, and plates having other profiles were compared by FEA analysis. In the following Table 1, the various shapes are referred to by "nominal" diameter of the container. A 9" nominal diameter plate typically has a diameter between about 8½" to about 8¾", while a 10" nominal diameter plate typically has a diameter between about 10" and 10¼". The following abbreviations and descriptions are used to describe generally the various products in Tables 2 through 5:

TABLE 1

Figure 11A:
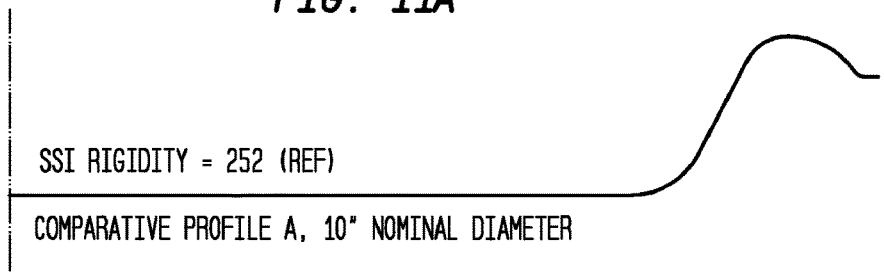
FIGS. 11A-D are diagrams illustrating product profiles used for Finite Element Analysis (FEA) rigidity modeling.
Figure 11B:
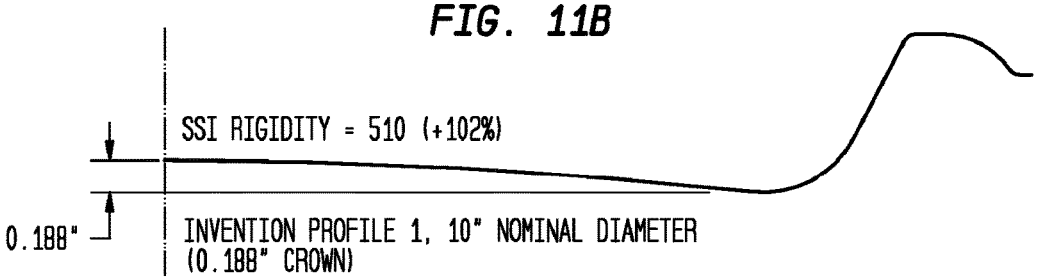
Figure 11C:
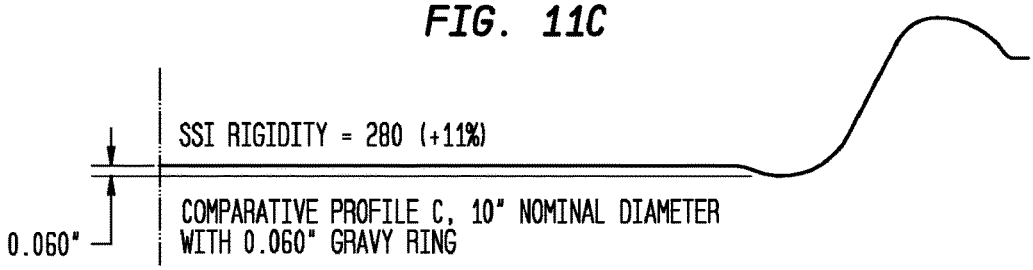
Figure 11D:
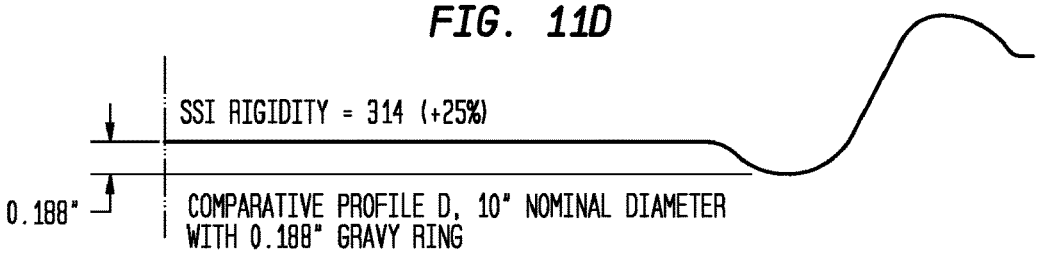

| Nominal 9" and 10" Plate Profile Definitions | |
|---|---|
| CPA, 10" | refers to a 10" diameter plate having the shape of Comparative Profile A |
| CPA, 9" | refers to a 9" diameter plate having the shape of Comparative Profile A |
| CPB, 10" | refers to a 10" diameter plate having the shape of Comparative Profile B |
| CPB, 9" | refers to a 9" diameter plate having the shape of Comparative Profile B |
| CPC or Comparative Profile C | refers to plates having a gravy ring of 60 mils height, being otherwise similar to plates of Comparative Profile A; see FIG. 11C |
| CPD or Comparative Profile D | refers to plates having a gravy ring of 188 mils height, being otherwise similar to plates of Comparative Profile A; see FIG. 11D |
| IP1, 10" | refers to a 10" diameter plate having the shape of Invention Profile 1 |
| IP1, 9" | refers to a 9" diameter plate having the shape of Invention Profile 1 |
| IP2, 10" | refers to a 10" diameter plate having the shape of Invention Profile 2 |
| IP2, 9" | refers to a 9" diameter plate having the shape of Invention Profile 2 |
| IP3, 10" | refers to a 10" diameter plate having the shape of Invention Profile 1, except having a generally planar bottom panel |
| IP4, 10" | refers to a 10" diameter plate having the shape of Invention Profile 2, except having a larger R2 radius; see Table 2 |
| IP5, 9" | refers to a 9" diameter plate having generally the shape of Invention Profile 2, except having a generally planar bottom panel |
| IP6, 10" | refers to a 10" plate having the shape of Invention Profile 1, except using a larger R2 radius |

TABLE 2

Die Side Profile Dimensions
(Refer to FIGS. 1A and following for appropriate shape)

| Shape | CPA, 10" | IP3, 10" (w/o Crown) | IP1, 10" (0.188 Crown) | CPB, 10" | IP4, 10" (0.188 Crown) | CPA, 9" | IP1, 9" (0.159 Crown) | CPB, 9" | IP5, 9" | IP2, 9" (0.159 Crown) |
|---|---|---|---|---|---|---|---|---|---|---|
| R0 | N/A | N/A | 31.0822 | N/A | 34.0773 | N/A | 25.4837 | N/A | N/A | 27.1991 |
| X0 | N/A | N/A | 0.0000 | N/A | 0.0000 | N/A | 0.0000 | N/A | N/A | 0.0000 |
| Y0 | N/A | N/A | −30.8942 | N/A | −33.8893 | N/A | −25.3248 | N/A | N/A | −27.0401 |
| R1 | 0.4327 | 0.5917 | 0.5917 | 0.5924 | 0.5924 | 0.3657 | 0.5650 | 0.4991 | 0.6250 | 0.6250 |
| X1 | 3.5814 | 3.4459 | 3.4459 | 3.6056 | 3.6056 | 3.0265 | 2.8726 | 3.0467 | 2.9703 | 2.9703 |
| Y1 | 0.4327 | 0.5917 | 0.5917 | 0.5924 | 0.5924 | 0.3657 | 0.5650 | 0.4991 | 0.6250 | 0.6250 |
| R2 | 0.2603 | 0.0740 | 0.0740 | 0.2455 | 0.2455 | 0.2200 | 0.0625 | 0.2095 | 0.0620 | 0.0620 |
| X2 | 4.4774 | 4.3252 | 4.3252 | 4.5230 | 4.5230 | 3.7837 | 3.6551 | 3.8226 | 3.7331 | 3.7331 |
| Y2 | 0.6530 | 0.8393 | 0.8393 | 0.5400 | 0.5400 | 0.5518 | 0.7093 | 0.4548 | 0.6023 | 0.6023 |
| R3 | 0.4674 | 0.4674 | 0.4674 | 0.4427 | 0.4427 | 0.3950 | 0.3950 | 0.3761 | 0.3761 | 0.3761 |
| X3 | 4.4774 | 4.4774 | 4.4774 | 4.7095 | 4.7095 | 3.7837 | 3.7837 | 3.9799 | 3.9799 | 3.9799 |
| Y3 | 0.4459 | 0.4459 | 0.4459 | 0.3428 | 0.3428 | 0.3768 | 0.3768 | 0.2882 | 0.2882 | 0.2882 |
| R4 | 0.0740 | 0.0740 | 0.0740 | N/A | N/A | 0.0625 | 0.0625 | N/A | N/A | N/A |
| X4 | 4.9227 | 4.9227 | 4.9227 | 5.0929 | 5.0896 | 4.1600 | 4.1600 | 4.3044 | 4.3044 | 4.3002 |
| Y4 | 0.7538 | 0.7538 | 0.7538 | 0.5642 | 0.5698 | 0.6370 | 0.6370 | 0.4782 | 0.4782 | 0.4853 |
| X5 | 5.0002 | 4.9968 | 4.9900 | N/A | N/A | 4.2255 | 4.2248 | N/A | N/A | N/A |
| Y5 | 0.6798 | 0.6798 | 0.6798 | 0.7855 | 0.7855 | 0.5745 | 0.5745 | 0.6643 | 0.6643 | 0.6643 |

In FIGS. 7A-D, the various profiles of Invention Profile 1 (IP1), Invention Profile 2 (IP2), Comparative Profile A (CPA) and Comparative Profile B (CPB), are shown from center for 9" nominal diameter plates to provide an appreciation of the various shapes. In FIGS. 8A-D, these profiles are overlaid. That is, the IP1, 9" shape is compared with the CPA, 9" shape in FIG. 8A and the IP2, 9" shape is compared with the CPB, 9" shape in FIG. 8B. It is seen that the Invention Profiles use substantially the same amount of material as the comparable profiles and the products have more or less identical overall dimensions. However, it will be seen in the Examples which follow that the invention plates exhibit remarkably increased strength, rigidity and load carrying capability as compared with conventional containers.

Rigidity and Rim Stiffness

Plates of the invention and plates of like design without an arched bottom panel and/or a sharp R2 radius were evaluated for SSI Rigidity and Rim Stiffness. SSI Rigidity is expressed in grams/0.5" and is measured with the Single Service Institute Plate Rigidity Tester of the type originally available through Single Service Institute, 1025 Connecticut Ave., N.W., Washington, D.C. The SSI rigidity test apparatus has been manufactured and sold through Sherwood Tool, Inc., Kensington, Conn. This test is designed to measure the rigidity (i.e., resistance to buckling and bending) of paper and plastic plates, bowls, dishes, and trays by measuring the force required to deflect the rim of these products a distance of 0.5" while the product is supported at its geometric center. Specifically, the plate specimen is restrained by an adjustable bar on one side and is center supported. The rim or flange side opposite to the restrained side is subjected to 0.5" deflection by means of a motorized cam assembly equipped with a load cell, and the force (grams) is recorded. The test simulates in many respects the performance of a container as it is held in the hand of a consumer, supporting the weight of the container's contents. SSI rigidity is expressed as grams per 0.5" deflection. A higher SSI value is desirable since this indicates a more rigid product. All measurements were done at standard TAPPI conditions for paperboard testing, 72° F. and 50% relative humidity. Geometric mean averages (square root of the MD/CD product) values are reported herein.

FPI Rigidity (0.5" deflection) is measured in the same way as SSI Rigidity using a Food Service Packaging Institute Rigidity Tester, available from or through the Food Service Packaging Institute, 150 S. Washington Street, Suite 204, Falls Church, Va. 22046.

For Wet Rigidity the specimen is conditioned as above, then filled with water at 160° F. for 30 minutes, drained and tested. For 10" plates, 130 ml of hot water is used. The % moisture pickup is determined by weighing a specimen before and after treatment with hot water for 30 minutes as specified.

The particular apparatus employed for SSI rigidity measurements was a Model No. ML-4431-2 SSI rigidity tester as modified by Georgia-Pacific Corporation, National Quality Assurance Lab, Lehigh Valley Plant, Easton, Pa. 18040 using a Chatillon gauge available from Chatillon, Force Measurements Division, P.O. Box 35668, Greensboro, N.C. 27425-5668.

Rim Stiffness is a measure of the local rim strength about the periphery of the container as opposed to overall or SSI rigidity. This test has been noted to correlate well with actual consumers' perception of product sturdiness. SSI rigidity is one measure of the load carrying capability of the plate, whereas Rim Stiffness often relates to what a consumer feels when flexing a plate to gauge its strength. (Plates with higher Rim Stiffness have also demonstrated greatly improved weight carrying capabilities under simulated use testing, described hereinafter.) Preferably, specimens are conditioned and testing performed at standard conditions for paperboard testing when a paper container is tested, 72° F. and 50% relative humidity.

Figure 9:
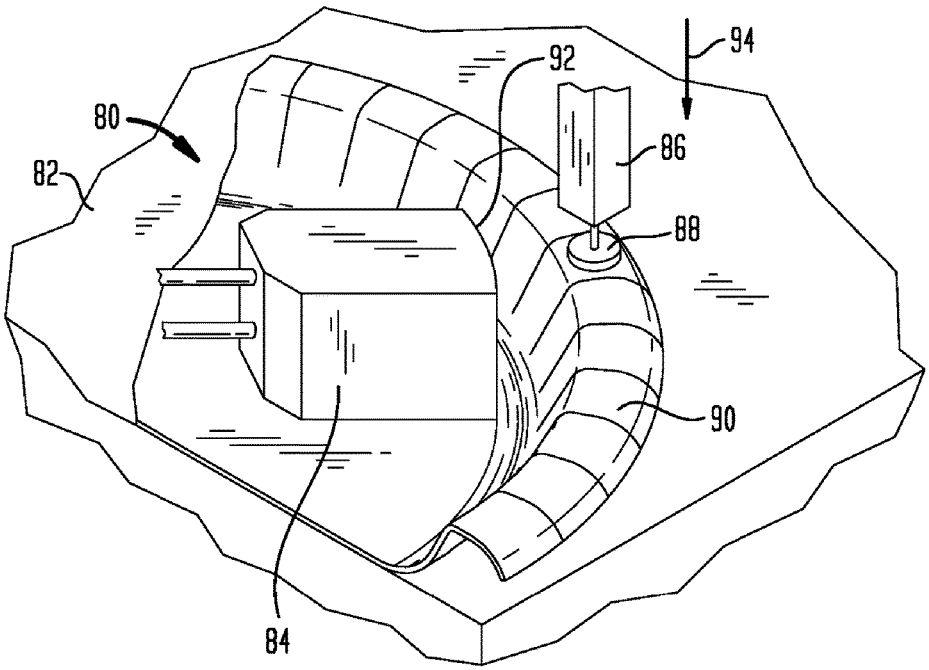
FIG. 9 is a schematic diagram illustrating a portion of an apparatus for determining Rim Stiffness.

The particular apparatus employed is referred to as a Rim Stiffness instrument, developed by Georgia-Pacific, Neenah Technical Center, 1915 Marathon Avenue, Neenah, Wis. 54956. This instrument includes a micrometer which reads to 0.001" available from Standard Gage Co., Inc., 70 Parker Avenue, Poughkeepsie, N.Y. 12601, as well as a load gauge available from Chatillon, Force Measurements Division, P.O. Box 35668, Greensboro, N.C. 27425-5688. The test procedure measures the force to deflect the rim downwardly 0.1" as the specimen is restrained about its bottom between a platen and a restraining member as will be further appreciated by reference to FIG. 9.

Rim Stiffness instrument 80 includes generally a platen 82, a plurality of restraining members, preferably four equally spaced restraining members such as member 84 and a gauge 86 provided with a probe 88. A specimen such as plate 90 is positioned as shown and clamped tightly about its planar bottom portion to platen 82 by way of restraining members, such as member 84. The specimen is clamped over an area of several square inches or so such that the bottom of the specimen is fully restrained inwardly from the first transition portion. Note that restraining member 84 is disposed such that its outer edge 92 is positioned at the periphery of the serving area of the container, that is, at X1 in FIG. 2G, the radius of the bottom of the container.

Probe 88 is then advanced downwardly in the direction of arrow 94 a distance of 0.1" while the force is measured and recorded by gauge 86. Only the maximum force is recorded, typically occurring at the maximum deflection of 0.1". Probe 88 is preferably positioned in the center of the flange of plate 90 or on a high point of the flange as appropriate. The end of the probe may be disk-shaped or of other suitable shape and is preferably mounted on a universal-type joint so that contact with the rim is maintained during testing. Probe 88 is generally radially aligned with restraining clamp member 84.

Comparisons of Rigidity and Rim Stiffness of plates of the invention with comparative plates of like design appear in Tables 3, 4 and 5, below. In some cases, finite element analysis (FEA) was used instead of actual specimens.

Instron Container (Plate) Rigidity and Center Arch Stiffness

Plates of the invention were also evaluated with an Instron® tester for rigidity. The Instron Container or Plate Rigidity for various plates was determined in accordance with the SSI Rigidity test described above, except the force at a given deflection was monitored continuously using a ½" diameter flat bottom probe versus a single point value for the standard Rigidity test. This test provides a simulation of the flexing a consumer experiences when the plate is in use.

Plates were further tested for Center Arch Stiffness. For this test, a plate was inverted and placed on a flat surface while a ⅝" diameter spherical bottom probe was used to deflect the plate downwardly at its center. This test simulates the feel a consumer experiences when a plate is loaded with food while the plate is supported at its center by the fingertips, for example.

Load to Failure Testing

Plates of the present invention and various conventional plates were tested for their ability to support a simulated food load. Load to failure testing involved securing the plate at one side while supporting its bottom panel at center (1 hand test) and loading the plate with weights to simulate a food load until failure occurred. The load causing failure is reported as the maximum load; "failure" being determined as the point at which the plate buckled or otherwise could not support the load. The test is better understood with reference to FIGS. 10A and 10B.

Figure 10A:
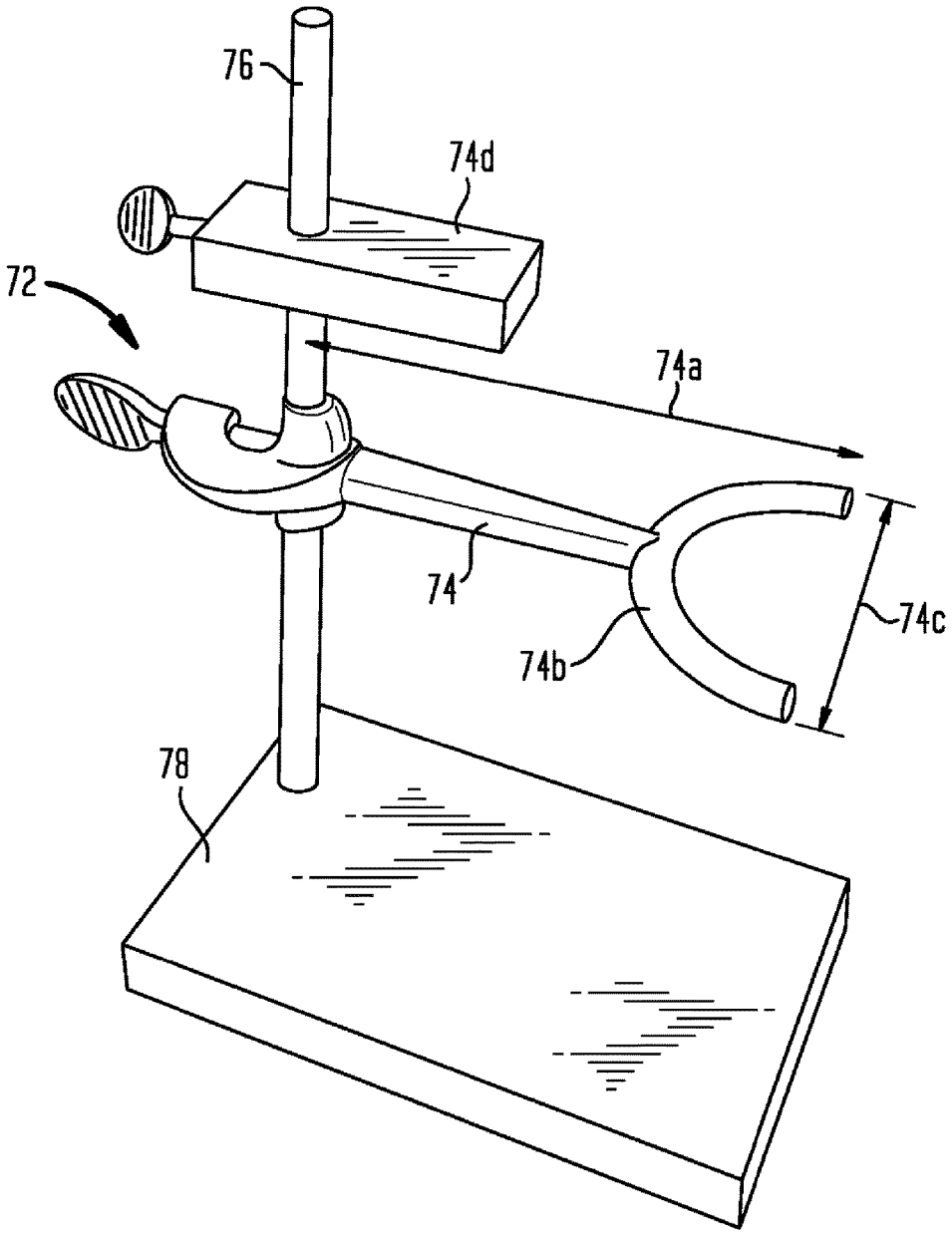
FIG. 10A is a schematic diagram illustrating an apparatus used for measuring load-bearing capability of disposable plates.

The apparatus 72 used to measure load to failure includes a supporting arm 74 which is clamped to a post 76 which is mounted on a base 78 as shown in FIG. 10A. Supporting arm 74 extends outwardly a distance 74a from post 76 of about 4⅛". The arm further defines a supporting fork 74b which has a supporting span 74c across the fork of about 2⅝" (center to center). Further provided is a clamping member 74d used to secure a plate such as plate 10 in apparatus 72.

Figure 10B:
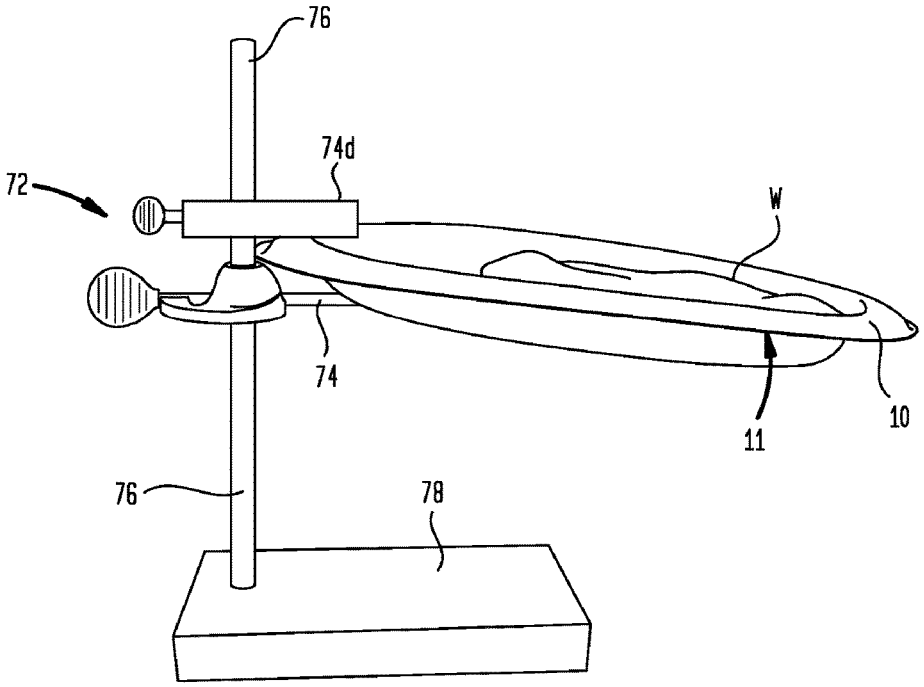
FIG. 10B is a schematic diagram illustrating testing of load-bearing capability of a plate utilizing the apparatus of FIG. 10A.

In FIG. 10B a plate 10 is shown in mounted in apparatus 72 wherein fork 74b supports plate 10 in its central area and the plate abuts post 76. To determine load-bearing capability, weights such as weight W are used to simulate a food load on an outer portion 11 of plate 10. Weights are added in small increments (¼ lb) until the plate fails. The load just before the load causing failure (lbs) is recorded as the 1 Hand Hold Maximum Dry Weight for this test.

Details and results appear in Tables 4 and 5 below.

While this test is somewhat more qualitative than those noted above for Rigidity, Rim Stiffness, Instron Plate Rigidity and Center Arch Stiffness, results again show that the plates of the invention are significantly stronger than plates of like basis weight of the prior art.

Computer Modeling/Plate Strength:

Computer finite element analysis modeling (FEA) was used to screen pressware plate, tray and bowl shape/profiles for strength. The computer model provides relative strength values to quickly screen different plate shapes. This is extremely useful to determine plate shapes that provide enhanced strength since there are a multiplicity of infinities of plate shapes resulting from combinations of individual dimensions. Paperboard is a relatively complex material to define in terms of mechanical properties. It is anisotropic having different tensile, flexural modulii and other physical properties in its machine, cross machine directions and through its thickness. Pleats that result during material gathering for pressware products are also extremely difficult to computer model. A simplified FEA model is used, that assumes isotropic, homogeneous material properties, and pleatless forming. For purposes of comparing the various geometries, FEA rigidity modeling was performed on shapes having the profiles indicated in FIGS. 11A-D and Tables 1 and 2. Results appear in Table 3 as well as in FIGS. 12 and 13. It should be understood that FEA, at least as far as paper plates are concerned, is a screening tool whose predictions are a useful guide to exploration, but must be verified empirically.

TABLE 3

FEA Results

| Container | Arcuate Crown (inches) | SSI Rigidity (grams/.5" deflection) (calculated) |
|---|---|---|
| CPA, 10" | 0.000 | 252 (Ref.) |
| IP6, 10" | 0.060 | 312 (+24%) |
| IP6, 10" | 0.094 | 343 (+36%) |
| IP6, 10" | 0.125 | 369 (+46%) |
| IP6, 10" | 0.188 | 414 (+64%) |
| IP6, 10" | 0.250 | 451 (+79%) |
| CPC, 10" | 0.060 | 280 (+11%) |
| (With 0.188" Gravy Ring & Horizontal Center Portion) | | |
| CPD, 10" | 00.188 | 314 (+25%) |
| IP3, 10" | 0.000 | 302 (+20%) |
| (With small R2 radius) | | |
| IP1, 10" | 0.060 | 384 (+52%) |
| IP1, 10" | 0.125 | 455 (+80%) |
| IP1, 10" | 0.188 | 510 (+102%) |
| IP1, 10" | 0.250 | 555 (+120%) |
| 10" Commercial Pulp Molded | 0.000 | 219 (−13%) |
| (Based on Approximated shape) | | |
| CPB, 10" | 0.000 | 258 (Ref.) |
| (Linear sidewall with arcuate outer) | | |
| IP4, 10" | 0.060 | 324 (+26%) |
| IP4, 10" | 0.125 | 382 (+48%) |
| IP4, 10" | 0.188 | 427 (+66%) |
| IP4, 10" | 0.250 | 461 (+77%) |
| CPB, 9" | 0.000 | 163 (Ref.) |
| (Linear sidewall with arcuate outer) | | |
| 20 oz. Bowl | 0.000 | 1127 (Ref.) |
| 20 oz. Bowl | 0.060 | 1403 (+25%) |
| 20 oz. Bowl | 0.125 | 1675 (+48%) |

Figure 12:
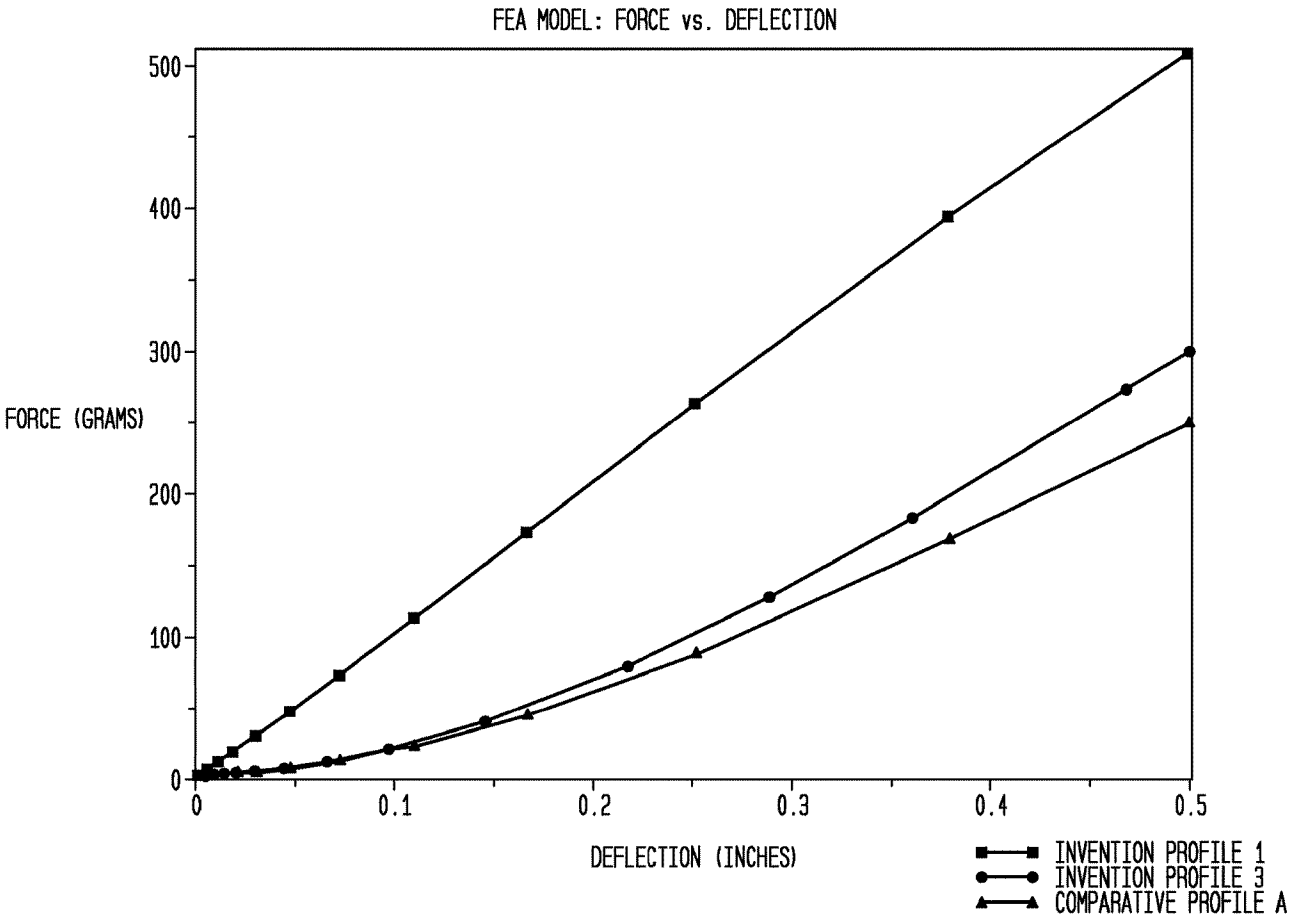
FIG. 12 is a plot of FEA modeling force versus deflection for various plates.
Figure 13:
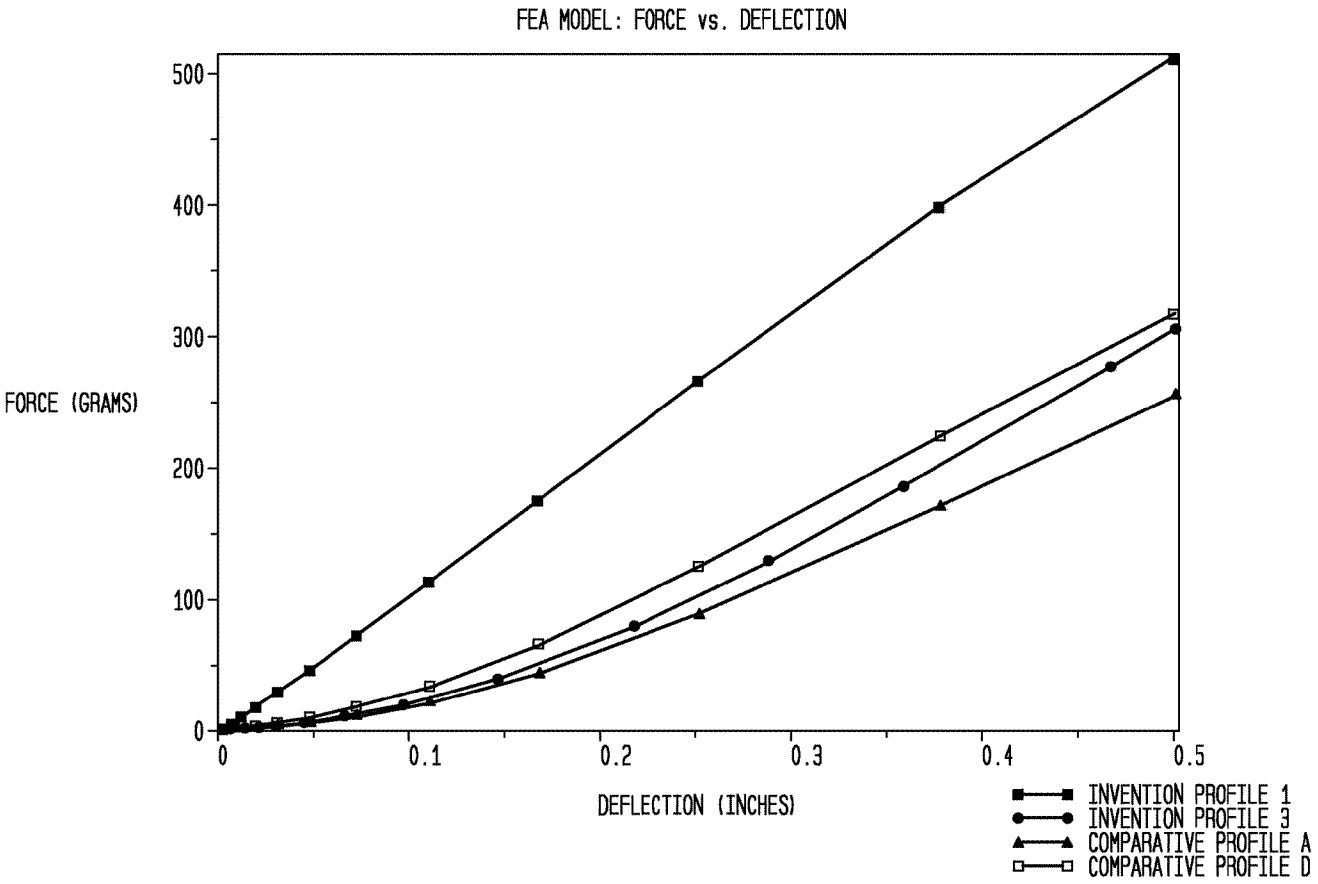
FIG. 13 is another plot of FEA modeling force versus deflection for various plates.

It is seen in Table 3 as well as FIGS. 12 and 13 that the Invention Profile plates show much more Rigidity than corresponding Comparative Profile plates, with or without a gravy ring with a horizontal span across the center of the container.

Table 4—Pressed Paperboard Plate Test Data

Pressed paperboard plates were produced using standard processing techniques described below, with control and trial/inventive shaped tooling for the inventive containers and various other shapes using a single-plate pilot press apparatus. Results are summarized in Table 4.

TABLE 4

Single Die Trials

| Description | Basis Weight (lbs/3000 ft$^2$) | Caliper (mils) | SSI Rigidity (grams/.5") | Wet Rigidity - Water (grams/.5") | Rim Stiffness (grams/.1") | 1 Hand Hold Maximum - Dry Weight (lbs) |
|---|---|---|---|---|---|---|
| (pulp molded control) | 257 (+12%) | 26.7 (+33%) | 444 (+33%) | 187 (−7%) | 2417 (+30%) | 3.25 (+18%) |
| CPA, 10" (control) | 229 (Ref.) | 20.1 (Ref.) | 335 (Ref.) | 201 (Ref.) | 1865 (Ref.) | 2.75 (Ref.) |
| IP3, 10" (w/o Crown) | 229 (+0%) | 20.2 (+1%) | 412 (+23%) | 228 (+13%) | 2250 (+21%) | 3.25 (+18%) |
| IP1, 10" (w/Crown) | 227 (−1%) | 20.2 (+1%) | 479 (+43%) | 238 (+18%) | 2227 (+19%) | 3.00 (+9%) |
| CPA, 10" | 258 (+13%) | 24.1 (+20%) | 351 (+5%) | 206 (+3%) | 1823 (−2%) | 3.25 (+18%) |
| IP3, 10" (w/o Crown) | 252 (+11%) | 23.7 (+18%) | 462 (+38%) | 240 (+19%) | 2518 (+35%) | 3.75 (+36%) |
| IP1, 10" (w/Crown) | 251 (+10%) | 23.7 (+18%) | 531 (+59%) | 232 (+15%) | 2429 (+30%) | 3.50 (+27%) |

Here, again, it is seen that the invention plates exhibit surprising Wet and Dry Rigidity, Rim Stiffness and maximum load carrying characteristics. The strength increases greatly outpace strength gains seen from increasing basis weight.

Another series of trials were performed using a commercial multi-plate press. Details and results appear in Table 5, below.

TABLE 5

Multi-Up Die Trials

| Description | Basis Weight (lbs/3000 ft$^2$) | Caliper (mils) | SSI Rigidity (grams/.5") | Wet Rigidity - Water (grams/.5") | Rim Stiffness (grams/.1") | 1 Hand Hold Maximum - Dry Weight (lbs) |
|---|---|---|---|---|---|---|
| CPA, 10" | 232 (Ref.) | 20.5 (Ref.) | 363 (Ref.) | 173 (Ref.) | 1976 (Ref.) | 3.13 (Ref.) |
| IP1, 10" (w/Crown) | 233 (+0%) | 20.4 (−0%) | 544 (+50%) | 188 (+9%) | 2155 (+9%) | 3.92 (+25%) |
| CPA, 10" | 253 (+9%) | 23.3 (+14%) | 372 (+3%) | 226 (+31%) | 2076 (+5%) | 3.54 (+13%) |
| IP1, 10" (w/Crown) | 252 (+9%) | 23.8 (+16%) | 540 (+49%) | 255 (+47%) | 2219 (+12%) | 4.08 (+30%) |

In Table 5 it is seen the Dry Rigidity increases about 50% over the controls in both cases, with somewhat lesser gains in Wet Rigidity, Rim Stiffness and maximum load.

Commercially produced, nominal 10" diameter plates having Invention Profile 1 and Comparative Profile A were produced on the same production line using different die sets. Triplicate samples were tested for Instron Plate Rigidity and Center Arch Stiffness. Results appear in FIGS. 14-17.

Figure 14:
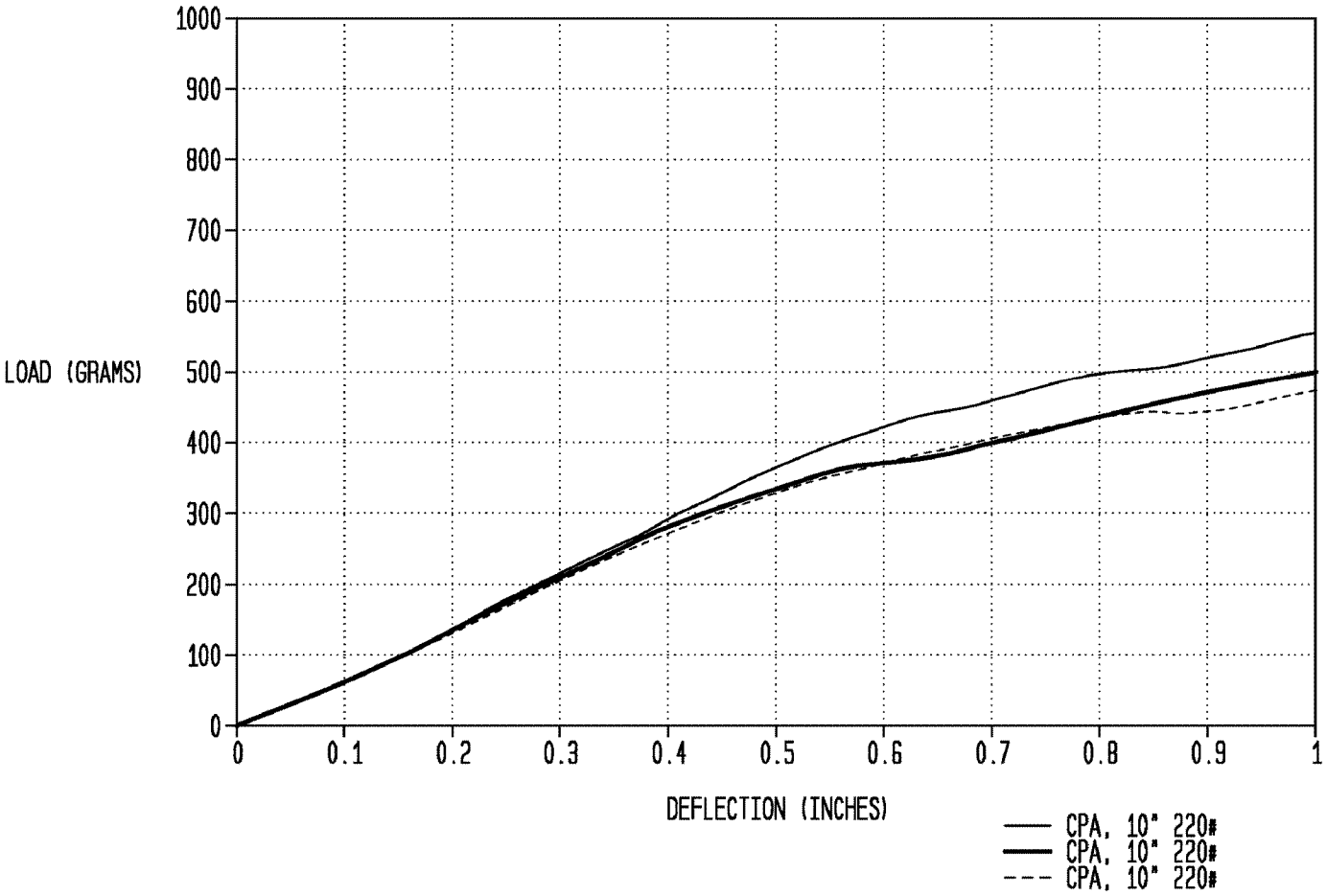
FIG. 14 is a plot of Instron Plate Rigidity, load versus deflection in inches, for triplicate samples of 10" Comparative Profile A 220 lb. basis weight plate.
Figure 15:
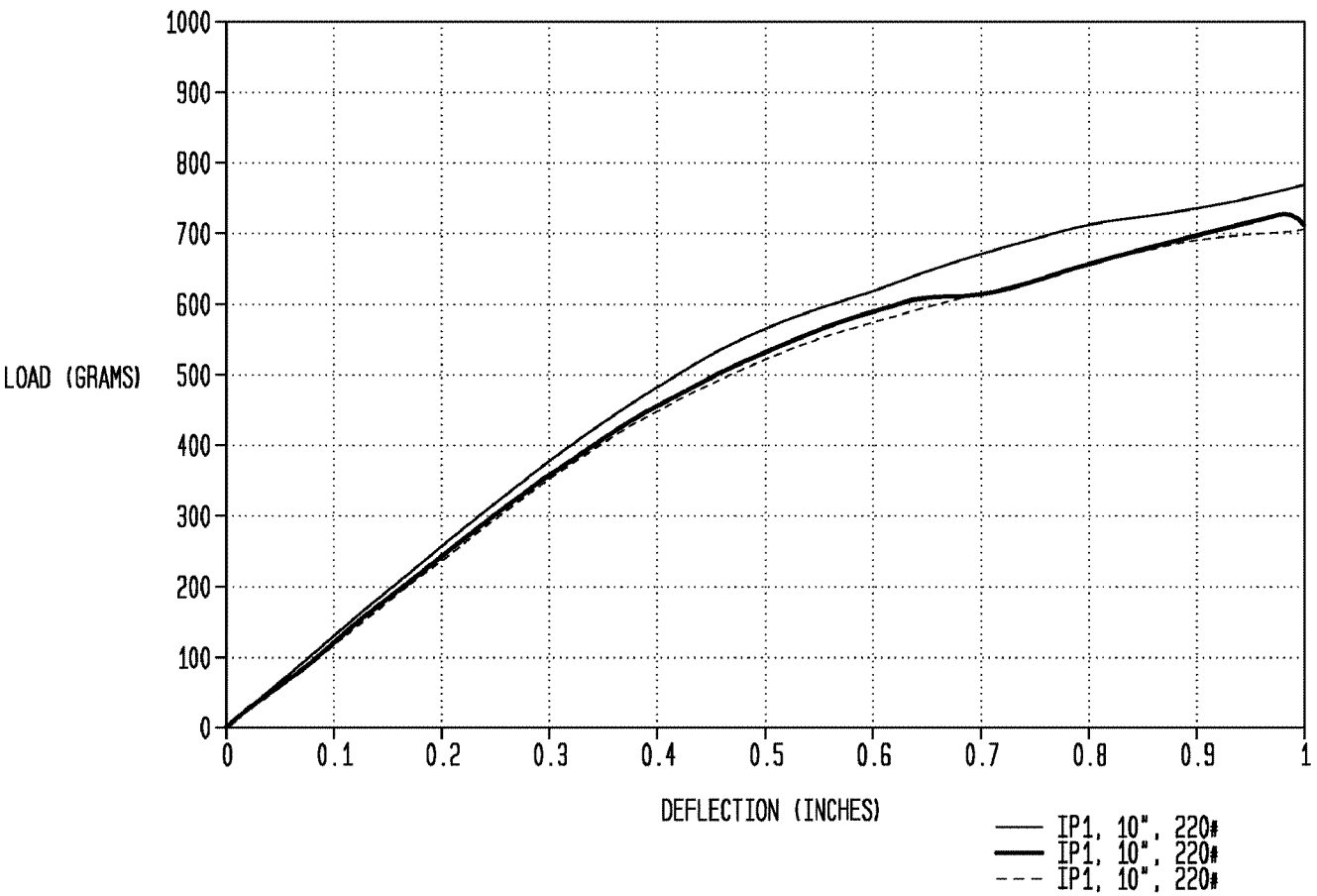
FIG. 15 is a plot of Instron Plate Rigidity, load versus deflection in inches, for triplicate samples of 10" Invention Profile 1 220 lb. basis weight plate.

It is seen by comparing FIGS. 14 and 15 that the Invention Profile 1 plates exhibited much more rigidity over its load profile at all levels of deflection; typically, at levels of 40% and more Rigidity than that of the Comparative Profile A plate.

Figure 16:
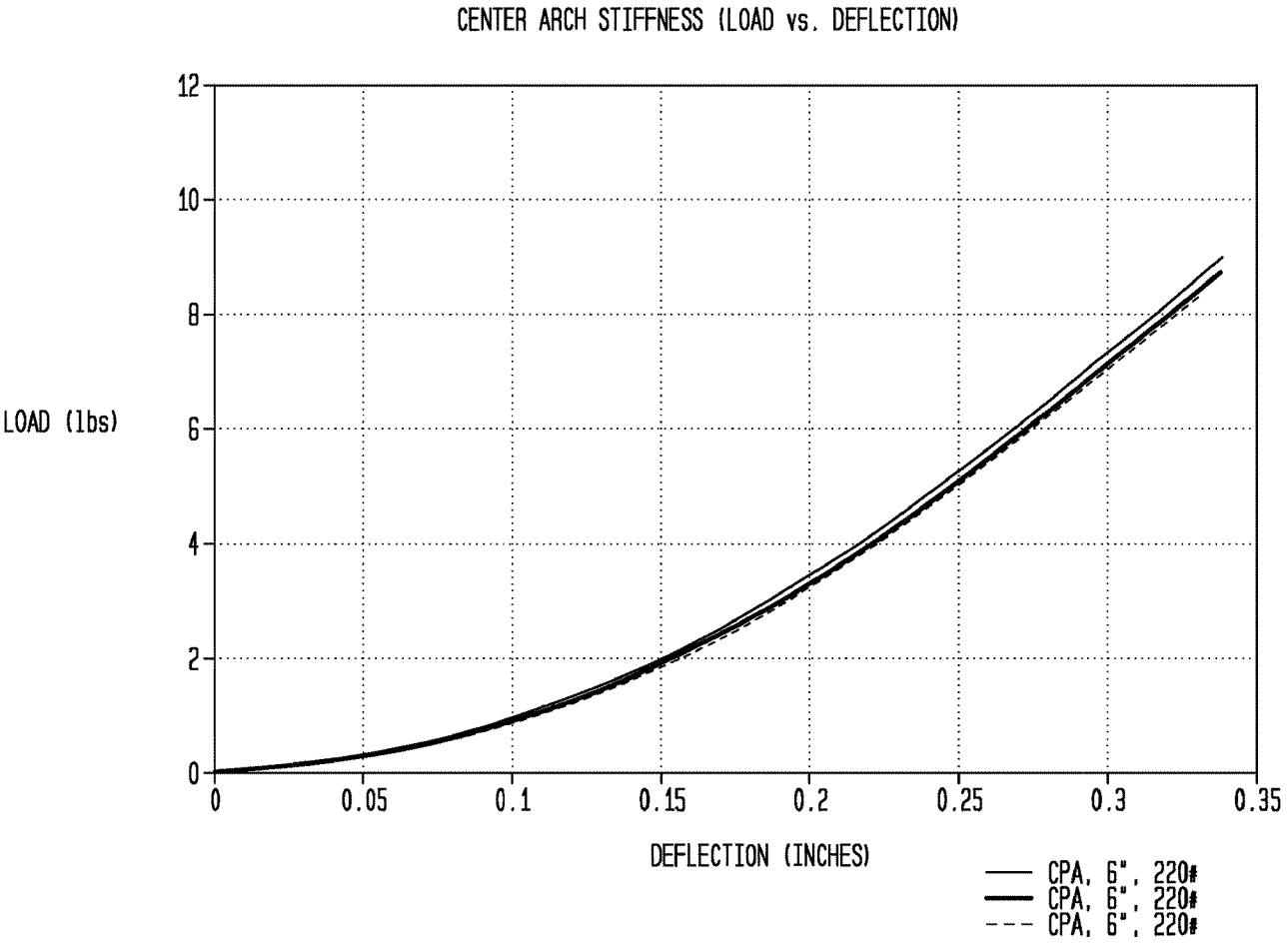
FIG. 16 is a plot of Center Arch Stiffness, load versus deflection, for triplicate samples of a 10" Comparative Profile A 220 lb. basis weight plate.
Figure 17:
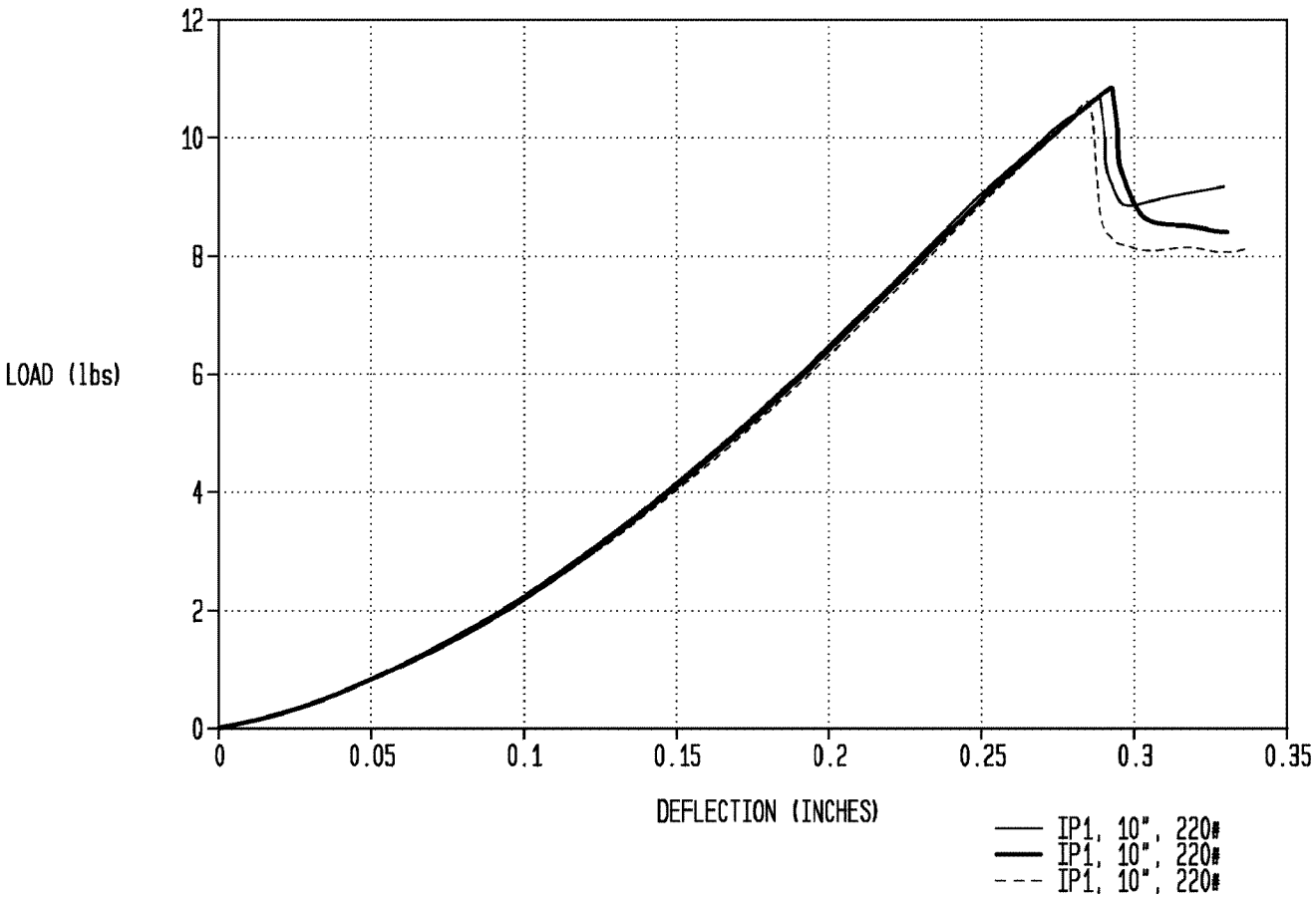
FIG. 17 is a plot of Center Arch Stiffness for triplicate samples of a 10" Invention Profile 1 220 lb basis weight plate.

Comparing FIGS. 16 and 17 it is seen that the plates of Invention Profile 1 exhibit Center Arch Stiffness resistance 70% greater than that of the Comparative Profile A plates over much of the range tested. The stiffness gains seen with the invention are surprising in view of the fact that the same amount of the same material was used and the plates define substantially the same volume.

Further examples and comparisons between plates of the invention and commercially available plates appear in Tables 6A-6C (the titles of each of these tables indicate the "nominal" diameter and basis weights of the plates being compared). The pressware plates of the invention were produced having an Invention Profile 1 shape and 9" and 10" nominal diameter. Pulp-molded commercially available plates having a product diameter of 8¾" and 10⅜" were acquired and tested for Rigidity, Rim Stiffness and so forth. Likewise, commercially available competitive plates having a 10" diameter and commercially available plates having a Comparative Profile A shape with 9" and 10" nominal diameter were characterized. In all cases, multiple samples were used and the results averaged.

TABLE 6A

Nominal 9" 210 lb. Plate Data

| Description | Basis Weight (lbs/ream) | Caliper (mils) | SSI Rigidity (grams/.5") | SSI Wet Rigidity Water (grams/.5") | FPI Rigidity (grams/.5") | FPI Wet Rigidity Water (grams/.5") | Water Resistance (% Pickup) | Rim Stiffness (grams/.1") | 1 Hand Hold Maximum - Dry Weight (lbs) |
|---|---|---|---|---|---|---|---|---|---|
| 8¾" Commercial Pulp Molded | 218<br>1.4% | 24.1<br>28.9% | 424<br>26.9% | 158<br>−37.1% | 375<br>33.9% | 142<br>−30.4% | 18.0<br>300.0% | 2018<br>11.3% | 3.8<br>−43.3% |
| Comparative Profile A 8½" | 215<br>Ref. | 18.7<br>Ref. | 334<br>Ref. | 251<br>Ref. | 280<br>Ref. | 204<br>Ref. | 4.5<br>Ref. | 1813<br>Ref. | 6.7<br>Ref. |
| Invention Profile 1, 8½" | 216<br>0.5% | 18.7<br>0.0% | 505<br>51.2% | 318<br>26.7% | 444<br>58.6% | 242<br>18.6% | 6.2<br>37.8% | 1906<br>5.1% | 8.2<br>22.4% |

TABLE 6B

Nominal 9" 180 lb. Plate Data

| Description | Basis Weight (lbs/ream) | Caliper (mils) | SSI Rigidity (grams/.5") | SSI Wet Rigidity Water (grams/.5") | FPI Rigidity (grams/.5") | FPI Wet Rigidity Water (grams/.5") | Water Resistance (% Pickup) | Rim Stiffness (grams/.1") | 1 Hand Hold Maximum - Dry Weight (lbs) |
|---|---|---|---|---|---|---|---|---|---|
| Comparative Profile A 8½" | 184<br>Ref. | 16.2<br>Ref. | 186<br>Ref. | 132<br>Ref. | 153<br>Ref. | 115<br>Ref. | 6.3<br>Ref. | 1041<br>Ref. | 2.7<br>Ref. |
| Invention Profile 1, 8½" | 185<br>0.5% | 16.4<br>1.2% | 344<br>84.9% | 182<br>37.9% | 301<br>96.7% | 127<br>10.4% | 9.3<br>47.6% | 1326<br>27.4% | 5.0<br>85.2% |

TABLE 6C

Nominal 10" 220 lb. Plate Data

| Description | Basis Weight (lbs/ream) | Caliper (mils) | SSI Rigidity (grams/.5") | Wet Rigidity Water (grams/.5") | SSI FPI Rigidity (grams/.5") | Wet Rigidity Water (grams/.5") | FPI Water Resistance (% Pickup) | Rim Stiffness (grams/.1") | 1 Hand Hold Maximum - Dry Weight (lbs) |
|---|---|---|---|---|---|---|---|---|---|
| 10⅜" Commercial Pulp Molded Plate | 242<br>5.7% | 25.5<br>25.6% | 404<br>25.5% | 165<br>−32.7% | 356<br>23.6% | 147<br>−27.6% | 17.5<br>337.5% | 1664<br>4.1% | 2.4<br>−27.3% |
| Comparative Profile A, 10¹⁄₁₆" | 229<br>Ref. | 20.3<br>Ref. | 322<br>Ref. | 245<br>Ref. | 288<br>Ref. | 203<br>Ref. | 4.0<br>Ref. | 1598<br>Ref. | 3.3<br>Ref. |
| Invention Profile 1, 10¹⁄₁₆" | 227<br>−0.9% | 20.2<br>−0.5% | 521<br>61.8% | 434<br>77.1% | 446<br>54.9% | 337<br>66.0% | 3.0<br>−25.0% | 2071<br>29.6% | 3.8<br>15.2% |
| Competitive Commercial Pressware, 10¼" | 226<br>−1.3% | 20.6<br>+1.5% | 163<br>−49.4% | 119<br>−51.4% | 137<br>−52.4% | 80<br>−60.6% | 13.8<br>+245% | 874<br>−45.3% | 1.9<br>−42.4% |

Here again, it is seen that the plates of the invention exhibit surprising Dry and Wet Rigidity and Rim Stiffness as compared with competitive commercial pressware and pressware of similar weight and caliper having a Comparative Profile A shape. Even more remarkable is that the plates of this invention exhibit more Rigidity than pulp-molded plates of comparable basis weight having generally higher caliper. This aspect of the invention is contrary to conventional wisdom in that pulp-molded plates are generally expected to be more rigid than pressware plates of similar weight and shape because the pulp molded products have more caliper (which contributes to stiffness at a given weight) and they do not have pleats which can provide lines of weakness. Indeed, the relatively poor water resistance of pulp-molded plates is tolerated generally because of their higher dry strength for a given weight and shape. With this invention, dry strength levels exceeding those of pulp-molded plates of similar weight are achieved, along with far superior water resistance and wet strength as is appreciated from Tables 6A-6C.

Fabrication

The present invention typically employs segmented dies generally as is known and further discussed herein. Manufacture from coated paperboard is preferred. Clay coated paperboard is typically printed, coated with a functional grease/water resistant barrier and moistened prior to blanking and forming. The printed, coated and moistened paperboard roll is then transferred to a web fed press where the blanks are cut in a straight across, staggered, or nested pattern (to minimize scrap). The blanks are transferred to the multi-up forming tool via individual transfer chutes. The blanks will commonly hit against blank stops (rigid or pin stops that can rotate) for final positioning prior to forming. The stop heights and locations are chosen to accurately locate the blank and allow the formed product to be removed from the tooling without interference. Typically the inner portions of the blank stops or inner blank stops are lower in height since the formed product must pass over them as described in U.S. Pat. No. 6,592,357 to Littlejohn et al.

Instead of web forming, blanks could be rotary cut or reciprocally cut off-line in a separate operation. The blanks could be transferred to the forming tooling via transfer chutes using a blank feed style press. The overall productivity of a blank feed style press is typically lower than a web feed style press since the stacks of blanks must be continually inserted into the feed section, the presses are commonly narrow in width with fewer forming positions available; and the forming speeds are commonly less since fluid hydraulics are typically used versus mechanical cams and gears.

The following co-pending patents and patent applications contain further information as to materials, processing techniques and equipment and are also incorporated by reference: U.S. Pat. No. 7,048,176, entitled "Deep Dish Disposable Pressed Paperboard Container"; U.S. Pat. No. 6,893,693, entitled "High Gloss Disposable Pressware"; U.S. Pat. No. 6,733,852, entitled "Disposable Serving Plate With Sidewall-Engaged Sealing Cover"; U.S. Pat. No. 6,715,630, entitled "Disposable Food Container With A Linear Sidewall Profile and an Arcuate Outer Flange"; U.S. Pat. No. 6,474,497, entitled "Smooth Profiled Food Service Article"; U.S. Pat. No. 6,592,357, entitled "Rotating Inertial Pin Blank Stops for Pressware Die Set"; U.S. Pat. No. 6,589,043, entitled "Punch Stripper Ring Knock-Out for Pressware Die Sets"; U.S. Pat. No. 6,585,506, entitled "Side Mounted Temperature Probe for Pressware Die Set"; U.S. application Ser. No. 11/465,694 (Publication No. US 2007/0042072 A1), entitled "Pressware Forming Apparatus, Components Therefore and Methods of Making Pressware Therefrom"; and U.S. Pat. No. 7,337,943, entitled "Disposable Servingware Containers with Flange Tabs". See also, U.S. Pat. No. 5,249,946; U.S. Pat. No. 4,832,676; U.S. Pat. No. 4,721,500; and U.S. Pat. No. 4,609,140, which are particularly pertinent.

The product of the invention is advantageously formed with a heated matched pressware die set utilizing inertial rotating pin blank stops as described in U.S. Pat. No. 6,592,357, issued Jul. 15, 2003, entitled "Rotating Inertial Pin Blank Stops for Pressware Die Sets". For paperboard plate stock of conventional thicknesses in the range of from about 0.010" to about 0.040", the springs upon which the lower die half is mounted are typically constructed such that the full stroke of the upper die results in a force applied between the dies of from about 6000 to 14,000 pounds or higher. Similar forming pressures and control thereof may likewise be accomplished using hydraulics as will be appreciated by one of skill in the art. The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream, usually up to about 300 pounds per 3000 square foot ream, and a thickness or caliper in the range of from about 0.010" to about 0.040" as noted above. Lower basis weight paperboard is preferred for ease of forming and to save on feedstock costs. Paperboard stock utilized for forming paper plates is typically formed from bleached pulp fiber and is usually double clay coated on one side. Such paperboard stock commonly has a moisture (water content) varying from about 4.0 to about 8.0 percent by weight prior to moistening.

The effect of the compressive forces at the rim is greatest when the proper moisture conditions are maintained within the paperboard: preferably at least 8% and less than 12% water by weight, and more preferably 9.0 to 10.5%. Paperboard having moisture in this range has sufficient moisture to deform and rebond under sufficient temperature and pressure, but not such excessive moisture that water vapor interferes with the forming operation or that the paperboard is too weak to withstand the forces applied. To achieve the desired moisture levels within the paperboard stock as it comes off the roll, the paperboard is treated by spraying or rolling on a moistening solution, primarily water, although other components such as lubricants may be added. The moisture content may be monitored with a hand held capacitive type moisture meter to verify that the desired moisture conditions are being maintained or the moisture is monitored by other suitable means, such as an infra-red system. It is preferred that the plate stock not be formed for at least six hours after moistening to allow the moisture within the paperboard to equilibrate.

Because of the intended end use of the products, the paperboard stock is typically impregnated with starch and coated on one side with a liquid proof layer or layers comprising a press-applied, water-based coating applied over the inorganic pigment typically applied to the board during manufacturing. Carboxylated styrene-butadiene resins may be used with or without filler if so desired. In addition, for esthetic reasons, the paperboard stock is often initially printed before being coated with an overcoat layer. As an example of typical coating material, a first layer of latex coating may be applied over the printed paperboard with a second layer of acrylic coating applied over the first layer. These coatings may be applied either using the conventional printing press used to apply the decorative printing or may be applied using some other form of a conventional press coater. Preferred coatings utilized in connection with the invention may include 2 pigment (clay) containing layers, with a binder, of about 6 lbs/3000 $ft^2$ ream or so followed by 2 acrylic layers of about 0.5-1 lbs/3000 $ft^2$ ream. The clay containing layers are provided first during board manufacture and the acrylic layers are then applied by press coating methods, i.e., gravure, coil coating, flexographic methods and so forth as opposed to extrusion or film laminating methods which are expensive and may require off-line processing as well as large amounts of coating material. An extruded film, for example, may require 25 lbs/3000 $ft^2$ ream.

A layer comprising a latex may contain any suitable latex known to the art. By way of example, suitable latexes include styrene-acrylic copolymer, acrylonitrile styrene-acrylic copolymer, polyvinyl alcohol polymer, acrylic acid polymer, ethylene vinyl alcohol copolymer, ethylene-vinyl chloride copolymer, ethylene vinyl acetate copolymer, vinyl acetate acrylic copolymer, styrene-butadiene copolymer and acetate ethylene copolymer. Preferably, the layer comprising a latex contains styrene-acrylic copolymer, styrene-butadiene copolymer, or vinyl acetate-acrylic copolymer. More preferably, the layer comprising a latex contains vinyl acetate ethylene copolymer. A commercially available vinyl acetate ethylene copolymer is "AIRFLEX® 100 HS" latex. ("AIRFLEX® 100 HS" is a registered trademark of Air Products and Chemicals, Inc.) Preferably, the layer comprising a latex contains a latex that is pigmented. Pigmenting the latex increases the coat weight of the layer comprising a latex thus reducing runnability problems when using blade cutters to coat the substrate. Pigmenting the latex also improves the resulting quality of print that may be applied to the coated paperboard. Suitable pigments or fillers include kaolin clay, delaminated clays, structured clays, calcined clays, alumina, silica, aluminosilicates, talc, calcium sulfate, ground calcium carbonates, and precipitated calcium carbonates. Other suitable pigments are disclosed, for example, in Kirk-Othmer, Encyclopedia of Chemical Technology, Third Edition, Vol. 17, pp. 798, 799, 815, 831-836. Preferably the pigment is selected from the group consisting of kaolin clay and conventional delaminated coating clay. An available delaminated coating clay is "HYDRAPRINT"™ slurry, supplied as a dispersion with a slurry solids content of about 68%. "HYDRAPRINT"™ slurry is a trademark of Huber. The layer comprising a latex may also contain other additives that are well known in the art to enhance the properties of coated paperboard. By way of example, suitable additives include dispersants, lubricants, defoamers, film-formers, antifoamers and crosslinkers. By way of example, "DISPEX N-4"™ is one suitable organic dispersant and comprises a 40% solids dispersion of sodium polycarboxylate. "DISPEX N-40"™ is a trademark of Allied Colloids. By way of example, "BERCHEM 4095"™ is one suitable lubricant and comprises 100% active coating lubricant based on modified glycerides. "BERCHEM 4095"™ is a trademark of Bercen. By way of example, "Foamaster DF-177NS" is one suitable defoamer. "Foamaster DF-122 NS" is a trademark of Henkel. In a preferred embodiment, the coating comprises multiple layers that each comprise a latex.

Typically paperboard for containers contains up to about 6 lbs/3000 $ft^2$ starch; however, the rigidity can be considerably enhanced by using paperboard with from about 9 to about 12 lbs/3000 $ft^2$ starch. See U.S. Pat. Nos. 5,938,112 and 5,326,020, the disclosures of which are incorporated herein by reference.

The stock is moistened on the uncoated side after all of the printing and coating steps have been completed. In a typical forming operation, the web of paperboard stock is fed continuously from a roll through a scoring and cutting die to form the blanks which are scored and cut before being fed into position between the upper and lower die halves. The die halves are heated as described above, to aid in the forming process. It has been found that best results are obtained if the upper die half and lower die half—particularly the surfaces thereof—are maintained at a temperature in the range of from about 250° F. to about 400° F., and most preferably at about 325° F.±25° F. These die temperatures have been found to facilitate rebonding and the plastic deformation of paperboard in the rim areas if the paperboard has the preferred moisture levels. At these preferred die temperatures, the amount of heat applied to the blank is sufficient to liberate the moisture within the blank and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal plate production speeds of 40 to 60 pressings a minute, and commensurately higher or lower temperatures in the dies would generally be required for higher or lower production speeds, respectively.

Without intending to be bound by theory, it is believed that increased moisture, temperature, and pressure in the region of the pleat during pleat formation facilitates rebonding of lamellae in the pleats; accordingly, if insufficient rebonding is experienced, it can generally be addressed by increasing one or more of temperature, pressure or moisture.

A die set wherein the upper assembly includes a segmented punch member and is also provided with a contoured upper pressure ring is advantageously employed in carrying out the present invention. Pleating control is preferably achieved in some embodiments by lightly clamping the paperboard blank about a substantial portion of its outer portion as the blank is pulled into the die set and the pleats are formed. For some shapes the sequence may differ somewhat as will be appreciated by one of skill in the art. Paperboard containers configured in accordance with the present invention are perhaps most preferably formed from scored paperboard blanks.

Figure 18:
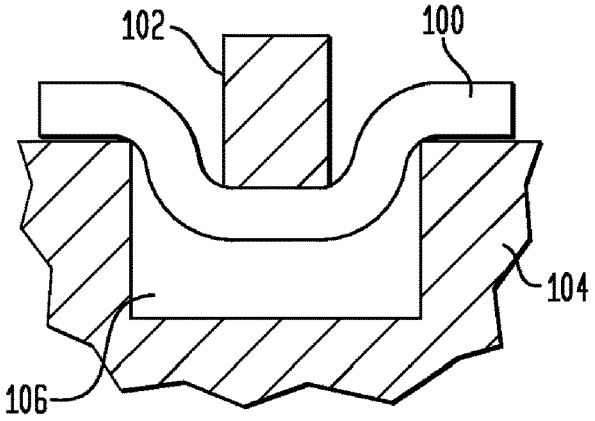
FIGS. 18 through 20 are schematic diagrams illustrating scoring and pleating paperboard.
Figure 19:
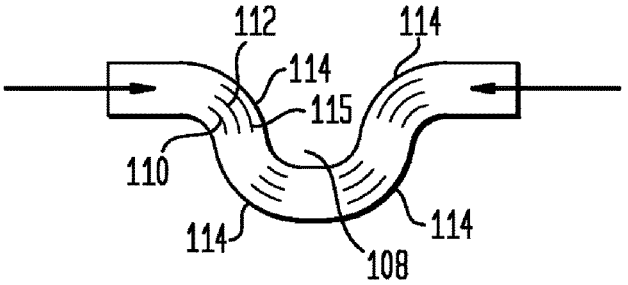
Figure 20:
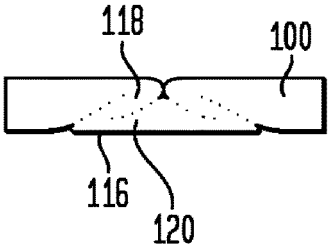

In FIG. 18 there is shown a portion of paperboard stock 100 positioned between a score rule 102 and a scoring counter 104 provided with a channel 106 as would be the case in a scoring press or scoring portion of a pressware forming press. The geometry is such that when the press proceeds reciprocally downwardly and scores blank 100, U-shaped score 108 results, see FIG. 19. At least incipient delamination of the paperboard into lamellae indicated at 110, 112, 115 is believed to occur in the sharp corner regions indicated at 114. The same reciprocal scoring operation could be performed in a separate press operation to create blanks that are fed and formed subsequently. Alternatively, a rotary scoring and blanking operation may be utilized as is known in the art. When the product is formed in a heated matched die set, preferably a generally U-shaped pleat 116 (FIG. 20) with a plurality of rebonded paperboard lamellae 118, 120 along the pleat is formed such that pleats 116 (or 36, 38, 40 and so forth as shown in FIG. 1A and following) have the configuration shown schematically. This shape may be referred to as an "omega" shape, a "horseshoe" shape or a "crushed horseshoe" shape. While the pleats will often have this structure, in other cases a Z or S shaped pleat may be formed, corresponding in essence to ½ of a U-shaped pleat.

During the forming process described hereinafter as a pleat is formed, internal delamination of the paperboard into a plurality of lamellae occurs, followed by rebonding of the lamellae under heat and pressure into a substantially integrated fibrous structure generally inseparable into its constituent lamellae. Preferably, the pleat has a thickness roughly equivalent to the circumferentially adjacent areas of the rim and most preferably is more dense than adjacent areas. Integrated structures of rebonded lamellae are indicated schematically at 118, 120 in FIG. 20 on either side of paperboard fold lines in the pleat indicated in dashed lines.

The substantially rebonded portion or portions of the pleats 116 in the finished product preferably extend generally over the entire length (75% or more) of the score which was present in the blank from which the product was made. The rebonded portion of the pleats may extend only over portions of the pleats in an annular region of the periphery of the article in order to impart strength. Such an annular region or regions may extend, for example, around the container extending approximately from the transition of the bottom of the container to the sidewall outwardly to the outer edge of the container, that is, generally along the entire length of the pleats shown in the Figures above. The rebonded structures may, in one preferred aspect, extend over an annular region which is less than the entire profile from the bottom of the container to its outer edge. Referring to FIG. 1E, for example, an annular region of rebonded structures oriented in a radial direction may extend around the container from slightly above inner transition 16 to the outermost edge of evert 46, as is discussed hereinafter. Alternatively, an annular region or regions of such rebonded structures may extend over all or only a portion of the length of sidewall 26; over all or part of second annular transition portion 28; over all or part of outer flange portion 30; or combinations thereof. It is preferable that the substantially integrated rebonded fibrous structures formed extend over at least a portion of the length of the pleat, more preferably over at least 50% of the length of the pleat and most preferably over at least 75% of the length of the pleat. Substantially equivalent rebonding can also occur when pleats are formed from unscored paperboard.

At least one of the optional sidewall portion, the second annular transition portion, and the outer flange portion is provided with a plurality of circumferentially spaced, radially extending regions formed from a plurality of paperboard lamellae rebonded into substantially integrated fibrous structures generally inseparable into their constituent lamellae. The rebonded structures extend around an annular region corresponding to a part of the profile of the optional sidewall, second annular transition portion or the outer flange portion of the container. More preferably, the integrated structures extend over at least part of all of the aforesaid profile regions about the periphery of the container. Still more preferably, the integrated rebonded structures extend generally over the length of the pleats, over at least 75% of their length, for instance; however, so long as a majority of the pleats, more than about 50% for example, include the rebonded structures described herein over at least a portion of their length, a substantial benefit is realized. In some preferred embodiments, the rebonded structures define an annular rebonded array of integrated rebonded structures along the same part of the profile of the container around an annular region of the container. For example, the rebonded structures could extend along the optional sidewall portion of all of pleats shown in FIG. 1A and following along a length to define an annular array around the optional sidewall portion of the container.

Figure 21:
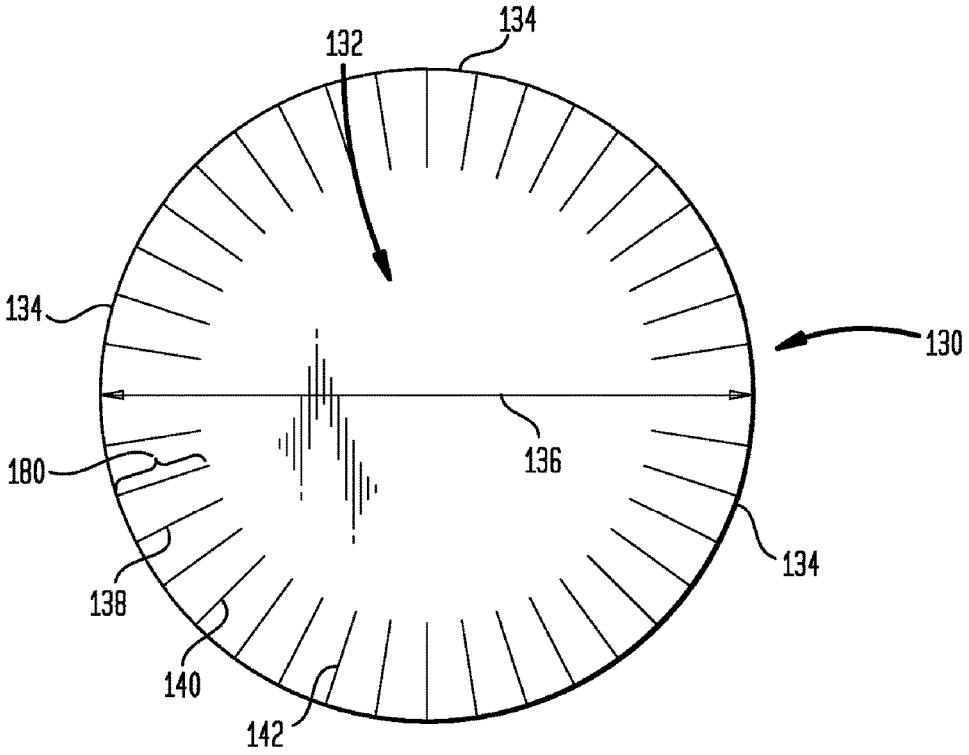
FIG. 21 is a schematic diagram of a paperboard blank which is scored with 40 scores of uniform spacing.

A suitable paperboard blank to make the inventive containers is shown in plan view in FIG. 21. In FIG. 21 a paperboard blank 130 is generally planar and includes a central portion 132 defining generally thereabout a perimeter 134 having a diameter 136. There is provided about the perimeter 134 of blank 130 a plurality of scores such as scores 138, 140 and 142. The scores are preferably evenly spaced and facilitate formation of evenly spaced pleats.

Referring to FIGS. 22 through 26 there is shown schematically from center a segmented die set 150 for making plates having the shape of Invention Profile 1. Die set 150 includes a punch base 152, a punch knock-out 154 and a pressure ring 156. Pressure ring 156 is typically spring-biased as is well known in the art. The die set also includes a die base 158, as well as a die knock-out 160 and a draw ring 162. Draw-ring 162 is likewise spring biased. The punch knock-out is sometimes an articulated style (as shown here) having 0.030" to 0.120" articulation stroke during the operation. The pressure ring may have the outer product profile machined into it and provides further pleating control by clamping the blank between its profile area and die outer profile during the formation as will be appreciated by one of skill in the art. Preferably, the die base 158 defines a continuous forming contour 164 as shown, while the punch forming contour may be a split contour having portions 166a, 166b as shown.

Figure 23:
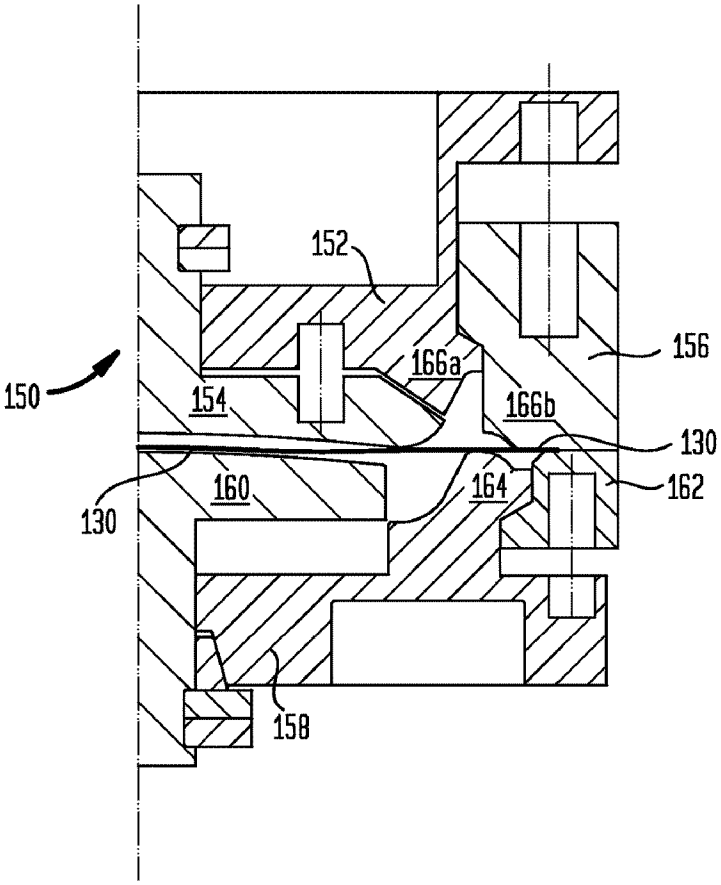
FIGS. 22, 23, 24, 25 and 26 are diagrams illustrating a pressware die set useful for forming containers and its operation.
Figure 22:
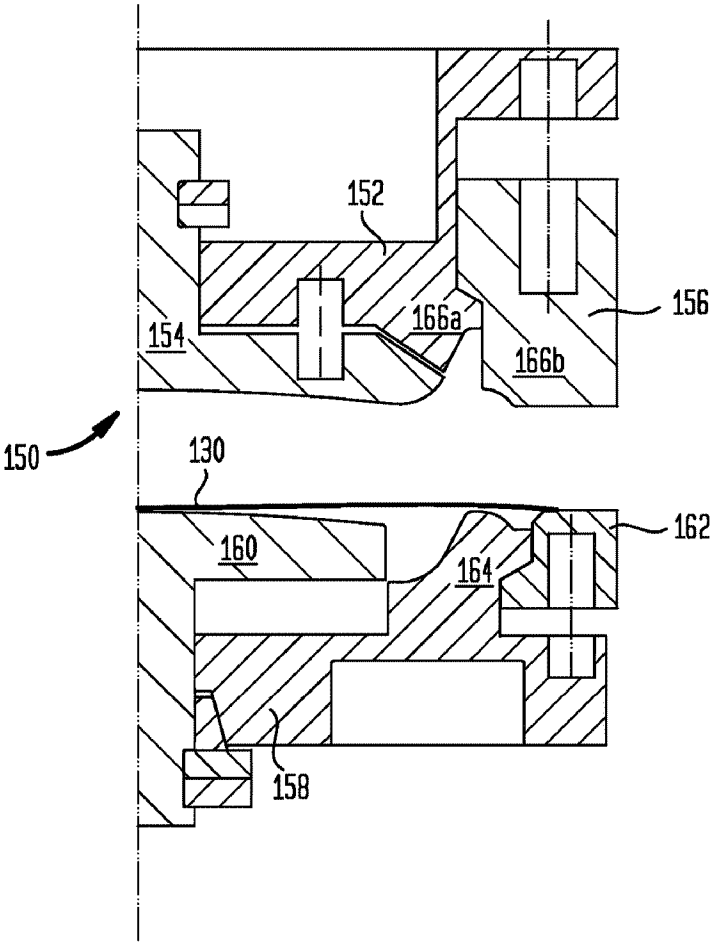

FIGS. 22-26 illustrate the sequential operation of the forming die as the product 10 of FIG. 1A is formed. In FIG. 22, the die set is fully open and receives a planar paperboard blank such as blank 130. In FIG. 23, the punch is seen to have advanced toward the die such that pressure ring 156 and draw ring 162 have advanced toward the blank and will contact the blank at its outermost portions. The punch pressure ring contacts the blank, clamping it against the lower draw ring and an optional relief area (not shown) to provide initial pleating control. The draw ring and pressure ring springs typically are chosen in a manner to allow full movement of the draw ring prior to pressure ring movement (i.e., full spring force of draw ring is less than or equal to the pre-load of the pressure ring springs). It is noted with respect to FIG. 23 that the forming contours of the bases have advanced toward blank 130, but have not yet closed thereupon.

Figure 24:
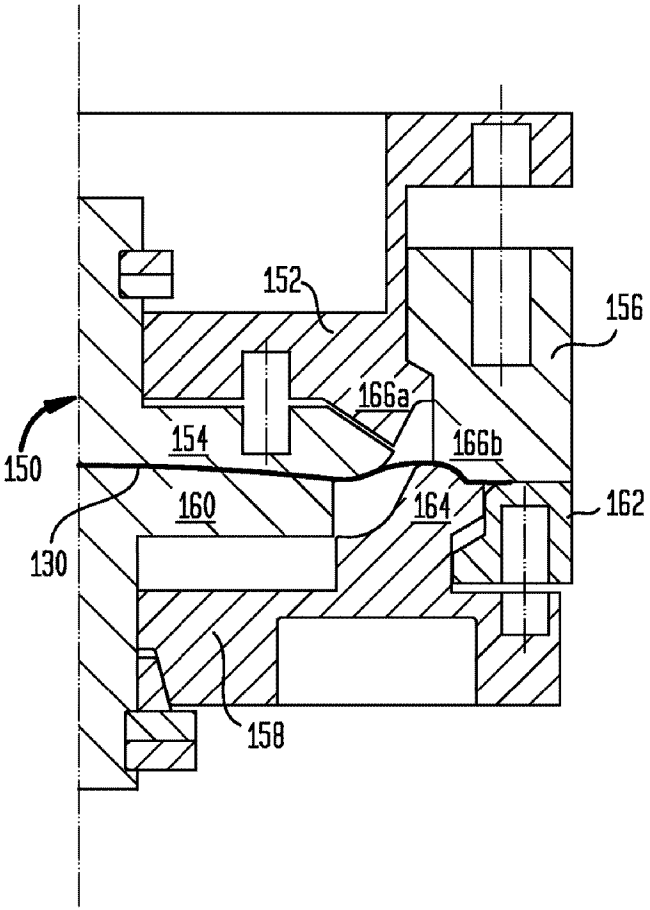

In FIG. 24, the die set continues to close, with punch base 152 continuing to advance towards die base 158, wherein the knock-outs 154, 160, forming contour 164, and forming contour portion 166b are contacting the blank. The punch and die knock-outs (which may have compartment ribs machined into them) hold the blank on center as it is formed.

Figure 25:
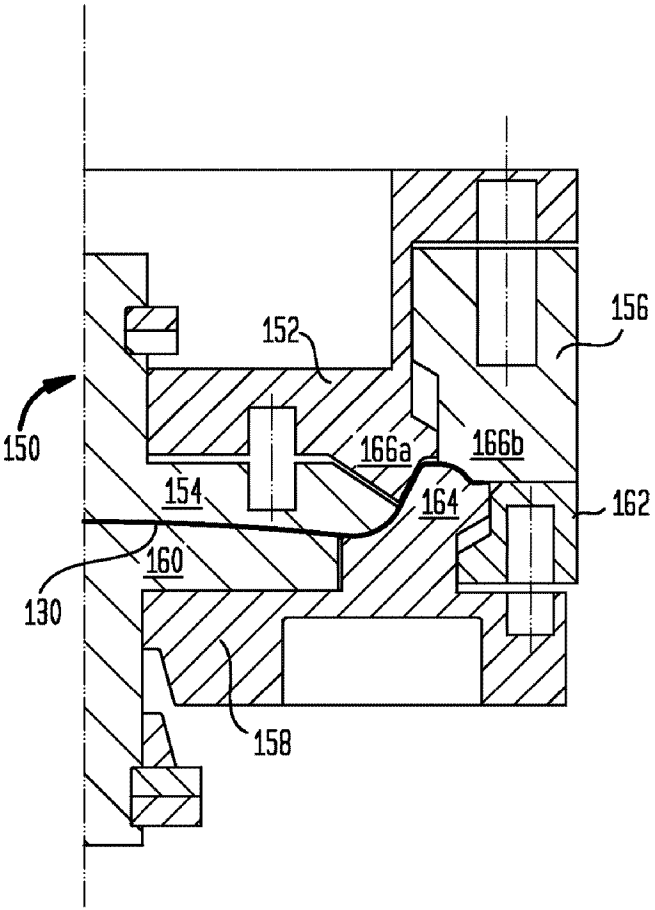
Figure 26:
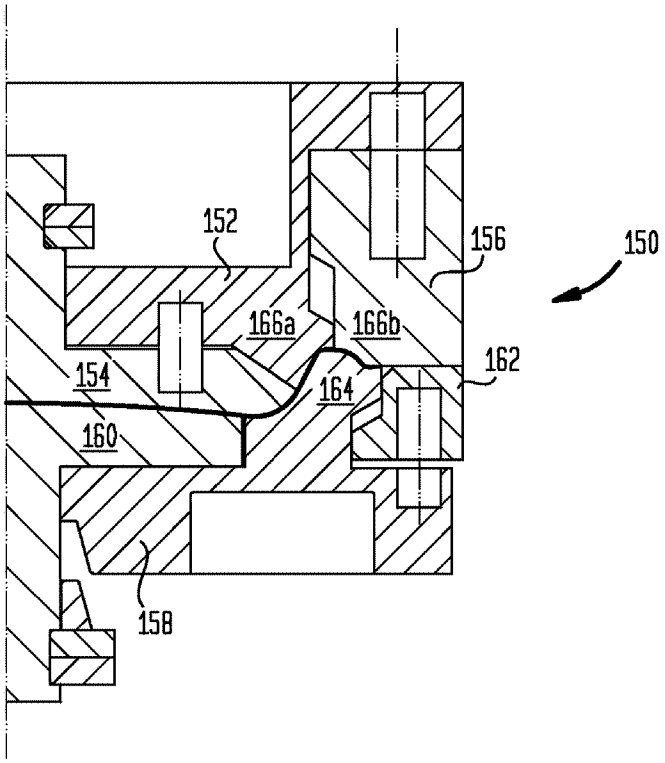

In FIG. 25, a still more advanced stage, the die set is forming the container. In FIG. 26, the die set is fully closed and the contour portion of the punch base applies pressure to the flange area.

The die opens by reversed staging and a fully formed product is removed from the die set.

It has been found that the containers of the invention are advantageously manufactured such that the arched central crown is heat-set at elevated temperature by a heated die segment over sufficient arc length and that scores are lengthened relative to conventional pressware and positioned such that their lower edges are above the bottom of the container.

Figure 27:
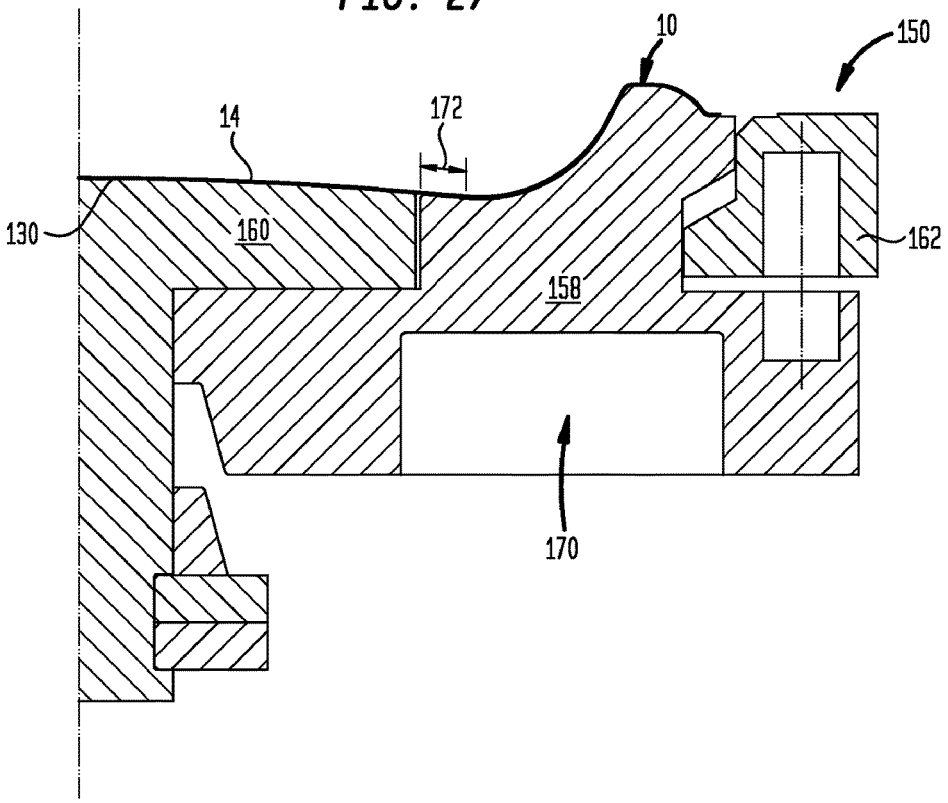
FIG. 27 is a schematic view of a portion of a pressware die set illustrating fabrication of the inventive containers.

Referring briefly to FIG. 27, there is shown in schematic section a blank 130 formed into container 10 in a die set 150 as described above. Die base segment 158 is heated by an embedded heating element 170 which is maintained in contact with base 158. Base 158 contacts arched central crown portion 14 over a length 172 which is more than about 100 mils in order to "set" crown 14 properly. Without being bound by theory, it is believed that reciprocating knock-out 160 is not maintained at high enough temperature during the production process to properly set the shape because the knock-out is not in direct, continuous conductive contact with a heating element since it reciprocates away from the die base during forming cycles. The blank is preferably formed into shape by contacting a die segment which is in continuous conductive contact with a heater (i.e. continuously in contact with the heater or in fixed contact with a part continuously in contact with the heater) over an arc length of the central crown of more than about 100 mils. More than 200, 250, or 300 mils is preferred such as 400-600 mils in connection with 9" or 10" plates and the entire arch portion can be contacted with a continuously heated segment if so desired. Alternatively, knock-out 160 may be sized such that 50% or less of the arch length of crown 14 contacts a directly heated part during formation. A "directly" heated part is one to which heat is supplied by continuous conductive contact with a heater during forming cycles of the die set. Directly heated parts thus include die base 158 which has heater 170 fixed therein as well as parts (segments) secured to die base 158; whereas knock-out 160 only contacts the base briefly during forming cycles and is not considered a directly heated part.

The scores of blank 130 are relatively long as compared with prior art processes yet preferably sized and positioned such that their lower edges are at least 100 mils above the bottom of the formed container. From 190-mils to 210 mils above the bottom of the plate is typical. Scores used in connection with Invention Profile 1, for example, may be 120-180 mils longer than scores used in blanks for forming containers of Comparative Profile A. If the scores are too long, however, the coating on the blank may be unduly damaged and water resistance may suffer. Also, the amount of excess paperboard going into the pleats at the inner portions of the container is more limited.

Figure 28:
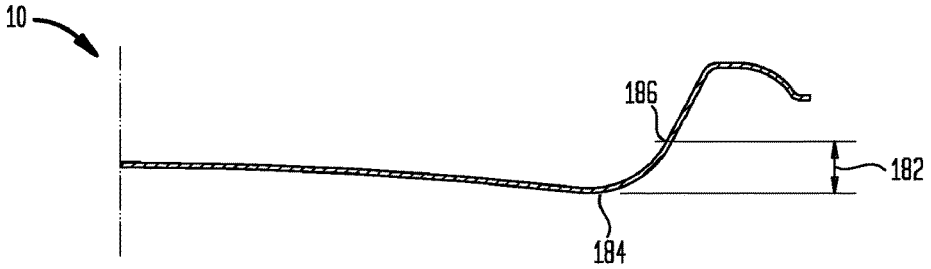
FIG. 28 is a schematic diagram illustrating the height of pleats above the bottom of the container.

Referring to FIG. 21, it is seen the scores, i.e., scores 138, 140, 142 extend inwardly from perimeter 134 over a length 180 toward the center of the blank. The scores preferably extend from a height 182 outwardly to the periphery of container 10 as shown schematically in FIG. 28. Height 182 is measured from the outer surface 184 of the lowermost portion of container 10 as shown in the diagram. The lower edges of the scores are thus situated at 186 in formed container 10, which is at height 182 above the bottom of the container. Height 182 is suitably at least 100 or 150 mils, or from 100-300 mils; typically from 150-250 mils.

As noted hereinabove, pressware platters, bowls and the like may be produced in accordance with the invention in addition to round plates. For example, an oval platter having a 12" major axis and a 10" minor axis may be made having profiles with an Invention Profile 1 shape or an Invention Profile 3 shape (that is an Invention Profile 1 shape with a flat bottom panel). For purposes of comparing the invention with other profiles in an oval platter, dimensions are given in Tables 7 and 8 for platters having generally the shapes of Invention Profiles 1, 3 and Comparative Profile A. The Invention Profile 1, 3 dimensions appear under the headings IP1 with 0.188" crown and IP3 no crown in tables 7 and 8.

TABLE 7

10 × 12½" Oval Platter Minor Axis Die Profile Dimensions

| | Comparative Profile A | IP3 no crown | IP1 with 0.188" crown |
|---|---|---|---|
| R0 | N/A | N/A | Minor to Major Axis - 3D Surface/3D Profile |
| X0 | N/A | N/A | Minor to Major Axis - 3D Surface/3D Profile |
| Y0 | N/A | N/A | Minor to Major Axis - 3D Surface/3D Profile |
| R1 | 0.4880 | 0.6900 | 0.7200 |
| X1 | 3.3867 | 3.3301 | 3.2029 |
| Y1 | 0.4880 | 0.6900 | 0.7200 |
| R2 | 0.2936 | 0.0834 | 0.0834 |
| X2 | 4.3972 | 4.2256 | 4.2258 |
| Y2 | 0.7365 | 0.9466 | 0.9450 |
| R3 | 0.5272 | 0.5272 | 0.5272 |
| X3 | 4.3972 | 4.3972 | 4.3972 |
| Y3 | 0.5029 | 0.5029 | 0.5013 |
| R4 | 0.0834 | 0.0834 | 0.0834 |
| X4 | 4.9260 | 4.9260 | 4.9256 |
| Y4 | 0.8081 | 0.8081 | 0.8066 |
| X5 | 5.0133 | 5.0123 | 5.0123 |
| Y5 | 0.7247 | 0.7247 | 0.7247 |

TABLE 8

10 × 12½" Oval Platter Major Axis Die Profile Dimensions

| | Comparative Profile A | IP3 no crown | IP1 with 0.188" crown |
|---|---|---|---|
| R0 | N/A | N/A | Minor to Major Axis - 3D Surface/3D Profile |
| X0 | N/A | N/A | Minor to Major Axis - 3D Surface/3D Profile |
| Y0 | N/A | N/A | Minor to Major Axis - 3D Surface/3D Profile |
| R1 | 0.4880 | 0.6900 | 0.7200 |
| X1 | 4.6242 | 4.4576 | 4.4402 |
| Y1 | 0.4880 | 0.6900 | 0.7200 |
| R2 | 0.2936 | 0.0834 | 0.0834 |
| X2 | 5.6347 | 5.4631 | 5.4631 |
| Y2 | 0.7365 | 0.9466 | 0.9450 |
| R3 | 0.5272 | 0.5272 | 0.5272 |
| X3 | 5.6347 | 5.4631 | 5.6347 |
| Y3 | 0.5029 | 0.5029 | 0.5013 |
| R4 | 0.0834 | 0.0834 | 0.0834 |
| X4 | 6.1635 | 6.1635 | 6.1635 |
| Y4 | 0.8081 | 0.8081 | 0.8066 |
| X5 | 6.2508 | 6.2498 | 6.2492 |
| Y5 | 0.7247 | 0.7247 | 0.7232 |

The dimensions in Tables 7, 8 provide values (inches) for the various portions shown in FIGS. 1F, 1G; that is, Y indicates generally a height from the lowermost portion of the bottom of the container (with the exception of Y0 which is the height of the crown from the origin of R0). Y1 is the height above the bottom of the container of the origin of radius of curvature R1 of first transition portion 16; Y2 is the height above the bottom of the container of radius of curvature R2; Y3 is the height above the bottom of the container of the origin of radius of curvature R3 of the outer portion 44 of brim 32; Y4 is the height above the bottom of the container of the origin of R4 of an outward transition portion 48 and Y5 is the height above the bottom of the container of evert portion 46. Similarly, X1 indicates the distance from center (X0) of the origin of radius of curvature R1. Likewise, X2 and X3 indicate respectively, the distance from the center of the plate (X0) of the origins of radii of curvature R2 and R3. X4 is the distance from the center of the origin of radius of curvature R4. X5 indicates the overall radius (½ D) of the container. Y0 is indicated schematically in the diagrams as the distance from the bottom of container center 20 to the origin of a radius of curvature R0 of convex upper surface 14a of arched central crown 14 of bottom panel 12.

Figure 29:
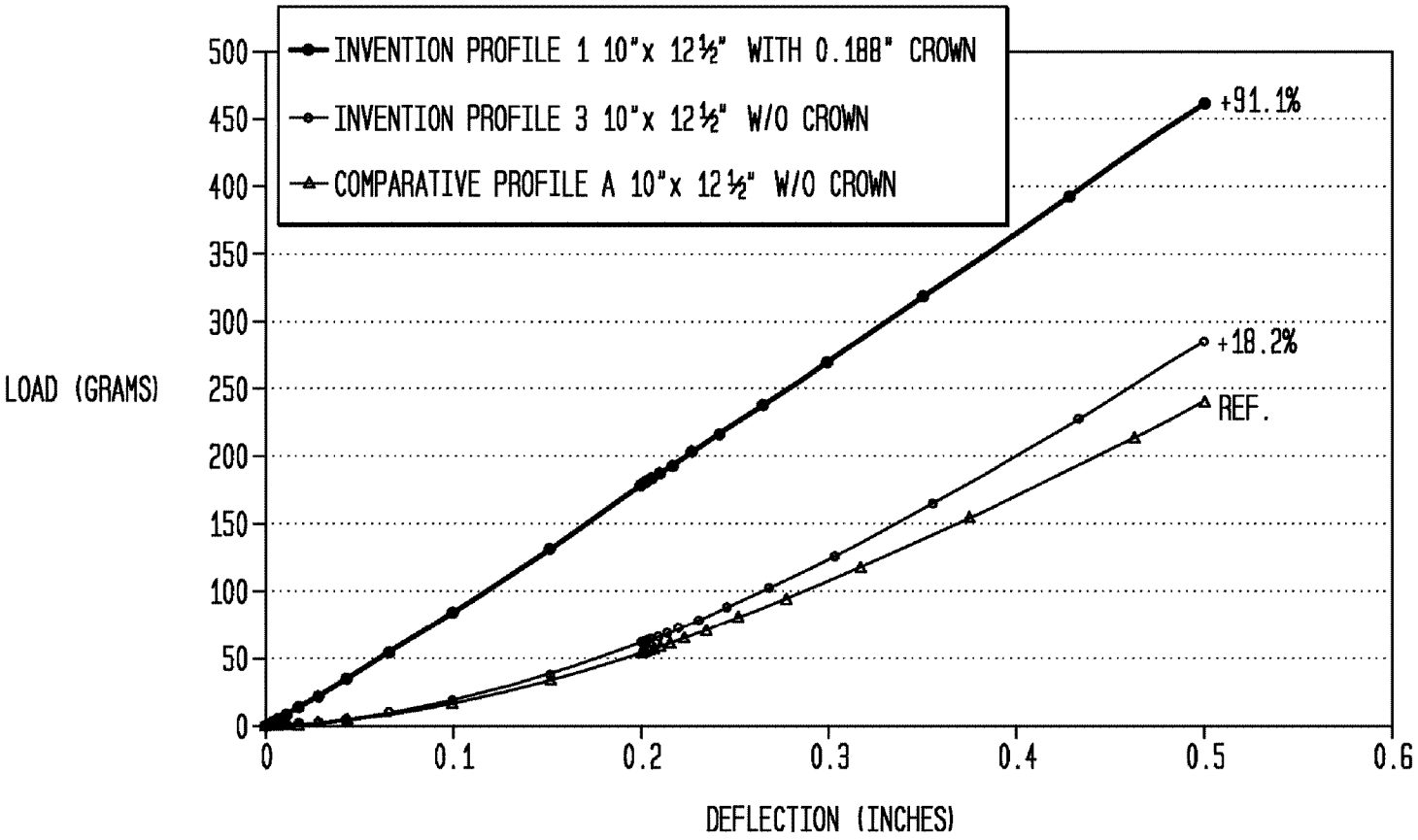
FIG. 29 is a plot of FEA modeling force versus deflection for oval platters.

FEA analysis was used to compare the Comparative Profile A oval platter and Invention Profile 1, 3 platters of Tables 7, 8 along the major (12½ inch) axes. Results appear in FIG. 29. It is seen in FIG. 29 that the relatively "tight" transition radius R2 provides substantial improvement over the Comparative Profile A shape and the Invention Profile 1 shape provides remarkable and unexpected strength increases of over 90%, consistent with the improvement seen in round plates. Corresponding strength gains are seen with pressware bowls, discussed below.

Figure 30:
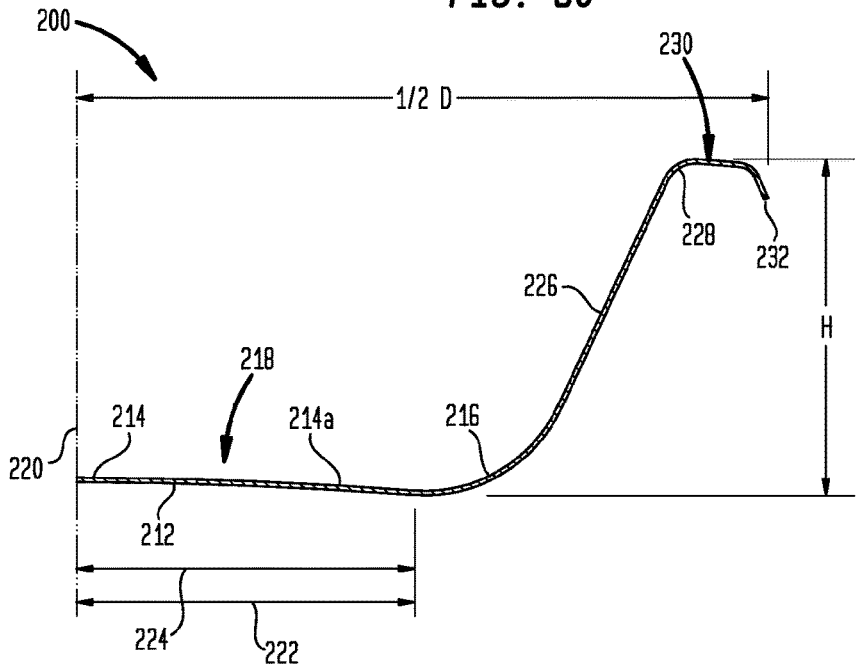
FIGS. 30, 31 and 32 are schematic diagrams illustrating dimensions for bowls.
Figure 31:
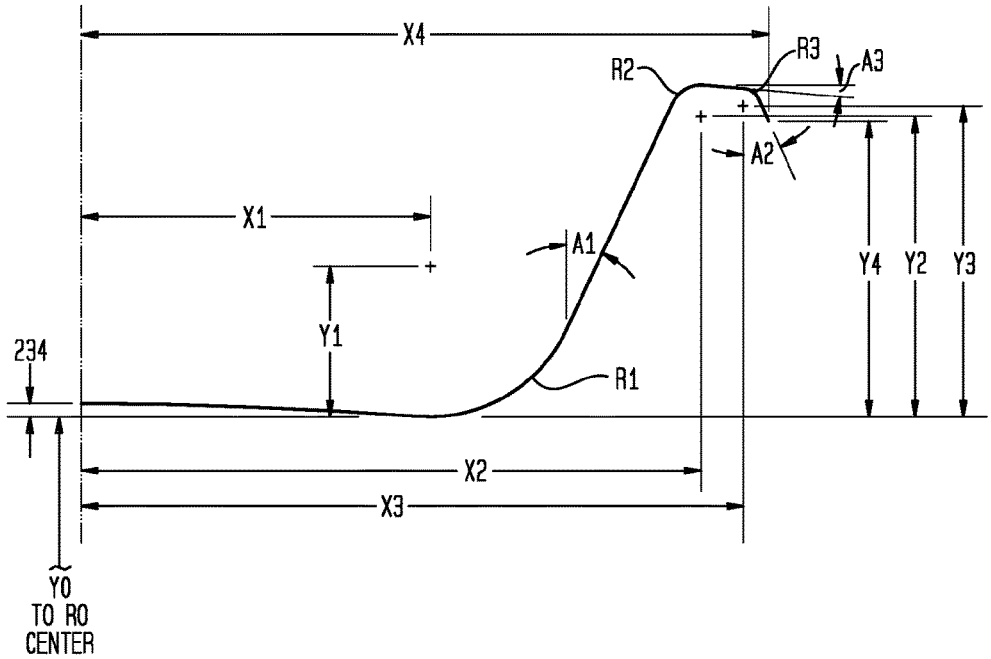

Referring to FIGS. 30, 31, there is shown schematically a profile from center of a pleated, pressware bowl 200 configured in accordance with the present invention. Bowl 200 may be about 6" in diameter and have about 70-80 pleats as shown in FIG. 1A and following in some embodiments.

Pressware bowl 200 has a characteristic diameter, D, of 2 times X4, a bottom panel 212 having an arched central crown 214 with a convex upper surface 214a as well as a first annular transition portion 216 which extends upwardly and outwardly from bottom panel 212 defining a radius of curvature R1. Upper surface 214a of arched central crown 214 defines a substantially continuous, convex arched profile 218 extending from a center 220 of bowl 200 toward first annular transition portion 216 for the (horizontal) distance 222 which is at least 75% of a horizontal distance 224 between center 220 of container 210 and first annular transition portion 216. In the various embodiments shown, the highest point of arched central crown 214 is shown at center 220. While this is typically a preferred geometry, the highest point of the arched crown may occur off-center due to forming a blank which is not perfectly aligned in a die set, or due to relaxation or spring back or by design. A sidewall portion 226 extends upwardly and outwardly from first annular transition portion 216. A second annular transition portion 228 flares outwardly with respect to first annular transition portion 216 and defines a second radius of curvature, R2. A brim 230 extends outwardly and downwardly at 232 and defines a radius, R3. Sidewall 226 extends upwardly at an angle A1 from vertical, while an outer portion of brim 230 defines an angle A2 with vertical at 232. The portion of brim 230 extending outwardly and downwardly from transition 228 defines an angle A3 with a horizontal as shown. Bowl 200 has an overall height, H.

Figure 32:
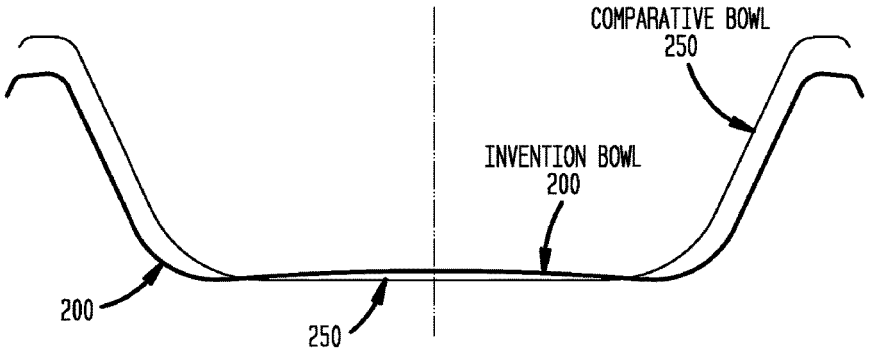

FIG. 32 is a schematic diagram comparing the profile of bowl 200 with that of a comparative bowl 250 made from a similarly sized blank.

As will be appreciated from the various diagrams, the crown height 234 is the maximum distance of the crown above the lowermost portion of the profile that the crown rises. Typically, the crown height is defined at the center of the container.

The various dimensions of the bowls shown in FIGS. 30, 31, 32 appear in Table 9 (inches), wherein: Y indicates generally a height from the lowermost portion of the bottom of the container (with the exception of Y0 which is the height of the crown from the origin of R0). Y1 is the height above the bottom of the container of the origin of radius of curvature R1 of first transition portion 216; Y2 is the height above the bottom of the container of radius of curvature R2; Y3 is the height above the bottom of the container of the origin of radius of curvature R3 and Y4 is the height above the bottom of the container of the outer edge of brim 232. Similarly, X1 indicates the distance from center (X0) of the origin of radius of curvature R1. Likewise, X2 and X3 indicate respectively, the distance from the center of the plate (X0) of the origins of radii of curvature R2 and R3. X4 indicates the distance from center of the edge of the bowl; that is ½ D.

Y0 is indicated schematically in the diagrams as the distance from the bottom of the container center to the origin of a radius of curvature R0 of convex upper surface 214a of arched central crown 214 of bottom panel 212. This aspect is a salient feature of the invention which is seen in the various examples and Tables and especially appreciated from the rigidity data, discussed below.

TABLE 9

12 oz bowl Die Profile Dimensions

| | Comparative Bowl 250 | Invention Bowl 200 (with 0.060" crown) |
|---|---|---|
| R0 | N/A | 18.6169 |
| X0 | N/A | 0.0000 |
| Y0 | N/A | −18.5569 |
| R1 | 0.7710 | 0.6346 |
| X1 | 1.2427 | 1.5187 |
| Y1 | 0.7710 | 0.6346 |
| R2 | 0.1873 | 0.1425 |
| X2 | 2.6418 | 2.6832 |
| Y2 | 1.5040 | 1.2929 |
| R3 | 0.0624 | 0.0519 |
| X3 | 2.8072 | 2.8746 |
| Y3 | 1.6289 | 1.3655 |
| X4 | 2.8849 | 2.9730 |
| Y4 | 1.6191 | 1.2772 |
| A1 | 24.9971 | 25.0000 |
| A2 | 30.0000 | 25.0000 |
| A3 | 0.0000 | 5.5000 |

Following the procedures detailed above, pressware bowls having the shapes of FIGS. 30-32 and the dimensions of Table 9 were fabricated in different basis weights and tested for Wet and Dry SSI Rigidity. Results appear in Table 10 (averaged on multiple samples).

TABLE 10

Bowl Performance Properties

| | | | SSI | Wet Bowl - Water | |
|---|---|---|---|---|---|
| Plate ID (Manufacturer) | Basis Weight (lb/ream) | Caliper (mils) | Bowl Rigidity (gms/.50") | SSI Rigidity (gms/.50") | Rigidity Loss (%) |
| nvention Bowl 200 - 166# Bowl | 171 | 15.5 | 533 | 405 | 24% |
| | | | 19.3% | 45.9% | |
| Comparative Bowl 250 - 166# Bowl | 169 | 15.1 | 430 | 219 | 49% |
| | | | (Ref) | (Ref) | |
| Invention Bowl 200 - 206# | 209 | 19.5 | 828 | 447 | 46% |
| | | | 25.0% | 17.9% | |
| Comparative Bowl 250 - SX12 206# | 204 | 19.5 | 621 | 367 | 41% |
| | | | (Ref) | (Ref) | |

It is seen in Table 10 that the bowls of the invention exhibit much higher dry and wet strength as compared to commercial bowls of comparable weight. Here again the results are unexpectedly superior.

It will be appreciated from the foregoing that the many aspects and features of the invention, summarized below may be combined in any manner so desired in order to provide an improved container in accordance with the present invention.

There is provided in one aspect of the present invention a disposable servingware container pressformed from a generally planar paperboard blank, the container having a characteristic diameter D and including a bottom panel with an arched central crown with a convex upper surface and a first annular transition portion extending upwardly and outwardly from the bottom panel. A portion of the arched central crown defines a substantially continuous, convex arched profile spanning at least 75% of the horizontal distance between the center of the container and the first annular transition portion. Optionally, a sidewall portion extending upwardly and outwardly from the first annular transition portion is provided. A second annular transition portion flares outwardly with respect to the first annular transition portion and defines a second radius of curvature R2, the ratio of R2/D being 0.0125 or less. In this regard, it will be appreciated that R2 may be essentially 0, that is, in essence a sharp direction change in the profile. An outer flange portion extends outwardly with respect to the second annular transition portion and may have the various features described herein.

The upper surface of the arched central crown typically provides an arched profile which extends outwardly from the center of the container towards the first annular transition portion over a distance of at least about 80%, 85% or 90% of the horizontal distance between the center of the container and the first annular transition portion. Typically, the arched profile extends across the center of the container and defines a radius of curvature R0 or in the ratio of R0/D is generally from about 1.75 to about 14; typically from about 2 to 12; and in many cases the ratio of R0/D is from about 2 to about 6. In still other cases, the ratio R0/D is from about 2 to about 4. Thus, the upwardly convex arched central crown has a crown height of from about 0.05" to about 0.4"; typically, the convex arched central crown has a crown height of at least about 0.1", 0.15" or 0.2".

The ratio of R2/D may be from about 0.0025 to about 0.0125 such as from about 0.005 or 0.006 to about 0.010.

Containers of the invention exhibit enhanced rigidity and strength. A paper plate having a diameter of from about 8½" to about 10½" may have, for example, a Normalized SSI rigidity of at least about 1.8 g/lb basis weight, at least about 2 g/lb basis weight, or at least about 2.25 g/lb basis weight. In general, paper plates of the invention with a diameter of from 8½" to 10½" may have a Normalized SSI rigidity of from about 1.8 g/lb basis weight up to about 3 g/lb basis weight. The Normalized SSI rigidity of a plate of the invention having a diameter less than 8½" may be somewhat higher while a plate of the invention having a diameter of greater than 10½" may have a Normalized SSI rigidity which is somewhat lower. Similarly, containers in the form of a paper plate with a characteristic diameter, D, of from about 8½" to about 10½", have typically a Normalized FPI rigidity of at least 1.5 g/lb basis weight, and preferably a Normalized FPI rigidity of at least 1.7 or 1.9 g/lb basis weight. A range of 1.5 g/lb basis weight up to about 2.55 g/lb basis weight is somewhat typical.

Typical basis weights of the products are from about 80 lbs/3000 $ft^2$ to about 300 lbs/3000 $ft^2$, such as from about 155 lbs/3000 $ft^2$ to about 245 lbs/3000 $ft^2$. The containers are substantially more rigid than like containers with a generally planar bottom portion and a R2/D ratio of 0.020 or greater. For example, containers of the invention have a SSI rigidity at least 15% greater, at least 30% greater, or at least 45% greater than a like container with a generally planar bottom portion and a R2/D ratio of 0.020 or greater. In general, the container may exhibit a SSI rigidity of at least 25% greater and up to about 100% greater than a like container with a generally planar bottom portion and a R2/D ratio of 0.020 or greater.

One preferred embodiment resembles in many respects the containers disclosed in U.S. patent application Ser. No. 10/963,686, US Publication No. US 2006/0208054, the disclosure of which is incorporated by reference. These containers have a characteristic diameter D as well as an overall height and include a bottom portion with an arched central crown described above, a first annular transition portion extending upwardly and outwardly from the generally planar bottom portion, an optional sidewall extending upwardly and outwardly from the first annular transition portion and a second annular transition portion as noted above. An outer flange portion extends outwardly with respect to the second annular transition portion and includes (i) a downwardly sloping brim portion defining a declivity angle $\alpha$ at its terminus with respect to a horizontal substantially parallel to the bottom portion and wherein the downwardly sloping brim portion transitions to (ii) a brim transition portion, a brim height being thereby defined as the difference between the overall height of the container and a height at which the downwardly sloping brim portion transitions to the brim transition portion. The brim transition portion, in turn, transitions to (iii) an annular evert portion extending outwardly with respect to the downwardly sloping brim portion at an eversion angle $\beta$ of at least about 25°. The height of any extension of the evert portion above the brim transition portion is typically no more than about 75% of the brim height.

Another preferred shape resembles that disclosed in U.S. Pat. No. 6,715,630 to Littlejohn et al., the disclosure of which is incorporated by reference. These containers have a characteristic diameter, D and include a bottom panel, a sidewall portion, and a second annular transition portion all as noted above. Here, the sidewall portion defines a linear, inclined sidewall profile of a length between the first annular transition portion and the second annular transition portion having an angle of inclination with respect to a vertical from the generally planar bottom portion and an arcuate outer flange having an upper convex surface. The radius of curvature of the arcuate outer flange portion is from about 0.0175 and about 0.1 times the characteristic diameter of the container. An inner flange portion extends between the second annular transition portion and the arcuate outer flange portion and has a ratio of radial spans the characteristic diameter of from about 0 to about 0.1. The container is further characterized by a flange outer vertical drop when the ratio of the length of the flange outer vertical drop to the characteristic diameter of the container is greater than about 0.01.

The containers may be in the form of a plate, in the form of a bowl, or in the form of a platter, such as an oval platter. In some cases, the disposable containers of the invention include a bottom panel with an arched central crown with an upper convex surface with the proviso that the upper surface of the arched central crown is in the shape of a spheroidal cap. These containers desirably exhibit an SSI rigidity of at least 10% greater than a like container with a generally planar bottom portion. Typically these containers exhibit a SSI rigidity at least 20% or 30% greater than a like container with a generally planar bottom portion. An increased SSI rigidity with respect to a like container with a generally planar bottom portion of from about 10% to about 50% or so is seen.

Another aspect of the improved design includes disposable paper plates press-formed from a generally planar paperboard blank, the plates having a characteristic diameter, D of from about 8½" to about 10½", and including: (a) a bottom panel; (b) a first annular transition portion extending upwardly and outwardly from the bottom panel; (c) an optional sidewall portion extending upwardly and outwardly from the first annular transition portion; (d) a second annular transition portion flaring outwardly with respect to the first annular transition portion defining a second radius of curvature, R2, the ratio of R2/D being 0.0125 or less; (e) an outer flange portion extending outwardly with respect to the second annular transition portion; and (f) a plurality of circumferentially spaced, radially extending pleats formed from a plurality of paperboard lamellae rebonded into substantially integrated fibrous structures generally inseparable into their constituent lamellae, the pleats extending over at least a portion of the second annular transition portion and at least a portion of the outer flange portion of the container, wherein the plate defines a pleated structure having a profile, and wherein further, the profile and the paperboard blank are selected and formation of the plate, including pleating, is controlled such that the paper plate exhibits a Normalized SSI rigidity of at least 1.8 g/lb basis weight. The paper plates typically have from about 30 to about 75 radially extending pleats such as from about 40 to about 60 radially extending pleats.

In still another aspect of the invention there is provided a disposable servingware container press-formed from a generally planar paperboard blank, the container having a characteristic diameter, D, and including: (a) a bottom panel; (b) a first annular transition portion extending upwardly and outwardly from the bottom panel; (c) an optional sidewall portion extending upwardly and outwardly from the first annular transition portion; (d) a second annular transition portion flaring outwardly with respect to the first annular transition portion defining a second radius of curvature, R2, less than 125 mils; and (e) an outer flange portion extending outwardly with respect to the second annular transition portion. Typically, R2 is at least 25 mils and less than 125 mils. In most cases, R2 is less than 100 mils such as where R2 is less than 80 or 90 mils, such as less than 60 mils or in some cases less than 30 mils.

The containers are advantageously formed from a paperboard blank provided with a plurality of scores extending inwardly from a periphery of the blank, wherein lower edges of the scores are at a height of at least 100 mils above the bottom of the first annular transition portion of the formed container. A height of at least 150 mils or more is preferred; however the height may range from a height of from 100 mils to 300 mils above the bottom of the first annular transition portion or may be within the range of from 150 mils to 250 mils above the bottom of the first annular transition portion.

A disposable bowl in accordance with the invention is press-formed from a generally planar paperboard blank, the bowl having a characteristic diameter, D, and a height, H. The bowls define: (a) a bottom panel having an arched central crown with a convex upper surface; (b) a first annular transition portion extending upwardly and outwardly from the bottom panel, with the proviso that a portion of the arched central crown defines a substantially continuous, convex arched profile spanning at least 75% of the horizontal distance between the center of the container and the first annular transition portion; (c) an optional sidewall portion extending upwardly and outwardly from the first annular transition portion; (d) a second annular transition portion flaring outwardly with respect to the first annular transition portion defining a second radius of curvature, R2, the ratio of R2/D being 0.02 or less; and (e) an outer flange portion extending outwardly with respect to the second annular transition portion. In general the bowl has a height/diameter ratio, H/D, of from 0.15 to 0.3.

The convex, arched profile may extend outwardly from the center of the container toward the first annular transition for a distance of at least 80%, 85% or 90% of the horizontal distance between the center of the container and the first annular transition portion and/or the convex, arched profile can extend across the center of the container and define a radius of curvature, R0. The ratio of R0/D is from 1.75 to about 14 in most cases and may be from about 2 to about 12; about 2 to about 6; or from about 2 to about 4. In most cases the upwardly convex arched central crown of the bowl has a crown height of from about 0.02" to about 0.40", such as a crown height of at least about 0.03"; at least about 0.04"; or at least about 0.05".

The ratio R2/D for the bowls is generally from about 0.004 to 0.02; such as where the ratio R2/D is from about 0.005 to 0.015; while R2 is typically less than 125 mils and 25 mils or more. Within this range, R2 may be less than 90 mils; less than 60 mils or less than 30 mils. The bowls usually have between 60 and 120 pleats.

Containers of the invention are preferably manufactured by disposing a generally planar paperboard blank in a forming apparatus, which apparatus includes a punch and die mounted for reciprocal motion with respect to each other followed by forming the generally planar paperboard blank under heat and pressure between the punch and die into the containers described above. Suitably the paperboard blank is a scored paperboard blank and pleats are formed having the features described herein. Generally, the paperboard blanks have a basis weight between about 100 lbs/3000 $ft^2$ and 300 lbs/3000 $ft^2$ as well as a polymer coating on one side thereof. The paperboard blank is suitably impregnated with starch and formed at a temperature between about 250° F. and 400° F. in the apparatus which is operated from 20 to 80 pressings per minute in most cases. At least about 30 pressings per minute, 40 pressings per minute or 50 pressings per minute are readily achieved with existing equipment.

While the invention has been described in connection with numerous examples, it will be appreciated by one of skill in the art that plates, bowls, oval platters and trays and so forth having various shapes and sizes may be developed with the inventive characteristics. Some may be square or rectangular with rounded corners, triangular, multi-sided, polygonal and similar shape having the profile as described. The products may be compartmented. So also, instead of using a single paperboard layer blank, a composite paperboard blank may be used. For example, a container 10 of the invention may be formed from a composite paperboard material wherein the containers are formed by laminating three separate paperboard layers to one another in the form of the container having the shape shown in FIG. 1A. The particular manipulative steps of forming a composite plate are discussed in greater detail in U.S. Pat. Nos. 6,039,682, 6,186,394 and 6,287,247, the disclosures of which are incorporated herein by reference. Containers of the invention thus provide for increases in Rigidity, Rim Stiffness, as well as an improved ability to support a load. Modifications to the specific embodiments described above, within the spirit and scope of the present invention as is set forth in the appended claims, will be readily apparent to those of skill in the art.

What is claimed is:

1. A disposable servingware container press-formed from a generally planar paperboard blank, the container having an outermost diameter, D, and comprising:

(a) a bottom panel having an arched central crown with a convex upper surface;

(b) a first annular transition portion *adjacent the bottom panel,* extending upwardly and outwardly from the bottom panel *and defining a first radius of curvature, R1*, wherein a portion of the arched central crown defines a substantially continuous, convex arched profile spanning at least 75% of the horizontal distance between the center of the container and the first annular transition portion;

(c) [an optional] *a generally straight* sidewall portion extending upwardly and outwardly from the first annular transition portion*, wherein a first end of the generally straight sidewall portion is adjacent the first annular transition portion*;

(d) a second annular transition portion *extending from the generally straight sidewall portion and* flaring outwardly with respect to the first annular transition portion defining a second radius of curvature, R2, the ratio of R2/D being 0.0125 or less*, wherein a second end of the generally straight sidewall portion is adjacent the second annular transition portion*; and (e) an outer flange portion extending outwardly with respect to the second annular transition portion.

2. The container according to claim 1, wherein the convex, arched profile extends outwardly from the center of the container toward the first annular transition for a distance of at least 80% of the horizontal distance between the center of the container and the first annular transition portion.

3. The container according to claim 1, wherein the convex, arched profile extends outwardly from the center of the container toward the first annular transition for a distance of at least 85% of the horizontal distance between the center of the container and the first annular transition portion.

4. The container according to claim 1, wherein the convex, arched profile extends outwardly from the center of the container toward the first annular transition for a distance of at least 90% of the horizontal distance between the center of the container and the first annular transition portion.

5. The container according to claim 1, wherein the convex, arched profile extends across the center of the container.

6. The container according to claim 5, wherein the arched profile extends across the center of the container and defines a radius of curvature, R0, and the ratio of R0/D is from 1.75 to about 14.

7. The container according to claim 6, wherein the arched profile extends across the center of the container and defines a radius of curvature, R0, and the ratio of R0/D is from about 2 to about 12.

8. The container according to claim 6, wherein the arched profile extends across the center of the container and defines a radius of curvature, R0, and the ratio of R0/D is from about 2 to about 6.

9. The container according to claim 6, wherein the arched profile extends across the center of the container and defines a radius of curvature, R0, and the ratio of R0/D is from about 2 to about 4.

10. The container according to claim 1, wherein the upwardly convex arched central crown has a crown height of from about 0.05" to about 0.40".

11. The container according to claim 1, wherein the upwardly convex arched central crown has a crown height of at least about 0.1".

12. The container according to claim 1, wherein the upwardly convex arched central crown has a crown height of at least about 0.15".

13. The container according to claim 1, wherein the upwardly convex arched central crown has a crown height of at least about 0.2".

14. The container according to claim 1, wherein the ratio R2/D is from about 0.0025 to 0.0125.

15. The container according to claim 1, wherein the ratio R2/D is from about 0.005 to 0.010.

16. The container according to claim 1, wherein R2 is less than 125 mils.

17. The container according to claim 1, wherein R2 is at least 25 mils and less than 125 mils.

18. The container according to claim 1, wherein R2 is less than 90 mils.

19. The container according to claim 1, wherein R2 is less than 60 mils.

20. The container according to claim 1, wherein R2 is less than 30 mils.

21. The container according to claim 1, in the form of a paper plate with an outermost diameter, D, of from about 8½" to about 10½", having a Normalized SSI rigidity of at least 1.8 g/lb basis weight.

22. The container according to claim 1, in the form of a paper plate with an outermost diameter, D, of from about 8½" to about 10½", having a Normalized SSI rigidity of at least 2.0 g/lb basis weight.

23. The container according to claim 1, in the form of a paper plate with an outermost diameter, D, of from about 8½" to about 10½", having a Normalized SSI rigidity of at least 2.25 g/lb basis weight.

24. The container according to claim 1, in the form of a paper plate with an outermost diameter, D, of from about 8½" to about 10½", having a Normalized SSI rigidity of from 1.8 g/lb basis weight up to about 3 g/lb basis weight.

25. The container according to claim 1, in the form of a paper plate with an outermost diameter, D, of from about 8½" to about 10½", having a Normalized FPI rigidity of at least 1.5 g/lb basis weight.

26. The container according to claim 1, in the form of a paper plate with an outermost diameter, D, of from about 8½" to about 10½", having a Normalized FPI rigidity of at least 1.7 g/lb basis weight.

27. The container according to claim 1, in the form of a paper plate with an outermost diameter, D, of from about 8½" to about 10½", having a Normalized FPI rigidity of at least 1.9 g/lb basis weight.

28. The container according to claim 1, in the form of a paper plate with an outermost diameter, D, of from about 8½" to about 10½", having a Normalized FPI rigidity of from 1.5 g/lb basis weight up to about 2.55 g/lb basis weight.

29. The container according to claim 1, further comprising a basis weight of from about 80 lbs/3000 $ft^2$ to about 300 lbs/3000 $ft^2$.

30. The container according to claim 1, further comprising a basis weight of from about 155 lbs/3000 $ft^2$ to about 245 lbs/3000 $ft^2$.

31. The container according to claim 1, wherein the container exhibits an SSI rigidity at least 15% greater than a like container with a generally planar bottom panel and an R2/D ratio of 0.020 or greater.

32. The container according to claim 1, wherein the container exhibits an SSI rigidity at least 30% greater than a like container with a generally planar bottom panel and an R2/D ratio of 0.020 or greater.

33. The container according to claim 1, wherein the container exhibits an SSI rigidity at least 45% greater than a like container with a generally planar bottom panel and an R2/D ratio of 0.020 or greater.

34. A disposable servingware container press-formed from a generally planar paperboard blank, the container having an outermost diameter, D, as well as an overall height and comprising:

(a) a bottom panel having an arched central crown with a convex upper surface;

(b) a first annular transition portion extending upwardly and outwardly from the [generally planar] bottom panel, wherein a portion of the arched central crown defines a substantially continuous, convex arched profile spanning at least 75% of the horizontal distance between the center of the container and the first annular transition portion;

(c) [an optional] *a* sidewall portion extending upwardly and outwardly from the first annular transition portion;

(d) a second annular transition portion flaring outwardly with respect to the first annular transition portion defining a second radius of curvature, R2, the ratio of R2/D being 0.0125 or less; and (e) an outer flange portion extending outwardly with respect to the second annular transition portion, the outer flange portion having:

(i) a downwardly sloping brim portion defining a declivity angle α at its terminus [with respect to a horizontal substantially parallel to the bottom portion] and wherein the downwardly sloping brim portion transitions to (ii) a brim transition portion, a brim height being thereby defined as the difference between the overall height of the container and a height at which the downwardly sloping brim portion transitions to the brim transition portion, which brim transition portion, in turn, transitions to (iii) an annular evert portion extending outwardly with respect to the downwardly sloping brim portion at an eversion angle β of at least about 25 degrees;

(iv) the height of any upward extension of the evert portion above the brim transition portion being no more than about 75% of the brim height.

35. A disposable food container configured for rigidity and rim stiffness having an outermost diameter, D, comprising:

(a) a bottom panel having an arched central crown with a convex upper surface;

(b) a first annular transition portion extending upwardly and outwardly from said [generally planar] bottom panel, wherein a portion of the arched central crown defines a substantially continuous, convex arched profile spanning at least 75% of the horizontal distance between the center of the container and the first annular transition portion;

(c) a sidewall portion extending upwardly and outwardly from said first annular transition portion;

(d) a second annular transition portion flaring outwardly with respect to the first annular transition portion defining a second radius of curvature, R2, the ratio of R2/D being 0.0125 or less;

(e) said sidewall portion defining a generally linear, inclined sidewall profile over a length between said first annular transition portion and said second annular transition portion having an angle of inclination [with respect to the vertical from said generally planar bottom portion];

(f) an arcuate outer flange portion having a convex upper surface extending outwardly with respect to said second annular transition portion, the radius of curvature of said arcuate outer flange portion being between about 0.0175 and about 0.1 times the outermost diameter of said disposable food container; and (g) an inner flange portion extending between said second annular transition portion and said arcuate outer flange portion having a ratio of a radial span to the outermost diameter of from about 0 to about 0.1, said disposable food container being further characterized by a flange outer vertical drop wherein the ratio of the length of the flange outer vertical drop to the outermost diameter of the container is greater than about 0.01.

36. The disposable food container according to claim 35, wherein said inclined sidewall profile has an angle of inclination [with respect to the vertical from said generally planar bottom portion] of from about 10° to about 50°.

37. A disposable servingware container press-formed from a generally planar paperboard blank, the container having an outermost diameter, D, and comprising:

a bottom panel having a convex upper surface in at least a portion thereof;

a first annular transition portion *adjacent the bottom panel,* extending upwardly and outwardly from the bottom panel *and defining a first radius of curvature, R1*, wherein the convex upper surface spans at least 75% of the horizontal distance between the center of the container and the first annular transition portion;

a second annular transition portion flaring outwardly with respect to the first annular transition portion *and* defining a second radius of curvature, R2, the ratio of R2/D being 0.0125 or less;

*a generally straight sidewall portion extending upwardly and outwardly from the first annular transition portion to the second annular transition portion, wherein the generally straight sidewall portion is located adjacent the first annular transition portion at a first end thereof and adjacent the second annular transition portion at a second end thereof;* and an outer flange portion extending outwardly with respect to the second annular transition portion.

38. The container according to claim 37, wherein the convex upper surface defines a radius of curvature, R0, and the ratio of R0/D is from about 1.75 to about 14.

39. The container according to claim 37, wherein the convex upper surface defines a radius of curvature, R0, and the ratio of R0/D is from about 2 to about 12.

40. The container according to claim 37, wherein the convex upper surface defines a radius of curvature, R0, and the ratio of R0/D is from at least 2 to about 6.

41. The container according to claim 37, wherein the convex upper surface extends across the center of the container and defines a radius of curvature, R0, and the ratio of R0/D is from about 2 to about 4.

42. The container according to claim 37, in the form of a plate.

43. The container according to claim 37, in the form of a bowl.

44. The container according to claim 37, in the form of an oval platter.

45. The container according to claim 37, wherein the container exhibits an SSI rigidity at least 10% greater than a like container with a generally planar bottom panel.

46. The container according to claim 37, wherein the container exhibits an SSI rigidity at least 20% greater than a like container with a generally planar bottom panel.

47. The container according to claim 37, wherein the container exhibits an SSI rigidity at least 30% greater than a like container with a generally planar bottom panel.

48. The container according to claim 37, wherein the convex upper surface extends from the center of the container toward the first annular transition for a distance of at least 80% of the horizontal distance between the center of the container and the first annular transition portion.

49. The container according to claim 37, wherein the convex upper surface extends from the center of the container toward the first annular transition for a distance of at least 85% of the horizontal distance between the center of the container and the first annular transition portion.

50. The container according to claim 37, wherein the convex upper surface extends from the center of the container toward the first annular transition for a distance of at least 90% of the horizontal distance between the center of the container and the first annular transition portion.

51. A disposable paper plate press-formed from a generally planar paperboard blank, the plate having an outermost diameter, D of from about 8½" to about 10½", and comprising:

(a) a bottom panel;

(b) a first annular transition portion extending upwardly and outwardly from the bottom panel;

(c) [an optional] *a* sidewall portion extending upwardly and outwardly from the first annular transition portion;

(d) a second annular transition portion flaring outwardly with respect to the first annular transition portion defining a second radius of curvature, R2, the ratio of R2/D being 0.0125 or less; and (e) an outer flange portion extending outwardly with respect to the second annular transition portion;

(f) a plurality of circumferentially spaced, radially extending pleats formed from a plurality of paperboard lamellae rebonded into substantially integrated fibrous structures generally inseparable into their constituent lamellae, the pleats extending over at least a portion of the second annular transition portion and at least a portion of the outer flange portion of the plate, wherein the paper plate defines a pleated structure having a profile, and wherein further the profile and the paperboard blank are selected and formation of the plate, including pleating, is controlled such that the paper plate exhibits a Normalized SSI rigidity of at least 1.8 g/lb basis weight.

52. The paper plate according to claim 51, wherein the ratio R2/D is from about 0.0025 to 0.0125.

53. The paper plate according to claim 51, wherein the ratio R2/D is from about 0.005 to 0.010.

54. The paper plate according to claim 51, wherein the Normalized SSI rigidity is at least 2.0 g/lb basis weight.

55. The paper plate according to claim 51, wherein the Normalized SSI rigidity is at least 2.25 g/lb basis weight.

56. The paper plate according to claim 51, wherein the Normalized SSI rigidity is up to about 3 g/lb basis weight.

57. The paper plate according to claim 51, further comprising an outermost diameter, D, of from about 8½" to about 10½", and wherein a Normalized FPI rigidity is at least 1.5 g/lb basis weight.

58. The paper plate according to claim 51, further comprising an outermost diameter, D, of from about 8½" to about 10½", and wherein a Normalized FPI rigidity is at least 1.7 g/lb basis weight.

59. The paper plate according to claim 51, further comprising an outermost diameter, D, of from about 8½" to about 10½", and wherein a Normalized FPI rigidity is at least 1.9 g/lb basis weight.

60. The paper plate according to claim 51, further comprising an outermost diameter, D, of from about 8½" to about 10½", and wherein a Normalized FPI rigidity is of from 1.5 g/lb basis weight up to about 3 g/lb basis weight.

61. The paper plate according to claim 51, further comprising a basis weight of from about 80 lbs/3000 $ft^2$ to about 300 lbs/3000 $ft^2$.

62. The paper plate according to claim 51, further comprising a basis weight of from about 155 lbs/3000 $ft^2$ to about 245 lbs/3000 $ft^2$.

63. The paper plate according to claim 51, wherein the plate exhibits an SSI rigidity at least 10% greater than a like plate with an R2/D ratio of 0.020 or greater.

64. The paper plate according to claim 51, wherein the plate exhibits an SSI rigidity at least 20% greater than a like plate with an R2/D ratio of 0.020 or greater.

65. The paper plate according to claim 51, wherein the plate exhibits an SSI rigidity at least 30% greater than a like plate with an R2/D ratio of 0.020 or greater.

66. The paper plate according to claim 51, wherein the paper plate has from about 30 to about 75 radially extending pleats.

67. The paper plate according to claim 51, wherein the paper plate has from about 40 to about 60 radially extending pleats.

68. A disposable servingware container press-formed from a generally planar paperboard blank, the container having an outermost diameter, D, and comprising:

(a) a bottom panel *having an arched central crown with a convex upper surface*;

(b) a first annular transition portion *adjacent the bottom panel,* extending upwardly and outwardly from the bottom panel *and defining a first radius of curvature, R1*;

(c) [an optional] *a generally straight* sidewall portion extending upwardly and outwardly from the first annular transition portion*, wherein a first end of the generally straight sidewall portion is adjacent the first annular transition portion*;

(d) a second annular transition portion *extending from the generally straight sidewall portion and* flaring outwardly with respect to the first annular transition portion *and* defining a second radius of curvature, R2, less than 125 mils*, wherein a second end of the generally straight sidewall portion is adjacent the second annular transition portion*; and (e) an outer flange portion extending outwardly with respect to the second annular transition portion.

69. The container according to claim 68, wherein R2 is at least 25 mils and less than 125 mils.

70. The container according to claim 68, wherein R2 is less than 100 mils.

71. The container according to claim 68, wherein R2 is less than 90 mils.

72. The container according to claim 68, wherein R2 is less than 80 mils.

73. The container according to claim 68, wherein R2 is less than 60 mils.

74. The container according to claim 68, wherein R2 is less than 30 mils.

75. The container according to claim 68, further comprising a plurality of scores extending inwardly from the outermost diameter, wherein lower edges of the scores are at a height of at least 100 mils above the bottom of the first annular transition portion.

76. The container according to claim 75, wherein the lower edges of the scores are at a height of at least 150 mils above the bottom of the first annular transition portion.

77. The container according to claim 75, wherein the lower edges of the scores are at a height of from 100 mils to 300 mils above the bottom of the first annular transition portion.

78. The container according to claim 75, wherein the lower edges of the scores are at a height of from 150 mils to 250 mils above the bottom of the first annular transition portion.

79. A disposable bowl press-formed from a generally planar paperboard blank, the bowl having an outermost diameter, D, and a height, H, and comprising:

(a) a bottom panel having an arched central crown with a convex upper surface;

(b) a first annular transition portion extending upwardly and outwardly from the bottom panel, wherein a portion of the arched central crown defines a substantially continuous, convex arched profile spanning at least 75% of the horizontal distance between the center of the container and the first annular transition portion;

(c) [an optional] *a* sidewall portion extending upwardly and outwardly from the first annular transition portion;

(d) a second annular transition portion flaring outwardly with respect to the first annular transition portion defining a second radius of curvature, R2, the ratio of R2/D being 0.0125 or less; and (e) an outer flange portion extending outwardly with respect to the second annular transition portion, wherein the bowl has a height/diameter ratio, H/D, of from 0.15 to 0.3.

80. The bowl according to claim 79, wherein the convex, arched profile extends outwardly from the center of the container toward the first annular transition for a distance of at least 80% of the horizontal distance between the center of the container and the first annular transition portion.

81. The bowl according to claim 79, wherein the convex, arched profile extends outwardly from the center of the container toward the first annular transition for a distance of at least 85% of the horizontal distance between the center of the container and the first annular transition portion.

82. The bowl according to claim 79, wherein the convex, arched profile extends outwardly from the center of the container toward the first annular transition for a distance of at least 90% of the horizontal distance between the center of the container and the first annular transition portion.

83. The bowl according to claim 79, wherein the convex, arched profile extends across the center of the container.

84. The bowl according to claim 83, wherein the arched profile extends across the center of the container and defines a radius of curvature, R0, and the ratio of R0/D is from 1.75 to about 14.

85. The bowl according to claim 84, wherein the arched profile extends across the center of the container and defines a radius of curvature, R0, and the ratio of R0/D is from about 2 to about 12.

86. The bowl according to claim 84, wherein the arched profile extends across the center of the container and defines a radius of curvature, R0, and the ratio of R0/D is from about 2 to about 6.

87. The bowl according to claim 84, wherein the arched profile extends across the center of the container and defines a radius of curvature, R0, and the ratio of R0/D is from about 2 to about 4.

88. The bowl according to claim 79, wherein the upwardly convex arched central crown has a crown height of from about 0.02" to about 0.40".

89. The bowl according to claim 79, wherein the upwardly convex arched central crown has a crown height of at least about 0.03".

90. The bowl according to claim 79, wherein the upwardly convex arched central crown has a crown height of at least about 0.04".

91. The bowl according to claim 79, wherein the upwardly convex arched central crown has a crown height of at least about 0.05".

92. The bowl according to claim 79, wherein the ratio R2/D is from about 0.004 to 0.0125.

93. The bowl according to claim 79, wherein the ratio R2/D is from about 0.005 to 0.0125.

94. The bowl according to claim 79, wherein R2 is less than 125 mils.

95. The bowl according to claim 79, wherein R2 is at least 25 mils and less than 125 mils.

96. The bowl according to claim 79, wherein R2 is less than 90 mils.

97. The bowl according to claim 79, wherein R2 is less than 60 mils.

98. The bowl according to claim 79, wherein R2 is less than 30 mils.

99. The bowl according to claim 79, having from 60 to 120 pleats.

100. A method of making a disposable servingware container comprising:

(a) disposing a generally planar paperboard blank in a forming apparatus, which apparatus includes a punch and die mounted for reciprocal motion with respect to each other; and (b) forming the generally planar paperboard blank under heat and pressure between the punch and die into a container with an outermost diameter, D, including:

(i) a bottom panel having an arched central crown with a convex upper surface;

(ii) a first annular transition portion extending upwardly and outwardly from the bottom panel, wherein a portion of the arched central crown defines a substantially continuous, convex arched profile spanning at least 75% of the horizontal distance between the center of the container and the first annular transition portion;

(iii) [an optional] *a* sidewall portion extending upwardly and outwardly from the first annular transition portion;

(iv) a second annular transition portion flaring outwardly with respect to the first annular transition portion defining a second radius of curvature, R2, the ratio of R2/D being 0.0125 or less; and (v) an outer flange portion extending outwardly with respect to the second annular transition portion.

101. The method according to claim 100, wherein the paperboard blank is a scored paperboard blank.

102. The method according to claim 100, wherein the paperboard blank has a basis weight between 80 lbs/3000 $ft^2$ and 300 lbs/3000 $ft^2$.

103. The method according to claim 100, wherein the paperboard blank has a polymeric coating on one side thereof.

104. The method according to claim 100, further comprising moistening the paperboard blank prior to forming the blank into the container.

105. The method according to claim 100, wherein the paperboard blank is impregnated with starch.

106. The method according to claim 100, wherein the punch is a segmented punch and the die is a segmented die.

107. The method according to claim 100, wherein the forming surfaces of the punch and die are maintained at a temperature between about 250° F. and 400° F.

108. The method according to claim 100, operated at from 20 to 80 pressings per minute.

109. The method according to claim 100, operated at more than 30 pressings per minute.

110. The method according to claim 100, operated at more than 40 pressings per minute.

111. The method according to claim 100, operated at more than 50 pressings per minute.

112. The method according to claim 100, wherein the blank is formed into shape by contact with a directly heated part, the contact between the paperboard and the directly heated part extending over an arc length of the central crown of the container of more than 100 mils.

113. The method according to claim 100, wherein the blank is formed into shape by contact with a directly heated part, the contact between the paperboard and the directly heated part extending over an arc length of the central crown of the container of more than 200 mils.

114. The method according to claim 100, wherein the blank is formed into shape by contact with a directly heated part, the contact between the paperboard and the directly heated part extending over an arc length of the central crown of the container of from 100 mils to 600 mils.

115. A method of making a disposable servingware container comprising:

(a) disposing a generally planar paperboard blank in a forming apparatus, which apparatus includes a punch and a die mounted for reciprocal motion with respect to each other;

(b) forming the generally planar paperboard blank under heat and pressure between the punch and die into a container with an outermost diameter, D, as well as an overall height and including:

(i) a bottom panel having an arched central crown with a convex upper surface;

(ii) a first annular transition portion extending upwardly and outwardly from the [generally planar] bottom panel, wherein a portion of the arched central crown defines a substantially continuous, convex arched profile spanning at least 75% of the horizontal distance between the center of the container and the first annular transition portion;

(iii) [an optional] *a* sidewall portion extending upwardly and outwardly from the first annular transition portion;

(iv) a second annular transition portion flaring outwardly with respect to the first annular transition portion defining a second radius of curvature, R2, the ratio of R2/D being 0.0125 or less; and (v) an outer flange portion extending outwardly with respect to the second annular transition portion, the outer flange portion having:

(A) a downwardly sloping brim portion defining a declivity angle $\alpha$ at its terminus [with respect to a horizontal substantially parallel to the bottom portion and] wherein the downwardly sloping brim portion transitions to (B) a brim transition portion, a brim height being thereby defined as the difference between the overall height of the container and a height at which the downwardly sloping brim portion transitions to the brim transition portion, which brim transition portion, in turn, transitions to (C) an annular evert portion extending outwardly with respect to the downwardly sloping brim portion at an eversion angle $\beta$ of at least about 25 degrees;

(D) the height of any upward extension of the evert portion above the brim transition portion being no more than about 75% of the brim height.

116. A method of making a disposable servingware container comprising:

(a) disposing a generally planar paperboard blank in a forming apparatus, which apparatus includes a punch and a die mounted for reciprocal motion with respect to each other;

(b) forming the generally planar paperboard blank under heat and pressure between the punch and die into a container with an outermost diameter, D, including:

(i) a bottom panel having an arched central crown with a convex upper surface;

(ii) a first annular transition portion extending upwardly and outwardly from said [generally planar] bottom panel, wherein a portion of the arched central crown defines a substantially continuous, convex arched profile spanning at least 75% of the horizontal distance between the center of the container and the first annular transition portion;

(iii) a sidewall portion extending upwardly and outwardly from said first annular transition portion;

(iv) a second annular transition portion flaring outwardly with respect to the first annular transition portion defining a second radius of curvature, R2, the ratio of R2/D being 0.0125 or less;

(v) said sidewall portion defining a generally linear, inclined sidewall profile over a length between said first annular transition portion and said second annular transition portion having an angle of inclination [with respect to the vertical from said generally planar bottom portion];

(vi) an arcuate outer flange portion having a convex upper surface extending outwardly with respect to said second annular transition portion, the radius of curvature of said arcuate outer flange portion being between about 0.0175 and about 0.1 times the outermost diameter of said disposable servingware container; and (vii) an inner flange portion extending between said second annular transition portion and said arcuate outer flange portion having a ratio of a radial span to the outermost diameter of from about 0 to about 0.1, said disposable servingware container being further characterized by a flange outer vertical drop wherein the ratio of the length of the flange outer vertical drop to the outermost diameter of the container is greater than about 0.01.

117. A method of making a disposable servingware container comprising:

(a) disposing a generally planar paperboard blank in a forming apparatus, which apparatus includes a punch and a die mounted for reciprocal motion with respect to each other;

(b) forming the generally planar paperboard blank under heat and pressure between the punch and die into a container with an outermost diameter, D, including:

(i) a bottom panel having an arched central crown with a convex upper surface;

(ii) a first annular transition portion extending upwardly and outwardly from the bottom panel, wherein a portion of the arched central crown is in the shape of a spheroidal cap defining a substantially continuous, convex arched profile spanning at least 75% of the horizontal distance between the center of the container and the first annular transition portion;

(iii) [an optional] *a* sidewall portion extending upwardly and outwardly from the first annular transition portion;

(iv) a second annular transition portion flaring outwardly with respect to the first annular transition portion defining a second radius of curvature, R2, the ratio of R2/D being 0.0125 or less; and (v) an outer flange portion extending outwardly with respect to the second annular transition portion.

118. The method according to claim 117, wherein the blank is formed into shape by contact with a directly heated part, the contact between the paperboard and the directly heated part extending over an arc length of the central crown of the container of more than 100 mils.

119. The method according to claim 117, wherein the blank is formed into shape by contact with a directly heated part, the contact between the paperboard and the directly heated part extending over an arc length of the central crown of the container of more than 200 mils.

120. The method according to claim 117, wherein the blank is formed into shape by contact with a directly heated part, the contact between the paperboard and the directly heated part extending over an arc length of the central crown of the container of from 100 mils to 600 mils.

121. A method of making a disposable servingware paper plate comprising:

(a) disposing a generally planar paperboard blank in a forming apparatus, which apparatus includes a punch and a die mounted for reciprocal motion with respect to each other;

(b) forming the generally planar paperboard blank under heat and pressure between the punch and die into a paper plate with an outermost diameter, D of from about 8½" to about 10½", including:

(i) a bottom panel having an arched central crown with a convex upper surface;

(ii) a first annular transition portion extending upwardly and outwardly from the bottom panel;

(iii) [an optional] *a* sidewall portion extending upwardly and outwardly from the first annular transition portion;

(iv) a second annular transition portion flaring outwardly with respect to the first annular transition portion defining a second radius of curvature, R2, the ratio of R2/D being 0.0125 or less; and (v) an outer flange portion extending outwardly with respect to the second annular transition portion;

(vi) a plurality of circumferentially spaced, radially extending pleats formed from a plurality of paperboard lamellae rebonded into substantially integrated fibrous structures generally inseparable into their constituent lamellae, the pleats extending over at least a portion of the second annular transition portion and at least a portion of the outer flange portion of the container, wherein the plate defines a pleated structure having a profile, and wherein further the profile and the paperboard blank are selected and formation of the plate, including pleating, is controlled such that the paper plate exhibits a Normalized SSI rigidity of at least 1.8 g/lb basis weight.

122. A method of making a disposable servingware container comprising:

(a) disposing a generally planar paperboard blank in a forming apparatus, which apparatus includes a punch and a die mounted for reciprocal motion with respect to each other;

(b) forming the generally planar paperboard blank under heat and pressure between the punch and die into a container with an outermost diameter, D, including:

(i) a bottom panel having an arched central crown with a convex upper surface;

(ii) a first annular transition portion extending upwardly and outwardly from the bottom panel;

(iii) [an optional] *a* sidewall portion extending upwardly and outwardly from the first annular transition portion;

(iv) a second annular transition portion flaring outwardly with respect to the first annular transition portion defining a second radius of curvature, R2, of less than 125 mils; and (v) an outer flange portion extending outwardly with respect to the second annular transition portion.

123. The method according to claim 122, wherein R2 is at least 25 mils and less than 125 mils.

124. The method according to claim 122, wherein R2 is less than 100 mils.

125. The method according to claim 122, wherein R2 is less than 90 mils.

126. The method according to claim 122, wherein R2 is less than 80 mils.

127. The method according to claim 122, wherein R2 is less than 60 mils.

128. The method according to claim 122, wherein R2 is less than 30 mils.

129. A method of making a disposable bowl comprising:

(a) disposing a generally planar paperboard blank in a forming apparatus, which apparatus includes a punch and die mounted for reciprocal motion with respect to each other; and (b) forming the generally planar paperboard blank under heat and pressure between the punch and die into a bowl with an outermost diameter, D, and a height, H, including:

(i) a bottom panel having an arched central crown with a convex upper surface;

(ii) a first annular transition portion extending upwardly and outwardly from the bottom panel, wherein a portion of the arched central crown defines a substantially continuous, convex arched profile spanning at least 75% of the horizontal distance between the center of the container and the first annular transition portion;

(iii) [an optional] *a* sidewall portion extending upwardly and outwardly from the first annular transition portion;

(iv) a second annular transition portion flaring outwardly with respect to the first annular transition portion defining a second radius of curvature, R2, the ratio of R2/D being 0.0125 or less; and (v) an outer flange portion extending outwardly with respect to the second annular transition portion, wherein the bowl has a height/diameter ratio, H/D, of from 0.15 to 0.3.

*130. The container according to claim 1, wherein the outer flange portion extends outwardly about the entirety of the outermost diameter D.*

*131. The container according to claim 34, wherein the outer flange portion extends outwardly about the entirety of the outermost diameter D.*

*132. The container according to claim 35, wherein the outer flange portion extends outwardly about the entirety of the outermost diameter D.*

*133. The container according to claim 37, wherein the outer flange portion extends outwardly about the entirety of the outermost diameter D.*

*134. The paper plate according to claim 51, wherein the outer flange portion extends outwardly about the entirety of the outermost diameter D.*

*135. The paper plate according to claim 51, wherein the bottom panel has a generally planar upper surface.*

*136. The container according to claim 68, wherein the outer flange portion extends outwardly about the entirety of the outermost diameter D.*

*137. The bowl according to claim 79, wherein the outer flange portion extends outwardly about the entirety of the outermost diameter D.*

*138. A disposable servingware container press-formed from a generally planar paperboard blank, the container having a characteristic diameter, D, comprising:*

*(a) a bottom panel having an arched central crown with a convex upper surface;*

*(b) a first annular transition portion adjacent the bottom panel, extending upwardly and outwardly from the bottom panel and defining a first radius of curvature, R1, wherein a portion of the arched central crown defines a substantially continuous, convex arched profile spanning at least 75% of the horizontal distance between the center of the container and the first annular transition portion;*

*(c) a generally straight sidewall portion extending upwardly and outwardly from the first transition portion, wherein a first end of the generally straight sidewall portion is adjacent the first annular transition portion;*

*(d) a second annular transition portion extending from the generally straight sidewall portion and flaring outwardly with respect to the first annular transition portion and defining a second radius of curvature, R2, the ratio of R2/D being 0.0125 or less, wherein a second end of the generally straight sidewall portion is adjacent the second annular transition portion; and*

*(e) an outer flange portion extending outwardly with respect to the second annular transition portion,*

*wherein the characteristic diameter, D, is an average diameter for oval or elliptical shapes, or the characteristic diameter, D, is an average length of each line passing from side to side through the center of the bottom panel.*

*139. The container according to claim 138, wherein the convex, arched profile extends outwardly from the center of the container toward the first annular transition for a distance of at least 80% of the horizontal distance between the center of the container and the first annular transition portion.*

*140. The container according to claim 138, wherein the convex, arched profile extends across the center of the container.*

*141. The container according to claim 140, wherein the arched profile extends across the center of the container and defines a radius of curvature, R0, and the ratio of R0/D is from 1.75 to about 14.*

*142. The container according to claim 138, wherein the upwardly convex arched central crown has a crown height of at least about 0.1".*

*143. The container according to claim 138, wherein the ratio of R2/D is from about 0.0025 to 0.0125.*

*144. The container according to claim 138, wherein the R2 is less than 125 mils.*

*145. The container according to claim 138, wherein the container is a paper plate; the characteristic diameter, D, is about 8.5 inches to about 10.5 inches; and has a Normalized SSI rigidity of at least 1.8 g/lb basis weight.*

*146. The container according to claim 138, further comprising a basis weight of about 80 lbs/3000 $ft^2$ to about 300 lbs/3000 $ft^2$.*

*147. The container according to claim 138, wherein the container exhibits an SSI rigidity from 25% to 100% greater than a like container with a generally planar bottom panel and an R2/D ratio of 0.020 or greater.*

*148. The container according to claim 138, wherein the container is oval, elliptical, square, rectangular, triangular, hexagonal, or octagonal.*

*149. The container according to claim 138, wherein the container is hexagonal, octagonal, or multi-sided.*

*150. The container according to claim 138, wherein the container is square or rectangular.*

*151. The container according to claim 138, wherein the container is circular, oval, or elliptical.*

*152. The container according to claim 138, wherein the outer flange portion extends outwardly about the entirety of the characteristic diameter D.*

*153. A disposable servingware container press-formed from a generally planar paperboard blank, comprising:*

*(a) a bottom panel;*

*(b) a first annular transition portion adjacent the bottom panel, extending upwardly and outwardly from the bottom panel and defining a first radius of curvature, R1;*

*(c) a second annular transition portion flaring outwardly with respect to the first annular transition portion and defining a second radius of curvature, R2;*

*(d) a generally straight sidewall portion extending upwardly and outwardly from the first annular transition portion to the second annular transition portion, wherein the generally straight sidewall portion is adjacent the first annular transition portion at a first end thereof and adjacent the second annular transition portion at a second end thereof; and*

*(e) an outer flange portion extending outwardly with respect to the second annular transition portion,*

*wherein the container is polygonal having a major axis, a minor axis and a characteristic diameter, D, that is an average length of each line passing from side to side in the major axis and in the minor axis through the center of the bottom panel,*

*wherein the ratio of R2/D is 0.0125 or less.*

*154. The container according to claim 153, wherein the bottom panel has an arched central crown with a convex*

*upper surface; a portion of the arched central crown defines a substantially continuous, convex arched profile spanning at least 75% of the horizontal distance between the center of the container and the first annular transition portion; and exhibits an SSI rigidity from 25% to 100% greater than a container with a generally planar bottom panel and an R2/D ratio of 0.020 or greater.*

*155. The container according to claim 153, wherein the polygon is a rectangle, triangle, hexagon, or octagon.*

*156. The container according to claim 153, wherein the polygon is a rectangle or hexagon.*

*157. The container according to claim 153, wherein the outer flange portion extends outwardly about the entirety of the characteristic diameter D.*

*158. The container according to claim 153, wherein the bottom panel has a generally planar upper surface.*

*159. A disposable servingware container press-formed from a generally planar paperboard blank, comprising:*

*(a) a bottom panel having an arched central crown with a convex upper surface;*

*(b) a first annular transition portion adjacent the bottom panel, extending upwardly and outwardly from the bottom panel and defining a first radius of curvature, R1, wherein a portion of the arched central crown defines a substantially continuous, convex arched profile spanning at least 75% of the horizontal distance between the center of the container and the first annular transition portion;*

*(c) a second annular transition portion flaring outwardly with respect to the first annular transition portion and defining a second radius of curvature, R2;*

*(d) a generally straight sidewall portion extending upwardly and outwardly from the first annular transition portion to the second annular transition portion, wherein the generally straight sidewall portion is adjacent the first annular transition portion at a first end thereof and adjacent the second annular transition portion at a second end thereof; and*

*(e) an outer flange portion extending outwardly with respect to the second annular transition portion, wherein the container has at least four sides and a characteristic diameter, D, that is an average length of each line passing from side to side through the center of the bottom panel,*

*wherein the ratio of R2/D is 0.0125 or less.*

*160. The container according to claim 159, wherein the container is square or rectangular.*

*161. The container according to claim 159, wherein the container has a shape comprising arcuate and linear segments.*

*162. The container according to claim 159, wherein the outer flange portion extends outwardly about the entirety of the characteristic diameter D.*

*163. A disposable servingware container press-formed from a generally planar paperboard blank, comprising:*

*(a) a bottom panel;*

*(b) a first annular transition portion adjacent the bottom panel, extending upwardly and outwardly from the bottom panel and defining a first radius of curvature, R1;*

*(c) a second annular transition portion flaring outwardly with respect to the first annular transition portion defining a second radius of curvature, R2;*

*(d) a generally straight sidewall portion extending upwardly and outwardly from the first annular transition portion to the second annular transition portion, wherein the generally straight sidewall portion is adjacent the first annular transition portion at a first end thereof and adjacent the second annular transition portion at a second end thereof; and*

*(e) an outer flange portion extending outwardly with respect to the second annular transition portion, wherein the container is multi-sided having a characteristic diameter, D, that is an average length of each line passing from side to side through the center of the bottom panel,*

*wherein the ratio of R2/D is 0.0125 or less.*

*164. The container according to claim 163, wherein the bottom panel has an arched central crown with a convex upper surface.*

*165. The container according to claim 164, wherein a portion of the arched central crown defines a substantially continuous, convex arched profile spanning at least 75% of the horizontal distance between the center of the container and the first annular transition portion.*

*166. The container according to claim 163, wherein the container has a shape comprising arcuate and linear segments.*

*167. The container according to claim 163, wherein the container is rectangular, triangular, hexagonal, or octagonal.*

*168. The container according to claim 163, wherein the outer flange portion extends outwardly about the entirety of the characteristic diameter D.*

*169. The container according to claim 163, wherein the bottom panel has a generally planar upper surface.*

*170. A disposable servingware container press-formed from a generally planar paperboard blank, the container having a characteristic diameter, D, comprising:*

*(a) a bottom panel;*

*(b) a first annular transition portion adjacent the bottom panel, extending upwardly and outwardly from the bottom panel and defining a first radius of curvature, R1;*

*(c) a generally straight sidewall portion extending upwardly and outwardly from the first transition portion, wherein a first end of the generally straight sidewall portion is adjacent the first annular transition portion;*

*(d) a second annular transition portion extending from the generally straight sidewall portion and flaring outwardly with respect to the first annular transition portion and defining a second radius of curvature, R2, the ratio of R2/D being 0.0125 or less, wherein a second end of the generally straight sidewall portion is adjacent the second annular transition portion; and*

*(e) an outer flange portion extending outwardly with respect to the second annular transition portion,*

*wherein the characteristic diameter, D, is an average diameter for oval or elliptical shapes, or the characteristic diameter, D, is an average length of each line passing from side to side through the center of the bottom panel.*

*171. The container according to claim 170, wherein the ratio of R2/D is from about 0.0025 to 0.0125.*

*172. The container according to claim 170, wherein the ratio of R2/D is from about 0.005 to 0.010.*

*173. The container according to claim 170, wherein the R2 is less than 125 mils.*

*174. The container according to claim 170, wherein the R2 is less than 90 mils.*

*175. The container according to claim 170, wherein the R2 is less than 60 mils.*

176. The container according to claim 170, wherein the R2 is less than 30 mils.

177. The container according to claim 170, wherein the container is a paper plate; the characteristic diameter, D, is about 8.5 inches to about 10.5 inches; and has a Normalized SSI rigidity of at least 1.5 g/lb basis weight.

178. The container according to claim 170, wherein the container is a paper plate; the characteristic diameter, D, is about 8.5 inches to about 10.5 inches; and has a Normalized SSI rigidity of at least 1.8 g/lb basis weight.

179. The container according to claim 170, wherein the container is a paper plate; the characteristic diameter, D, is about 8.5 inches to about 10.5 inches; and has a Normalized SSI rigidity of at least 2.0 g/lb basis weight.

180. The container according to claim 170, wherein the container is a paper plate; the characteristic diameter, D, is about 8.5 inches to about 10.5 inches; and has a Normalized SSI rigidity of at least 2.25 g/lb basis weight.

181. The container according to claim 170, wherein the container is a paper plate; the characteristic diameter, D, is about 8.5 inches to about 10.5 inches; and has a Normalized SSI rigidity of at least 3 g/lb basis weight.

182. The container according to claim 170, wherein the container is a paper plate; the characteristic diameter, D, is about 8.5 inches to about 10.5 inches; and has a Normalized SSI rigidity of 1.5 g/lb basis weight to about 2.55 g/lb basis weight.

183. The container according to claim 170, further comprising a basis weight of about 80 lbs/3000 $ft^2$ to about 300 lbs/3000 $ft^2$.

184. The container according to claim 170, further comprising a basis weight of about 155 lbs/3000 $ft^2$ to about 245 lbs/3000 $ft^2$.

185. The container according to claim 170, wherein the container is oval, elliptical, square, rectangular, triangular, hexagonal, or octagonal.

186. The container according to claim 170, wherein the container is hexagonal, octagonal, or multi-sided.

187. The container according to claim 170, wherein the container is square or rectangular.

188. The container according to claim 170, wherein the container is circular, oval, or elliptical.

189. The container according to claim 170, wherein the outer flange portion extends outwardly about the entirety of the characteristic diameter D.

190. The container according to claim 170, wherein the bottom panel has a generally planar upper surface.

191. A disposable servingware container press-formed from a generally planar paperboard blank, the container having an outermost diameter, D, and comprising:

(a) a bottom panel having a generally planar bottom portion;

(b) a first annular transition portion adjacent the bottom panel, extending upwardly and outwardly from the bottom panel and defining a first radius of curvature, R1;

(c) a generally straight sidewall portion extending upwardly and outwardly from the first annular transition portion, wherein a first end of the generally straight sidewall portion is adjacent the first annular transition portion;

(d) a second annular transition portion extending from the generally straight sidewall portion and flaring outwardly with respect to the first annular transition portion defining a second radius of curvature, R2, the ratio of R2/D being 0.0125 or less, and wherein a second end of the generally straight sidewall portion is adjacent the second annular transition portion; and (e) a flange portion extending outwardly with respect to the second annular transition portion.

192. The disposable servingware container of claim 191, wherein the flange portion comprises an outer portion that extends downwardly, defining a declivity angle therebetween.

193. The disposable servingware container of claim 192, wherein the flange portion comprises a generally horizontal inner portion and a declined outer portion that extends downwardly from the generally horizontal inner portion, defining a declivity angle therebetween.

194. The disposable servingware container of claim 191, wherein R2 is less than 125 mils.

195. The disposable servingware container of claim 191, wherein R2 is 25 mils to 125 mils.

196. The disposable servingware container of claim 191, wherein R2/D is 0.0025 to 0.0125.

197. The disposable servingware container of claim 191, wherein R2/D is 0.005 to 0.0125.

198. The container according to claim 191, wherein the container is a paper plate; the characteristic diameter, D, is about 8.5 inches to about 10.5 inches; and has a Normalized SSI rigidity of 1.5 g/lb basis weight to about 2.55 g/lb basis weight.

199. The container according to claim 191, wherein the outer flange portion extends outwardly about the entirety of the outermost diameter D.

200. A disposable bowl press-formed from a generally planar paperboard blank, the bowl having an outermost diameter, D, and comprising:

(a) a bottom panel having a generally planar bottom portion;

(b) a first annular transition portion adjacent the bottom panel, extending upwardly and outwardly from the bottom panel and defining a first radius of curvature, R1;

(c) a generally straight sidewall portion extending upwardly and outwardly from the first annular transition portion, wherein a first end of the generally straight sidewall portion is adjacent the first annular transition portion;

(d) a second annular transition portion extending from the generally straight sidewall portion and flaring outwardly with respect to the first annular transition portion defining a second radius of curvature, R2, the ratio of R2/D being 0.0125 or less, and wherein a second end of the generally straight sidewall portion is adjacent the second annular transition portion; and (e) a flange portion extending outwardly with respect to the second annular transition portion, wherein the bowl has a height/diameter, H/D, of from 0.15 to 3.

201. The bowl of claim 200, wherein the flange portion comprises an outer portion that extends downwardly, defining a declivity angle therebetween.

202. The bowl of claim 201, wherein the flange portion comprises a generally horizontal inner portion and a declined outer portion that extends downwardly from the generally horizontal inner portion, defining a declivity angle therebetween.

203. The bowl of claim 200, wherein R2 is less than 125 mils.

204. The disposable servingware container of claim 200, wherein R2 is 25 mils to 125 mils.

205. The disposable servingware container of claim 200, wherein R2/D is 0.0025 to 0.0125.

*206. The disposable servingware container of claim 200, wherein R2/D is 0.005 to 0.0125.*

*207. The container according to claim 200, wherein the container is a paper plate; the characteristic diameter, D, is about 8.5 inches to about 10.5 inches; and has a Normalized SSI rigidity of 1.5 g/lb basis weight to about 2.55 g/lb basis weight.*

*208. The bowl according to claim 200, wherein the outer flange portion extends outwardly about the entirety of the outermost diameter D.*

*209. The bowl according to claim 200, wherein the bottom panel has a generally planar upper surface.*

* * * * *